US008917264B2

(12) United States Patent
Minami et al.

(10) Patent No.: US 8,917,264 B2

(45) Date of Patent: Dec. 23, 2014

(54) PIXEL CIRCUIT, DISPLAY DEVICE, ELECTRONIC DEVICE, AND PIXEL CIRCUIT DRIVING METHOD

(75) Inventors: Tetsuo Minami, Tokyo (JP); Katsuhide Uchino, Kanagawa (JP)

(73) Assignee: Sony Corporation, Tokyo (JP)

( * ) Notice: Subject to any disclaimer, the term of this patent is extended or adjusted under 35 U.S.C. 154(b) by 360 days.

(21) Appl. No.: 13/482,614

(22) Filed: May 29, 2012

(65) Prior Publication Data

US 2012/0313923 A1 Dec. 13, 2012

(30) Foreign Application Priority Data

Jun. 8, 2011 (JP) ................................ 2011-128238

(51) Int. Cl.
*G06F 3/038* (2013.01)
*G09G 3/32* (2006.01)

(52) U.S. Cl.
CPC ...... *G09G 3/3233* (2013.01); *G09G 2300/0866* (2013.01); *G09G 2300/0814* (2013.01); *G09G 2300/0842* (2013.01); *G09G 2300/043* (2013.01); *G09G 2320/0233* (2013.01); *G09G 2320/045* (2013.01)
USPC .............................. 345/212; 345/76; 345/204

(58) Field of Classification Search
CPC ......... G09G 3/30; G09G 5/00; G09G 3/3233; G06F 3/038
USPC .............................. 345/76–77, 204–205, 214
See application file for complete search history.

(56) References Cited

U.S. PATENT DOCUMENTS

| | | | | |
|---|---|---|---|---|
| 7,333,099 | B2 * | 2/2008 | Inukai | 345/205 |
| 2005/0093850 | A1 * | 5/2005 | Mori et al. | 345/204 |
| 2005/0231448 | A1 * | 10/2005 | Tanabe et al. | 345/76 |
| 2009/0073095 | A1 * | 3/2009 | Uchino et al. | 345/77 |

FOREIGN PATENT DOCUMENTS

| | | |
|---|---|---|
| JP | 4240059 | 1/2009 |
| JP | 4240068 | 1/2009 |

* cited by examiner

*Primary Examiner* — Andrew Sasinowski

(74) *Attorney, Agent, or Firm* — Rader, Fishman & Grauer PLLC

(57) ABSTRACT

Disclosed herein is a pixel circuit including: a light emitting element; a storage capacitor; a writing transistor for writing a driving voltage corresponding to a video signal to the storage capacitor; and a driving transistor for driving the light emitting element on a basis of the driving voltage written to the storage capacitor, wherein a characteristic of the writing transistor is controllable in such a manner as to be operatively associated with a process of writing the driving voltage corresponding to the video signal to the storage capacitor.

18 Claims, 22 Drawing Sheets

<DEPENDENCE OF TRANSISTOR CHARACTERISTIC ON SUBSTRATE POTENTIAL>

PIXEL CIRCUIT, DISPLAY DEVICE, ELECTRONIC DEVICE, AND PIXEL CIRCUIT DRIVING METHOD

BACKGROUND

The technology disclosed in the present specification relates to a pixel circuit, a display device, an electronic device, and a pixel circuit driving method.

Today, display devices having a pixel circuit (referred to also as a pixel) including a display element (referred to also as an electrooptic element) and electronic devices including a display device are widely used. There are display devices that use an electrooptic element changing in luminance according to a voltage applied to the electrooptic element or a current flowing through the electrooptic element as a display element of a pixel. For example, a liquid crystal display element is a typical example of an electrooptic element that changes in luminance according to a voltage applied to the electrooptic element, and an organic electroluminescence (hereinafter described as organic EL) element (organic light emitting diode (OLED)) is a typical example of an electrooptic element that changes in luminance according to a current flowing through the electrooptic element. An organic EL display device using the latter organic EL element is a so-called emissive display device using a self-luminous electrooptic element as a display element of a pixel.

Display devices using a display element can adopt a simple (passive) matrix system and an active matrix system as a driving system of the display devices. However, while having a simple structure, a simple matrix type display device presents a problem of difficulty in realizing a large and high-definition display device, for example.

Thus, an active matrix system that controls a pixel signal supplied to a display element within a pixel by using an active element similarly provided within the pixel, which active element is for example a transistor such as an insulated gate field effect transistor (typically a thin film transistor (TFT)) or the like as a switching transistor, has recently been actively developed (see for example Japanese Patent No. 4240059 and Japanese Patent No. 4240068).

SUMMARY

However, it has been found that when a field effect transistor having a back gate effect is used for signal writing, and a video signal has a high level (that is, a high luminance is to be obtained), a “luminance shortage phenomenon” occurs in which a luminance corresponding to the input level of the video signal may not be obtained in actuality.

It is accordingly desirable to provide a technology for enabling a luminance corresponding to the input level of a video signal to be obtained more reliably.

A pixel circuit according to a first embodiment of the present disclosure includes: a light emitting element; a storage capacitor; a writing transistor for writing a driving voltage corresponding to a video signal to the storage capacitor; and a driving transistor for driving the light emitting element on a basis of the driving voltage written to the storage capacitor, wherein a characteristic of the writing transistor is controllable in such a manner as to be operatively associated with a process of writing the driving voltage corresponding to the video signal to the storage capacitor.

A display device according to a second embodiment of the present disclosure includes: a plurality of pixel circuits including a light emitting element, a storage capacitor, a writing transistor for writing a driving voltage corresponding to a video signal to the storage capacitor, and a driving transistor for driving the light emitting element on a basis of the driving voltage written to the storage capacitor, the pixel circuits being arranged; and a characteristic controlling section configured to control a characteristic of the writing transistor in such a manner as to be operatively associated with a process of writing the driving voltage corresponding to the video signal to the storage capacitor.

A display device according to a third embodiment of the present disclosure includes: a plurality of pixel circuits; a plurality of signal lines; and a plurality of scanning lines, wherein the pixel circuits include a light emitting element, a storage capacitor, a writing transistor, and a driving transistor, the writing transistor is set in a conducting state according to a control signal from a scanning line, and supplies a video signal from a signal line to the storage capacitor, the storage capacitor retains a driving voltage corresponding to the supplied video signal, the driving transistor is driven so as to feed a current through the light emitting element on a basis of the driving voltage, the writing transistor includes a back gate terminal and a gate terminal, and a capacitance element and a resistance element are connected between the back gate terminal and the gate terminal.

An electronic device according to a fourth embodiment of the present disclosure includes: a plurality of pixel circuits including a light emitting element, a storage capacitor, a writing transistor for writing a driving voltage corresponding to a video signal to the storage capacitor, and a driving transistor for driving the light emitting element on a basis of the driving voltage written to the storage capacitor, the pixel circuits being arranged; a signal generating section for generating the video signal to be supplied to the writing transistor; and a characteristic controlling section configured to control a characteristic of the writing transistor in such a manner as to be operatively associated with a process of writing the driving voltage corresponding to the video signal to the storage capacitor.

A pixel circuit driving method according to a fifth embodiment of the present disclosure is a method for driving a pixel circuit, the pixel circuit including a writing transistor for writing a driving voltage corresponding to a video signal to a storage capacitor and a driving transistor for driving a display section, the driving method including controlling a characteristic of the writing transistor in such a manner as to be operatively associated with a process of writing the driving voltage corresponding to the video signal to the storage capacitor.

In short, the technology disclosed in the present specification controls the characteristic of the writing transistor, and is thus able to adjust the writing capability of the writing transistor. Even when the level of the supplied video signal is the same, the level of the signal written to the storage capacitor is adjusted by controlling the characteristic of the writing transistor. As a result, the writing capability can be adjusted so as to obtain a luminance corresponding to the actually input level of the video signal. Then, the present technology can be used to suppress the “luminance shortage phenomenon” in a case of a high video signal level.

According to the pixel circuit according to the first embodiment, the display device according to the second embodiment, the electronic device according to the third embodiment, and the pixel circuit driving method according to the fourth embodiment, the characteristic of the writing transistor is controlled, whereby a luminance corresponding to an input video signal level can be obtained more reliably even when a field effect transistor having a back gate effect is used for signal writing.

DETAILED DESCRIPTION OF THE PREFERRED EMBODIMENTS

Figure 1:
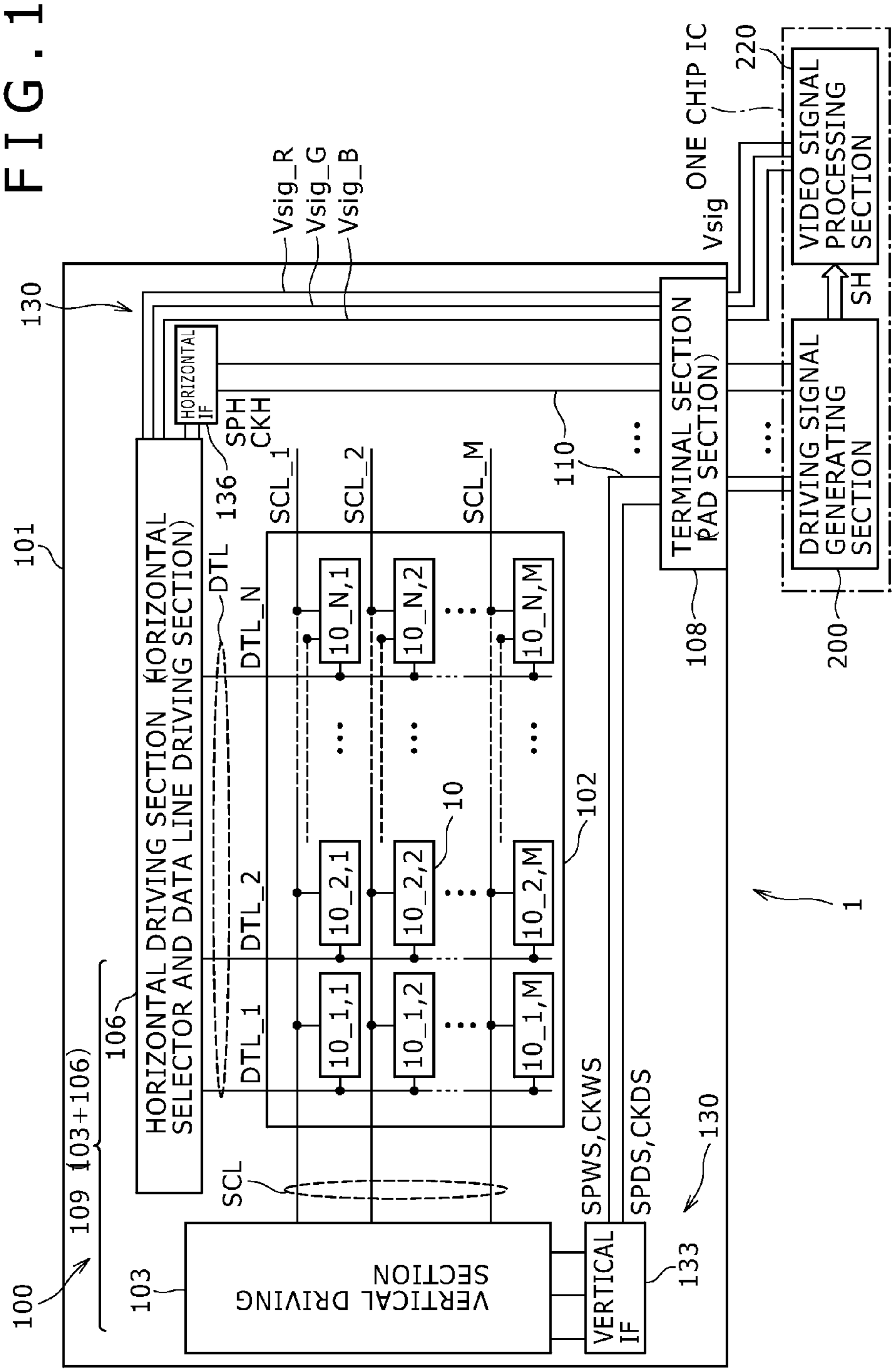
FIG. 1 is a block diagram schematically showing an example of constitution of an active matrix type display device.

Preferred embodiments of the technology disclosed in the present specification will hereinafter be described in detail with reference to the drawings. When each functional element is distinguished by form, each functional element will be described with an alphabetical character, "_n" (n is a number), or a combination thereof as a reference attached to each functional element. The reference will be omitted when each functional element is described without being particularly distinguished. The same is true for the drawings.

Description will be made in the following order.

1. General Outlines
2. Outline of Display Device
3. Light Emitting Element
4. Driving Method: Basics
5. Concrete Examples of Application: Addressing Luminance Shortage Phenomenon Caused by Back Gate Effect First Embodiment: Basics (Controlling Back Gate of Writing Transistor)

Second Embodiment: Coupling Writing Pulse to Back Gate via Capacitance Element

Third Embodiment: Coupling Video Signal to Back Gate via Capacitance Element

Fourth Embodiment: Coupling Writing Pulse to Back Gate via Buffer

Fifth Embodiment: Examples of Application to Electronic Devices

<General Outlines>

Basic points will first be described in the following.

In a constitution of a present embodiment, a pixel circuit, a display device, or an electronic device includes: a display section; a storage capacitor; a writing transistor for writing a driving voltage corresponding to a video signal to the storage capacitor; and a driving transistor for driving the display section on a basis of the driving voltage written to the storage capacitor. In the pixel circuit, the display device, the electronic device, and a method for driving the pixel circuit (or the display device), a characteristic of the writing transistor is controlled in such a manner as to be operatively associated with a process of writing the driving voltage corresponding to the video signal to the storage capacitor. The writing capability of the writing transistor is adjusted by controlling the characteristic of the writing transistor in such a manner as to be operatively associated with signal writing. Thereby, the level of the signal written to the storage capacitor can be adjusted even when the level of the supplied video signal is the same. Because the writing capability can be adjusted so as to obtain a luminance corresponding to the level of the supplied video signal, the luminance corresponding to the level of the supplied video signal can be obtained more reliably even when a field effect transistor having a back gate effect is used for signal writing.

Preferably, the pixel circuit includes a characteristic controlling section for controlling the characteristic of the writing transistor in such a manner as to be operatively associated with the process of writing the driving voltage corresponding to the video signal to the storage capacitor.

In order to achieve "controlling the characteristic of the writing transistor in such a manner as to be operatively associated with the process of writing the driving voltage corresponding to the video signal to the storage capacitor," it suffices specifically to increase the writing capability of the writing transistor in a period of the process of writing the driving voltage corresponding to the video signal to the storage capacitor.

More specifically, the writing capability of the writing transistor is preferably increased simultaneously with a start of the process of writing the driving voltage corresponding to the video signal to the storage capacitor. That is, a great effect is obtained when the writing capability of the writing transistor is increased at a time of a start of signal writing, in particular. It is not necessary to increase the writing capability of the writing transistor throughout the period of the signal writing process.

From an aspect of a transistor characteristic, a threshold voltage of the writing transistor is preferably decreased simultaneously with a start of the process of writing the driving voltage corresponding to the video signal to the storage capacitor. That is, a great effect is obtained when the threshold voltage of the writing transistor is decreased at a time of a start of signal writing, in particular. When the threshold voltage is decreased, the writing capability of the writing transistor can be increased. It is not necessary to decrease the threshold voltage of the writing transistor throughout the period of the signal writing process.

Preferably, a transistor having a characteristic control terminal capable of controlling a threshold voltage is used as the writing transistor. In this case, a control signal for controlling the threshold voltage is supplied to the characteristic control terminal.

A back gate type thin film transistor or a MOSFET (metal oxide film type field effect transistor), for example, is suitably used as the transistor having the characteristic control terminal capable of controlling the threshold voltage. It is particularly preferable to use a MOSFET.

When a transistor having a characteristic control terminal capable of controlling a threshold voltage is used as the writing transistor, a constitution can be adopted as a first example in which a capacitance element is disposed between the characteristic control terminal and a control electrode terminal of the writing transistor, the control electrode terminal of the writing transistor being supplied with a control signal for controlling conduction/non-conduction of the writing transistor.

When a transistor having a characteristic control terminal capable of controlling a threshold voltage is used as the writing transistor, a constitution can be adopted as a second example in which a capacitance element is disposed between the characteristic control terminal and a video signal line for transmitting the video signal.

The first example or the second example preferably includes a time constant adjusting section for adjusting a time constant of the signal supplied to the characteristic control terminal via the capacitance element. The time constant adjusting section can have a resistance element connected to the characteristic control terminal. That is, a resistance element can be provided on a wiring path for the signal supplied to the characteristic control terminal via the capacitance element. The time constant adjusting section is suitably applied when the wiring resistance of the characteristic control terminal has a small resistance value, and coupling via the capacitance element has a small effect. Specifically, when a time constant defined by the capacitance element and the wiring resistance of the characteristic control terminal is small, and a time of supply of coupling voltage is short, an effect of increasing the writing capability of the writing transistor at a time of a start of signal writing can be insufficient. In such a case, a period for increasing the writing capability of the writing transistor at a time of a start of signal writing can be lengthened by increasing the time constant by the time constant adjusting section. In this case, however, a voltage divider circuit is formed between the time constant adjusting section and the wiring resistance of the characteristic control terminal. Thus, the constants of a member (for example a resistance element) forming the time constant adjusting section are preferably set in consideration of a decrease in level of the characteristic control signal supplied to the characteristic control terminal of the writing transistor.

When a transistor having a characteristic control terminal capable of controlling a threshold voltage is used as the writing transistor, a constitution can be adopted as a third example in which a pulse signal corresponding to a control signal for controlling conduction/non-conduction of the writing transistor is supplied to the characteristic control terminal. While the third example is similar to the first example, the third example is different from the first example specifically in that a pulse signal corresponding to a control signal for controlling conduction/non-conduction of the writing transistor is supplied to the characteristic control terminal of the writing transistor via a buffer.

In the third case, the constitution preferably includes at least one of a pulse width adjusting section for adjusting a pulse width of the control signal for controlling the conduction/non-conduction of the writing transistor, the pulse width setting the writing transistor in a conducting state, and supplying the signal to the characteristic control terminal, and an amplitude adjusting section for adjusting an amplitude of the signal supplied to the characteristic control terminal. A similar purpose to that of the first example or the second example, which preferably has a time constant adjusting section, is achieved. A differentiating circuit can be used as the pulse width adjusting section, and a resistance dividing circuit can be used as the amplitude adjusting section. The resistance dividing circuit can employ a constitution in which one terminal of one resistance element is connected to the characteristic control terminal of the writing transistor and the wiring resistance of the characteristic control terminal is used as another resistance element.

The device constitution may include one pixel circuit (display section), or may include a pixel section in which display sections are arranged in a form of lines or in a form of a two-dimensional matrix. In the constitution including the pixel section, a characteristic controlling section preferably controls the characteristic of the writing transistor in each display section. In the constitution including the pixel section in which the display sections are arranged in a form of a two-dimensional matrix, the characteristic controlling section can control the characteristic of the writing transistor in each display element by a scanning process. Incidentally, when the control is performed in each display element, the wells of writing transistors are preferably individually separated from each other. When light emission control is performed on a line-sequential basis, it suffices to separate well potentials (transistor characteristic control signals) in each row (or each column), and it suffices to separate the wells of the writing transistors at least in each row (or each column), though separation of the wells of the writing transistors in each display element is not excluded.

Light emitting elements (display elements) including self-luminous type light emitting sections such as organic electroluminescence light emitting sections, inorganic electroluminescence light emitting sections, LED light emitting sections, and semiconductor laser light emitting sections, for example, can be used as the display section. The display section particularly preferably includes an organic electroluminescence light emitting section.

<Outline of Display Device>

In the following description, the resistance values, capacitance values (capacitances), or the like of circuit constituent members may be represented by the same reference numerals as attached to the members in order to facilitate the understanding of correspondences.

[Basics]

An outline of a display device including light emitting elements will first be described. In the following description of a circuit configuration, "electric connection" will be described simply as "connection." This "electric connection" includes not only direct connection but also connection via another transistor (a typical example thereof is a switching transistor) or another electric element (which is not limited to an active element but may also be a passive element).

The display device includes a plurality of pixel circuits (which may also be referred to simply as pixels). Each of the pixel circuits has a display element (electrooptic element) including a light emitting section and a driving circuit for driving the light emitting section. A light emitting element including a self-luminous type light emitting section such as an organic electroluminescence light emitting section, an inorganic electroluminescence light emitting section, an LED light emitting section, and a semiconductor laser light emitting section, for example, can be used as a display section. Incidentally, a system of a constant-current driving type is employed as a system for driving the light emitting section of the display element. In principle, however, the system is not limited to the constant-current driving type but may also be a constant-voltage driving type.

In an example to be described in the following, an organic electroluminescence light emitting section is included as a light emitting element. More specifically, the light emitting element is an organic electroluminescence element (organic EL element) having a structure formed by laminating a driving circuit and an organic electroluminescence light emitting section (light emitting section ELP) connected to the driving circuit.

The driving circuit for driving the light emitting section ELP includes various circuits. However, the pixel circuits can include a driving circuit of a 5Tr/1C type, a 4Tr/1C type, a 3Tr/1C type, a 2Tr/1C type, or the like. $\alpha$ in an "$\alpha$Tr/1C type" denotes the number of transistors. "1C" denotes that a capacitance section includes one storage capacitor $C_{CS}$ (capacitor). Each of transistors forming the driving circuit is preferably an n-channel type transistor, but is not limited to this. In some cases, a part of the transistors may be a p-channel type. Incidentally, the transistors can be formed on a semiconductor substrate or the like. The structure of the transistors forming the driving circuit is not specifically limited, but an insulated gate field effect transistor typified by a MOS type FET (generally a thin film transistor (TFT)) can be used. Further, the transistors forming the driving circuit may be either of an enhancement type and a depletion type, or may be either of a single gate type or a dual gate type.

In any of the constitutions, the display device basically includes a light emitting section ELP, a driving transistor $TR_D$, a writing transistor $TR_W$ (referred to also as a sampling transistor), a vertical scanning section including at least a writing scanning section, a horizontal driving section having a function of a signal output section, and a storage capacitor $C_{CS}$, as in the case of a 2Tr/1C type as a smallest constituent element. Preferably, in order to form a bootstrap circuit, the storage capacitor $C_{CS}$ is connected between a control input terminal (gate terminal) of the driving transistor $TR_D$ and one (typically a source terminal) of main electrode terminals (source/drain regions) of the driving transistor $TR_D$. One of the main electrode terminals of the driving transistor $TR_D$ is connected to the light emitting section ELP, and the other of the main electrode terminals of the driving transistor $TR_D$ is connected to a power supply line PWL. The power supply line PWL is supplied with a power supply voltage (a steady-state voltage or a voltage in a pulse form) from a power supply circuit, a scanning circuit for the power supply voltage, or the like.

The horizontal driving section supplies a video signal line DTL (referred to also as a data line) with a video signal VS in a broad sense which video signal represents a video signal $V_{sig}$ for controlling luminance in the light emitting section ELP and a reference potential (which is not necessarily one kind) used for threshold value correction and the like. One of main electrode terminals of the writing transistor $TR_W$ is connected to the video signal line DTL, and the other of the main electrode terminals of the writing transistor $TR_W$ is connected to the control input terminal of the driving transistor $TR_D$. The writing scanning section supplies a control pulse (writing driving pulse WS) for on/off control of the writing transistor $TR_W$ to the control input terminal of the writing transistor $TR_W$ via a writing scanning line WSL. A point of connection between the other terminal of the main electrode terminals of the writing transistor $TR_W$, the control input terminal of the driving transistor $TR_D$, and one terminal of the storage capacitor $C_{CS}$ will be referred to as a first node $ND_1$. A point of connection between one of the main electrode terminals of the driving transistor $TR_D$ and another terminal of the storage capacitor $C_{CS}$ will be referred to as a second node $ND_2$.

[Example of Constitution]

Figure 2:
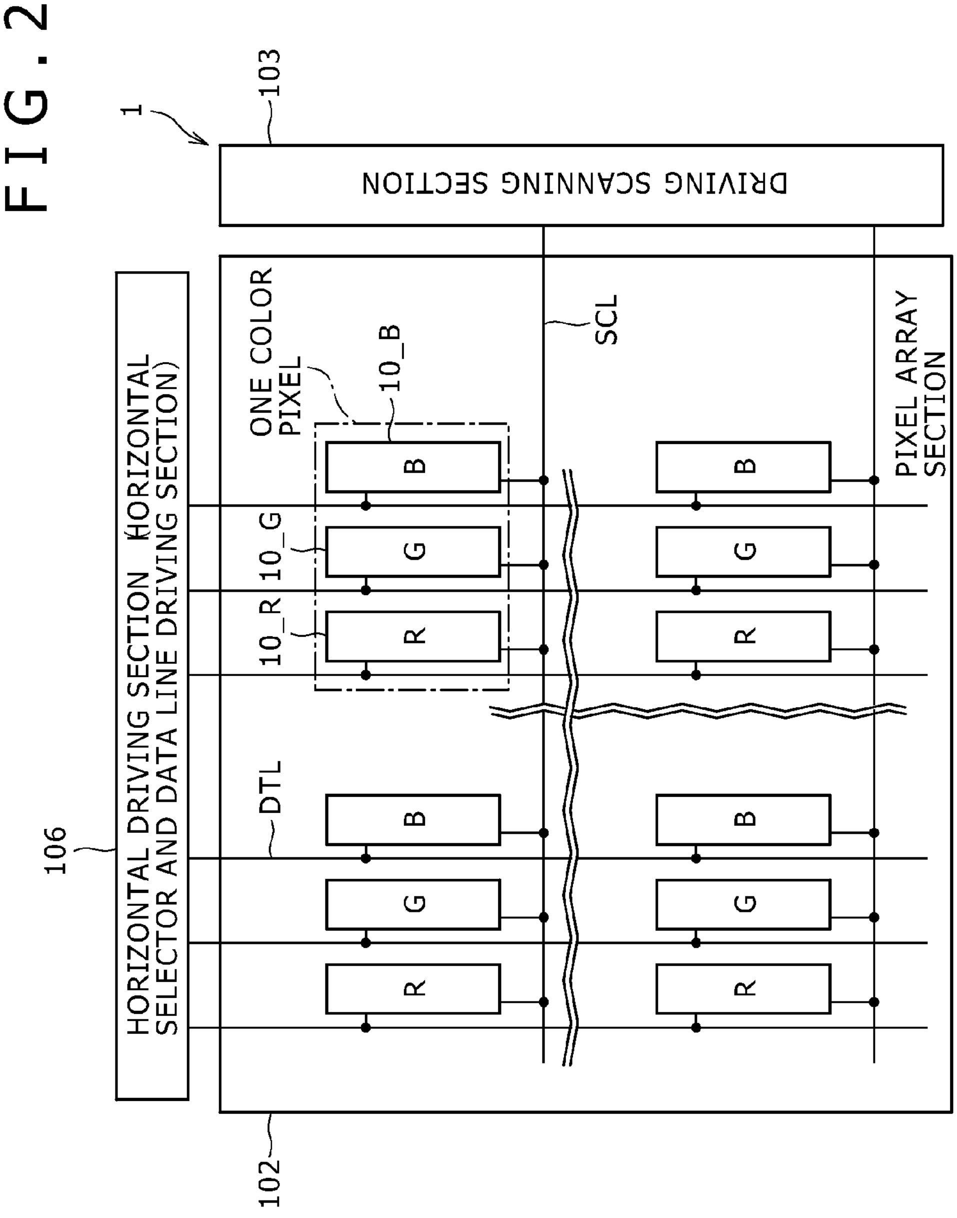
FIG. 2 is a block diagram schematically showing an example of constitution of an active matrix type display device capable of color image display.

FIG. 1 and FIG. 2 are block diagrams showing outlines of an example of constitution of an active matrix type display device as an embodiment of a display device according to the present disclosure. FIG. 1 is a block diagram showing outlines of a constitution of an ordinary active matrix type display device. FIG. 2 is a block diagram showing outlines of the display device in a case where provision for color image display is made.

As shown in FIG. 1, a display device 1 includes: a display panel block 100 in which pixel circuits 10 (referred to also as pixels) having organic EL elements (not shown) as a plurality of display elements are arranged so as to form an effective video region with an aspect ratio as a display aspect ratio of X:Y (for example 9:16); a driving signal generating section 200 (so-called timing generator) as an example of a panel control portion generating various pulse signals for driving-controlling the display panel block 100; and a video signal processing section 220. The driving signal generating section 200 and the video signal processing section 220 are included in a one-chip IC (Integrated Circuit), and are disposed on the outside of the display panel block 100 in the present example.

Incidentally, as for product forms, the display device 1 is not limited to being provided as the display device 1 in a module (composite part) form including all of the display panel block 100, the driving signal generating section 200, and the video signal processing section 220 as shown in the figures, but the display panel block 100 alone, for example, may be provided as the display device 1. In addition, the display device 1 also includes a display device in a modular form of a sealed constitution. For example, a display module formed by laminating a counter part of a transparent glass or the like to a pixel array section 102 corresponds to such a display device. The transparent counter part may be provided with a color filter, a protective film, a light shielding film, and the like. The display module may be provided with a circuit section, an FPC (flexible printed circuit), and the like for inputting or outputting the video signal Vsig and various driving pulses from the outside to the pixel array section 102.

Such a display device 1 can be used as a display section in various electronic devices, that is, electronic devices in all fields that display a video signal input to the electronic devices or a video signal generated within the electronic devices as a still image or a moving image (video), such for example as portable type music players using recording media including semiconductor memories, minidiscs (MDs), cassette tapes, and the like, digital cameras, notebook personal computers, portable terminal devices including portable telephones and the like, and video cameras.

The display panel block 100 includes the pixel array section 102 in which the pixel circuits 10 are arranged in the form of a matrix of M rows×N columns, a vertical driving section 103 for scanning the pixel circuits 10 in a vertical direction, a horizontal driving section 106 (referred to also as a horizontal selector or a data line driving section) for scanning the pixel circuits 10 in a horizontal direction, an interface portion 130 (IF) for interfacing between each driving section (the vertical driving section 103 and the horizontal driving section 106) and an external circuit, a terminal section 108 (pad section) for external connection, and the like, the pixel array section 102, the vertical driving section 103, the horizontal driving section 106, the interface portion 130, the terminal section 108, and the like being integrated and formed on a substrate 101. That is, peripheral driving circuits such as the vertical driving section 103, the horizontal driving section 106, the interface portion 130, and the like are formed on the same substrate 101 as the pixel array section 102. A light emitting element (pixel circuit 10) located in an mth row (m=1, 2, 3, . . . , M) and an nth column (n=1, 2, 3, . . . , N) is denoted by 10_N, M in FIG. 1.

The interface portion 130 has a vertical IF section 133 for interfacing between the vertical driving section 103 and the external circuit and a horizontal IF section 136 for interfacing between the horizontal driving section 106 and the external circuit.

The vertical driving section 103 and the horizontal driving section 106 form a control portion 109 for controlling the writing of a signal potential to the storage capacitor, threshold value correcting operation, mobility correcting operation, and bootstrap operation. A driving control circuit for driving-controlling the pixel circuits 10 in the pixel array section 102 is formed including the control portion 109 and the interface portion 130 (the vertical IF section 133 and the horizontal IF section 136).

In the case of the 2Tr/1C type, the vertical driving section 103 includes a writing scanning section (write scanner WS; Write Scan) and a driving scanning section (drive scanner DS; Drive Scan) functioning as a power supply scanner having a power supply capability. As an example, the pixel array section 102 is driven by the vertical driving section 103 from one side or both sides in the horizontal direction of FIG. 1, and is driven by the horizontal driving section 106 from one side or both sides in the vertical direction of FIG. 1.

The terminal section 108 is supplied with various pulse signals from the driving signal generating section 200 disposed on the outside of the display device 1. The terminal section 108 is similarly supplied with the video signal $V_{sig}$ from the video signal processing section 220. When provision for color display is made, the terminal section 108 is supplied with a video signal $V_{sig\_R}$, a video signal $V_{sig\_G}$, and a video signal $V_{sig\_B}$ for different colors (three primary colors of R (red), G (green), and B (blue) in the present example).

As an example, necessary pulse signals such as a shift start pulse SP (two kinds, that is, SPDS and SPWS in FIG. 1) as an example of a scanning start pulse in the vertical direction and a vertical scanning clock CK (two kinds, that is, CKDS and CKWS in FIG. 1), a vertical scanning clock xCK (two kinds, that is, xCKDS and xCKWS in FIG. 1) inverted in phase as required, and an enable pulse for indicating pulse output in specific timing are supplied as pulse signals for vertical driving. Necessary pulse signals such as a horizontal start pulse SPH as an example of a scanning start pulse in the horizontal direction and a horizontal scanning clock CKH, a horizontal scanning clock xCKH inverted in phase as required, and an enable pulse for indicating pulse output in specific timing are supplied as pulse signals for horizontal driving.

Each terminal of the terminal section 108 is connected to the vertical driving section 103 and the horizontal driving section 106 via wiring 110. For example, each pulse supplied to the terminal section 108 is internally adjusted in voltage level by a level shifter section not shown in the figures as required, and thereafter supplied to each part of the vertical driving section 103 and the horizontal driving section 106 via a buffer.

Though not shown (as will be described later in detail), in the pixel array section 102, the pixel circuits 10 having a pixel transistor provided for an organic EL element as a display element are arranged two-dimensionally in the form of a matrix. A vertical scanning line SCL is arranged for each row of the pixel arrangement, and a video signal line DTL is arranged for each column of the pixel arrangement. That is, the pixel circuits 10 are connected to the vertical driving section 103 via the vertical scanning line SCL, and are connected to the horizontal driving section 106 via the video signal line DTL. Specifically, vertical scanning lines SCL_1 to SCL_M for m rows driven by the vertical driving section 103 by a driving pulse are arranged for each pixel row of the pixel circuits 10 arranged in the form of a matrix. The vertical driving section 103 is formed by a combination of logic gates (including latches, shift registers, and the like). The vertical driving section 103 selects the pixel circuits 10 of the pixel array section 102 in row units, that is, sequentially selects the pixel circuits 10 via the vertical scanning line SCL on the basis of the pulse signals of a vertical driving system which pulse signals are supplied from the driving signal generating section 200. The horizontal driving section 106 is formed by a combination of logic gates (including latches, shift registers, and the like). The horizontal driving section 106 selects the pixel circuits 10 of the pixel array section 102 in column units, that is, makes the selected pixel circuits 10 sample a predetermined potential (for example the level of the video signal $V_{sig}$) of the video signal VS via the video signal line DTL and write the potential to the storage capacitors $C_{CS}$ on the basis of the pulse signals of a horizontal driving system which pulse signals are supplied from the driving signal generating section 200.

The display device 1 according to the present embodiment is capable of line-sequential driving or dot-sequential driving. A writing scanning section 104 and a driving scanning section 105 of the vertical driving section 103 scan the pixel array section 102 on a line-sequential basis (that is, in row units), and in synchronism with this, the horizontal driving section 106 writes image signals for one horizontal line to the pixel array section 102 simultaneously (in the case of line-sequential driving) or in pixel units (in the case of dot-sequential driving).

In order to be capable of color image display, as shown in FIG. 2, for example, the pixel array section 102 has pixel circuits $\mathbf{10}_R$, pixel circuits $\mathbf{10}_G$, and pixel circuits $\mathbf{10}_B$ in the form of vertical stripes in predetermined arrangement order as sub-pixels for different colors (three primary colors of R (red), G (green), and B (blue) in the present example). One set of sub-pixels for the different colors forms one color pixel. While a stripe structure in which the sub-pixels of the respective colors are arranged in the form of vertical stripes is shown in this case as an example of a sub-pixel layout, the sub-pixel layout is not limited to such an example of arrangement. A form in which the sub-pixels are shifted in the vertical direction may also be adopted.

Incidentally, while FIG. 1 and FIG. 2 show a constitution having the vertical driving section 103 (specifically constituent elements of the vertical driving section 103) arranged only on one side of the pixel array section 102, the elements of the vertical driving section 103 can be arranged on both of a left side and a right side with the pixel array section 102 interposed therebetween. In addition, one and another of the elements of the vertical driving section 103 can be arranged on the respective left and right sides. Similarly, while FIG. 1 and FIG. 2 show a constitution having the horizontal driving section 106 arranged only on one side of the pixel array section 102, the horizontal driving section 106 can be arranged on both of an upper side and a lower side with the pixel array section 102 interposed therebetween. While the pulse signals such as the vertical shift start pulse, the vertical scanning clock, the horizontal start pulse, and the horizontal scanning clock are input from the outside of the display panel block 100 in the present example, the driving signal generating section 200 for generating these various kinds of timing pulses can be mounted on the display panel block 100.

The constitution shown in the figures only represents one form of the display device. Other forms can be taken as product forms. That is, it suffices for the whole of the display device to be formed including a pixel array section having elements forming pixel circuits 10 arranged in the form of a matrix, a control portion arranged on the periphery of the pixel array section and including, as main parts, scanning sections connected to scanning lines for driving each pixel, and a driving signal generating section and a video signal processing section for generating various kinds of signals for operating the control portion. As a product form, not only the form as shown in the figures can be adopted in which the display panel block having the pixel array section and the control portion mounted on the same substrate (for example a glass substrate) is separate from the driving signal generating section and the video signal processing section (which form will be referred to as an on-panel arrangement constitution), but also a form can be adopted in which the pixel array section is mounted in the display panel block, and the peripheral circuits such as the control portion, the driving signal generating section, and the video signal processing section are mounted on a substrate separate from the display panel block (for example a flexible board) (which form will be referred to as a peripheral circuit outside-of-panel arrangement constitution). In addition, in the case of the on-panel arrangement constitution in which the display panel block is formed by mounting the pixel array section and the control portion on the same substrate, a form can be adopted in which each transistor for the control portion (as well as the driving signal generating section and the video signal processing section as required) is formed simultaneously in a process of forming TFTs for the pixel array section (which form will be referred to as a transistor integral constitution), and a form can be adopted in which a semiconductor chip for the control portion (as well as the driving signal generating section and the video signal processing section as required) is directly mounted on the substrate having the pixel array section mounted thereon by a COG (Chip On Glass) mounting technology (which form will be referred to as a COG mounting constitution). Alternatively, only the display panel block (including at least the pixel array section) can be provided as a display device.

<Light Emitting Element>

Figure 3A:
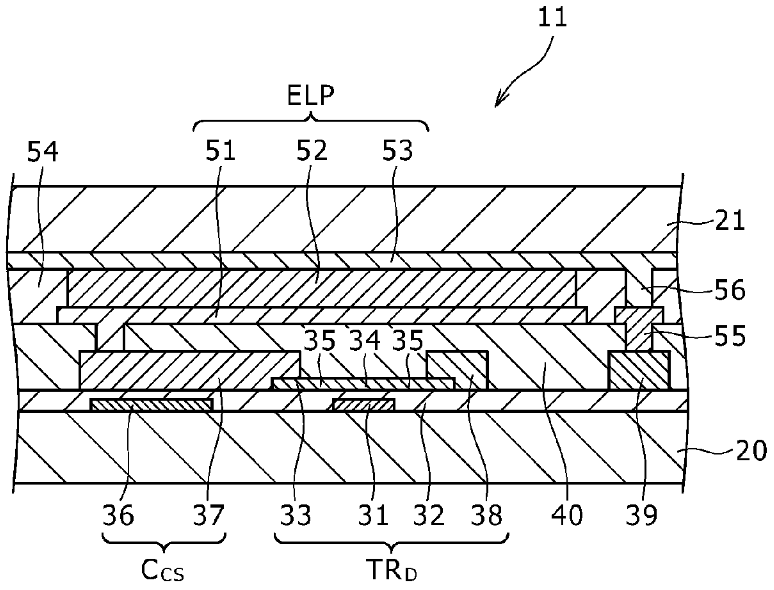
FIGS. 3A and 3B are diagrams of assistance in explaining a light emitting element (pixel circuit in effect)
Figure 3B:
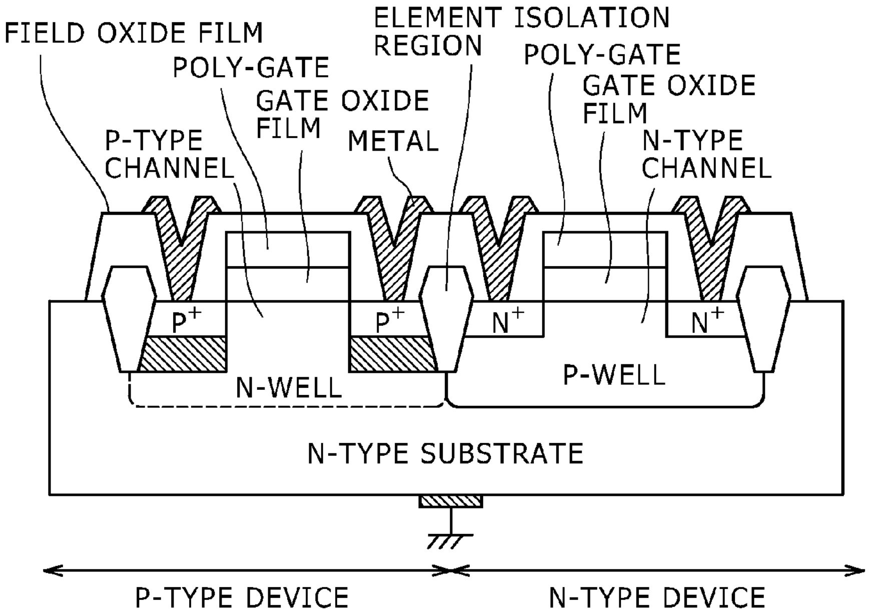

FIGS. 3A and 3B are diagrams of assistance in explaining a light emitting element 11 including a driving circuit (a pixel circuit 10 in effect). FIG. 3A is a schematic fragmentary sectional view of a part of the light emitting element 11 (pixel circuit 10). FIG. 3B is a sectional view of an example of structure of a MOS transistor. Suppose that an insulated gate field effect transistor in FIG. 3A is a thin film transistor (TFT). However, as will be described in examples to be described later, in the present embodiment, a so-called back gate type thin film transistor or a MOS transistor as shown in FIG. 3B is desirably used at least as the writing transistor $TR_W$. A MOS type as shown in FIG. 3B is particularly suitably used as the writing transistor $TR_W$. This is because a thin film transistor of a back gate type structure involves a complex manufacturing process (or is difficult to manufacture), whereas in a MOS type as shown in FIG. 3B, a semiconductor substrate or a well functions as a back gate (referred to also as a bulk) in the first place.

As shown in FIG. 3A, each transistor and a capacitance part (storage capacitor $C_{CS}$) forming the driving circuit for the light emitting element 11 are formed on a support 20, and a light emitting section ELP is formed above each transistor and the storage capacitor $C_{CS}$ forming the driving circuit with an interlayer insulating layer 40 interposed between the light emitting section ELP and each transistor and the storage capacitor $C_{CS}$, for example. One of source/drain regions of the driving transistor $TR_D$ is connected to an anode electrode provided to the light emitting section ELP via a contact hole. FIGS. 3A and 3B show only the driving transistor $TR_D$. A writing transistor $TR_W$ and other transistors are hidden from view. The light emitting section ELP has a well-known constitution and structure including for example the anode electrode, a hole transporting layer, a light emitting layer, an electron transporting layer, and a cathode electrode.

Specifically, the driving transistor $TR_D$ includes a gate electrode 31, a gate insulating layer 32, a semiconductor layer 33, source/drain regions 35 disposed in the semiconductor layer 33, and a channel forming region 34 to which a part of the semiconductor layer 33 between the source/drain regions 35 corresponds. The storage capacitor $C_{CS}$ is composed of another electrode 36, a dielectric layer formed by an extending part of the gate insulating layer 32, and one electrode 37 (corresponding to the second node $ND_2$). The gate electrode 31, a part of the gate insulating layer 32, and the other electrode 36 forming the storage capacitor $C_{CS}$ are formed on the support 20. One of the source/drain regions 35 of the driving transistor $TR_D$ is connected to wiring 38. The other source/drain region 35 is connected to the one electrode 37. The driving transistor $TR_D$, the storage capacitor $C_{CS}$, and the like are covered with the interlayer insulating layer 40. The light emitting section ELP composed of the anode electrode 51, the hole transporting layer, the light emitting layer, the electron transporting layer, and the cathode electrode 53 is disposed on the interlayer insulating layer 40. In FIG. 3A, the hole transporting layer, the light emitting layer, and the electron transporting layer are represented by one layer 52. A second interlayer insulating layer 54 is disposed on a part of the interlayer insulating layer 40 on which part the light emitting section ELP is not disposed. A transparent substrate 21 is disposed on the second interlayer insulating layer 54 and the cathode electrode 53. Light generated in the light emitting layer is transmitted by the substrate 21, and emitted to the outside. The one electrode 37 and the anode electrode 51 are connected to each other by a contact hole disposed in the interlayer insulating layer 40. The cathode electrode 53 is connected to wiring 39 disposed on an extending part of the gate insulating layer 32 via a contact hole 56 and a contact hole 55 disposed in the second interlayer insulating layer 54 and the interlayer insulating layer 40.

When the TFT is a MOS transistor in the constitution shown in FIG. 3A, as shown in FIG. 3B, a gate (narrow region channel) is formed on the surface of a semiconductor substrate of a first polarity (a P-type or an N-type (N-type in FIG. 3B)), and a gate terminal is attached so as to cover the channel with an oxide film (referred to specifically as a gate oxide film) interposed between the gate terminal and the channel. Polysilicon, for example, can be used as a material for the gate terminal, and is referred to specifically as a poly-gate. Further, an oxide film (referred to specifically as a field oxide film) is formed so as to cover the whole including the gate terminal, and thereafter respective terminals of a source region and a drain region of a second polarity (P-type in this case) different from the first polarity (a source terminal and a drain terminal, respectively) are attached as a metallic material at both ends of the gate terminal. Thereby, a MOS transistor of the second polarity (P-type in this case) (PMOS) (P-type device) is formed in the surface layer of the semiconductor substrate of the first polarity (N-type). A back gate in the P-type device of this structure is the N-type substrate, and is not separated individually. The supply of a control signal with P-type devices separated individually or in each row (or each column) may not be performed, but a control signal common to all the P-type devices of the pixel array section 102 can be supplied. In order to form a MOS transistor of the first polarity (N-type in this case) (NMOS) (N-type device) in the surface layer of a semiconductor substrate of the first polarity (N-type), it suffices to form a well of the second polarity (P-type) in the surface of the semiconductor substrate of the first polarity (N-type), and thereafter similarly form a gate region, a source region, a drain region, and the like treating the well (P-well) as a semiconductor substrate of the second polarity (P-type). Wells of the second polarity (P-type) in N-type devices of this structure can be separated individually or in each row (or each column), and thus well potentials (transistor characteristic control signal Vb) can be separated individually or for each row (or each column). Incidentally, in forming a MOS transistor of the second polarity (P-type in this case) (PMOS) (P-type device) in the surface layer of a semiconductor substrate of the first polarity (N-type), a well of the first polarity (N-type) may be formed in the surface of the semiconductor substrate of the first polarity (N-type) (see a broken line in FIG. 3B), and thereafter a gate region, a source region, a drain region, and the like may be similarly formed with the well (N-well) treated as a semiconductor substrate of the first polarity (N-type). Then, wells of the first polarity (N-type) in P-type devices of this structure can be separated individually or in each row (or each column), and thus well potentials (transistor characteristic control signal Vb) can be separated individually or for each row (or each column). The P-type device (PMOS) and the N-type device (NMOS) are separated from each other by an element isolation region.

<Driving Method: Basics>

A method of driving the light emitting section will be described in the following. In order to facilitate understanding, description will be made supposing that each transistor forming the pixel circuit 10 is formed by an n-channel type transistor. In addition, suppose that the anode terminal of the light emitting section ELP is connected to the second node $ND_2$, and that the cathode terminal of the light emitting section ELP is connected to cathode wiring cath (suppose that the potential of the cathode wiring cath is a cathode potential $V_{cath}$). Further, a light emitting state (luminance) in the light emitting section ELP is controlled according to the magnitude of the value of a drain current $I_{ds}$. In the light emitting state of the light emitting element, of the two main electrode terminals (source/drain regions) of the driving transistor $TR_D$, one (anode side of the light emitting section ELP) functions as a source terminal (source region), and the other functions as a drain terminal (drain region). Suppose that the display device is capable of color display, and includes (N/3)×M pixel circuits 10 arranged in the form of a two-dimensional matrix, and that one pixel circuit forming one unit of color display includes three sub-pixel circuits (a red light emitting pixel circuit $\mathbf{10}_R$ for emitting red light, a green light emitting pixel circuit $\mathbf{10}_G$ for emitting green light, and a blue light emitting pixel circuit $\mathbf{10}_B$ for emitting blue light). Suppose that the light emitting elements forming the respective pixel circuits 10 are driven on a line-sequential basis, and that a display frame rate is FR (times/second). That is, (N/3) pixel circuits 10 arranged in an mth row (where m=1, 2, 3, . . . , M), more specifically the light emitting elements forming N pixel circuits 10, respectively, are driven simultaneously. In other words, timing of emission/non-emission of light emitting elements forming one row is controlled in a row unit to which these light emitting elements belong. Incidentally, a process of writing a video signal to pixel circuits 10 forming one row may be a process of writing the video signal to all the pixel circuits 10 simultaneously (which process will be referred to also as a simultaneous writing process), or may be a process of writing the video signal to each pixel circuit 10 sequentially (which process will be referred to also as a sequential writing process). It suffices to appropriately select one of the writing processes according to the constitution of the driving circuit.

A driving operation relating to a light emitting element (pixel circuit 10) located in an mth row and an nth column (where n=1, 2, 3, . . . , N) will be described in the following. Incidentally, the light emitting element located in the mth row and the nth column will be referred to also as an (n, m)th light emitting element or an (n, m)th light emitting element pixel circuit. Various processes (a threshold value correcting process, a writing process, a mobility correcting process, and the like) are performed before an end of a horizontal scanning period for each light emitting element arranged in the mth row (mth horizontal scanning period). Incidentally, the writing process and the mobility correcting process need to be performed within the mth horizontal scanning period. On the other hand, depending on the type of the driving circuit, the threshold value correcting process and a pre-process accompanying the threshold value correcting process can be performed prior to the mth horizontal scanning period.

After the various processes described above are all completed, the light emitting section forming each light emitting element arranged in the mth row is made to emit light. Incidentally, the light emitting section may be made to emit light immediately after the various processes are all completed, or the light emitting section may be made to emit light when a predetermined period (for example horizontal scanning periods for a predetermined number of rows) has passed after the completion of all of the various processes. It suffices to set the “predetermined period” appropriately according to specifications of the display device, the constitution of the pixel circuit 10 (that is, the driving circuit), and the like. In the following, for the convenience of description, suppose that the light emitting section is made to emit light immediately after the completion of the various processes. The light emission of the light emitting section forming each light emitting element arranged in the mth row is continued until immediately before a start of a horizontal scanning period for each light emitting element arranged in an (m+m')th row. It suffices to determine "m'" according to the design specifications of the display device. That is, the light emission of the light emitting section forming each light emitting element arranged in the mth row in a certain display frame is continued until an (m+m'−1)th horizontal scanning period. On the other hand, the light emitting section forming each light emitting element arranged in the mth row maintains a non-emission state in principle from a start of an (m+m')th horizontal scanning period to the completion of the writing process and the mobility correcting process within the mth horizontal scanning period in a next display frame. Providing the period of the non-emission state (which period will be referred to also as a non-emission period) reduces an afterimage blur attendant on active matrix driving, and thus achieves better moving image quality. However, the emission state/non-emission state of each pixel circuit 10 (light emitting element) is not limited to the states described above. The time length of a horizontal scanning period is less than (1/FR)×(1/M) seconds. When the value of (m+m') exceeds M, horizontal scanning periods for the excess are handled in the next display frame.

The on state (conducting state) of a transistor refers to a state of a channel being formed between the main electrode terminals (source/drain regions) of the transistor regardless of whether a current is flowing from one main electrode terminal to the other main electrode terminal. The off state (non-conducting state) of the transistor refers to a state of no channel being formed between the main electrode terminals of the transistor. A state of a main electrode terminal of a certain transistor being connected to a main electrode terminal of another transistor includes a form in which a source/drain region of the certain transistor and a source/drain region of the other transistor occupy a same region. Further, source/drain regions not only can be formed of a conductive substance such as polysilicon or amorphous silicon containing an impurity, or the like, but also can be formed of a layer made of a metal, an alloy, conductive particles, a laminated structure thereof, or an organic material (conductive polymer). In timing charts to be used in the following description, the length (time length) of an axis of abscissas indicating each period is schematic, and does not represent the ratio of a time length of each period.

A method of driving the pixel circuit 10 includes a pre-process step, a threshold value correcting process step, a video signal writing process step, a mobility correcting step, and an emission step. The pre-process step, the threshold value correcting process step, the video signal writing process step, and the mobility correcting step will also be referred to collectively as a non-emission step. Depending on the constitution of the pixel circuit 10, the video signal writing process step and the mobility correcting step may be performed simultaneously. An outline of each of the steps will be described.

Incidentally, the driving transistor $TR_D$ in a light emitting state of the light emitting element is driven so as to pass a drain current $I_{ds}$ according to the following Equation (1). The drain current $I_{ds}$ flows through the light emitting section ELP, whereby the light emitting section ELP emits light. Further, the light emitting state (luminance) in the light emitting section ELP is controlled according to the magnitude of the value of the drain current $I_{ds}$. In the light emitting state of the light emitting element, of the two main electrode terminals (source/drain regions) of the driving transistor $TR_D$, one (anode terminal side of the light emitting section ELP) functions as a source terminal (source region), and the other functions as a drain terminal (drain region). For the convenience of description, in the following description, one of the main electrode terminals of the driving transistor $TR_D$ may be referred to simply as a source terminal, and the other main electrode terminal may be referred to simply as a drain terminal.

$$I_{ds}=k\cdot\mu\cdot(V_{gs}-V_{th})^2 \tag{1}$$

where k is a coefficient k≡(½)·(W/L)·$C_{OX}$, L being a channel length, W being a channel width, and $C_{OX}$ being an equivalent capacitance ((Relative Dielectric Constant of Gate Insulating Layer)×(Dielectric Constant of Vacuum)/(Thickness of Gate Insulating Layer)), μ is an effective mobility, $V_{gs}$ is a potential difference (gate-to-source voltage) between the potential of a control electrode terminal (gate potential $V_g$) and the potential of the source terminal (source potential $V_s$), and $V_{th}$ is a threshold voltage.

In the following description, unless otherwise specified, suppose that the capacitance $C_{el}$ of a parasitic capacitance of the light emitting section ELP is a sufficiently large value as compared with the capacitance $C_{CS}$ of the storage capacitor $C_{CS}$ and a gate-to-source capacitance $C_{gs}$ as an example of a parasitic capacitance of the driving transistor $TR_D$, and no consideration is given to a change in potential of the source region of the driving transistor $TR_D$ (second node $ND_2$) (source voltage $V_s$) on the basis of a change in potential of the gate terminal of the driving transistor $TR_D$ (gate potential $V_g$).

[Pre-Process Step]

A first node initializing voltage ($V_{ofs}$) is applied to the first node $ND_1$ and a second node initializing voltage ($V_{ini}$) is applied to the second node $ND_2$ such that a potential difference between the first node $ND_1$ and the second node $ND_2$ exceeds the threshold voltage $V_{th}$ of the driving transistor $TR_D$ and a potential difference between the second node $ND_2$ and the cathode electrode provided to the light emitting section ELP does not exceed the threshold voltage $V_{thEL}$ of the light emitting section ELP. Suppose for example that a video signal $V_{sig}$ for controlling luminance in the light emitting section ELP is 0 to 10 volts, that a power supply voltage $V_{cc}$ is 20 volts, that the threshold voltage $V_{th}$ of the driving transistor $TR_D$ is 3 V, that a cathode potential $V_{cath}$ is 0 volts, and that the threshold voltage $V_{thEL}$ of the light emitting section ELP is 3 volts. In this case, suppose that the potential $V_{ofs}$ for initializing the potential of the control input terminal of the driving transistor $TR_D$ (the gate potential $V_g$, that is, the potential of the first node $ND_1$) is 0 volts, and that the potential $V_{ini}$ for initializing the potential of the source terminal of the driving transistor $TR_D$ (the source potential $V_s$, that is, the potential of the second node $ND_2$) is −10 volts.

[Threshold Value Correcting Process Step]

In a state of the potential of the first node $ND_1$ being maintained, the drain current $I_{ds}$ is passed through the driving transistor $TR_D$, and the potential of the second node $ND_2$ is changed toward a potential obtained by subtracting the threshold voltage $V_{th}$ of the driving transistor $TR_D$ from the potential of the first node $ND_1$. At this time, a voltage (for example a power supply voltage at a time of light emission) exceeding a voltage obtained by adding the threshold voltage $V_{th}$ of the driving transistor $TR_D$ to the potential of the second node $ND_2$ after the pre-process step is applied to the other main electrode terminal (on the opposite side from the second node $ND_2$) of the driving transistor $TR_D$. A degree by which the potential difference between the first node $ND_1$ and the second node $ND_2$ (or the gate-to-source voltage $V_{gs}$ of the driving transistor $TR_D$) approaches the threshold voltage $V_{th}$ of the driving transistor $TR_D$ in the threshold value correcting process step depends on the time of the threshold value correcting process. Hence, when a sufficiently long time of the threshold value correcting process is secured, for example, the potential of the second node $ND_2$ reaches a potential obtained by subtracting the threshold voltage $V_{th}$ of the driving transistor $TR_D$ from the potential of the first node $ND_1$, and the driving transistor $TR_D$ is set in an off state. On the other hand, when the time of the threshold value correcting process needs to be set short, for example, the potential difference between the first node $ND_1$ and the second node $ND_2$ may be larger than the threshold voltage $V_{th}$ of the driving transistor $TR_D$, and the driving transistor $TR_D$ may not be set in an off state. The driving transistor $TR_D$ does not necessarily need to be set in an off state as a result of the threshold value correcting process. Incidentally, in the threshold value correcting process step, preferably, the light emitting section ELP is prevented from emitting light by selecting and determining the potentials so as to satisfy Equation (2).

$$(V_{ofs}-V_{th})<(V_{thEL}+V_{cath}) \quad (2)$$

[Video Signal Writing Process Step]

A video signal $V_{sig}$ is applied from the video signal line DTL to the first node $ND_1$ via the writing transistor $TR_W$ set in an on state by a writing driving pulse WS from the writing scanning line WSL, and the potential of the first node $ND_1$ is raised to $V_{sig}$. A charge based on a change in potential of the first node $ND_1$ ($V_{in}=V_{sig}-V_{ofs}$) is distributed to the storage capacitor $C_{CS}$, the parasitic capacitance $C_{el}$ of the light emitting section ELP, and the parasitic capacitance (for example the gate-to-source capacitance $C_{gs}$) of the driving transistor $TR_D$. When the capacitance $C_{el}$ is a sufficiently large value as compared with the capacitance $C_{CS}$ and the capacitance $C_{gs}$ such as the gate-to-source capacitance $C_{gs}$ or the like, a change in potential of the second node $ND_2$ on the basis of the potential change ($V_{sig}-V_{ofs}$) is small. In general, the capacitance $C_{el}$ of the parasitic capacitance $C_{el}$ of the light emitting section ELP is larger than the capacitance $C_{CS}$ of the storage capacitor $C_{CS}$ and the capacitance $C_{gs}$ of the gate-to-source capacitance $C_{gs}$. In consideration of this, unless there is a particular need, a change in potential of the second node $ND_2$ which change is caused by a change in potential of the first node $ND_1$ is not taken into account. In this case, the gate-to-source voltage $V_{gs}$ can be expressed by Equation (3).

$$V_g=V_{sig}$$

$$V_s \approx V_{ofs}-V_{th}$$

$$V_{gs} \approx V_{sig}-(V_{ofs}-V_{th}) \quad (3)$$

[Mobility Correcting Process Step]

A current is supplied to the storage capacitor $C_{CS}$ via the driving transistor $TR_D$ while the video signal $V_{sig}$ is supplied to one terminal of the storage capacitor $C_{CS}$ via the writing transistor $TR_W$ (that is, while a driving voltage corresponding to the video signal $V_{sig}$ is written to the storage capacitor $C_{CS}$). For example, power is supplied to the driving transistor $TR_D$ to feed the drain current $I_{ds}$, so that the potential of the second node $ND_2$ is changed, in a state of the video signal $V_{sig}$ being supplied from the video signal line DTL to the first node $ND_1$ via the writing transistor $TR_W$ set in an on state by the writing driving pulse WS from the writing scanning line WSL. After the passage of a predetermined period, the writing transistor $TR_W$ is set in an off state. Suppose that a change in potential of the second node $ND_2$ at this time is ΔV (=Potential Correction Value or Amount of Negative Feedback). It suffices to determine the predetermined period for performing the mobility correcting process as a design value in advance at a time of design of the display device. Incidentally, at this time, preferably, the mobility correcting period is determined so as to satisfy Equation (2A). This prevents the light emitting section ELP from emitting light during the mobility correcting period.

$$(V_{ofs}-V_{th}+\Delta V)<(V_{thEL}+V_{cath}) \quad (2A)$$

When the mobility μ of the driving transistor $TR_D$ is a large value, the potential correction value ΔV is increased. When the mobility μ of the driving transistor $TR_D$ is a small value, the potential correction value ΔV is decreased. The gate-to-source voltage $V_{gs}$ of the driving transistor $TR_D$ (that is, the potential difference between the first node $ND_1$ and the second node $ND_2$) at this time can be expressed by Equation (4). The gate-to-source voltage $V_{gs}$ defines luminance at a time of light emission. The potential correction value ΔV is proportional to the drain current $I_{ds}$ of the driving transistor $TR_D$, and the drain current $I_{ds}$ is proportional to the mobility μ. Consequently, the higher the mobility μ, the larger the potential correction value ΔV. Thus, a variation in mobility μ in each pixel circuit 10 can be removed.

$$V_{gs} \approx V_{sig}-(V_{ofs}-V_{th})-\Delta V \quad (4)$$

Incidentally, when defined by another expression, the mobility correcting process can be said to be a process of supplying a current to the storage capacitor via the driving transistor $TR_D$ while supplying a video signal to the control input terminal of the driving transistor $TR_D$ and one terminal of the storage capacitor via the writing transistor $TR_W$.

[Emission Step]

The first node $ND_1$ is set in a floating state by setting the writing transistor $TR_W$ in an off state by the writing driving pulse WS from the writing scanning line WSL, and power is supplied to the driving transistor $TR_D$ so that the current $I_{ds}$ corresponding to the gate-to-source voltage $V_{gs}$ of the driving transistor $TR_D$ (potential difference between the first node $ND_1$ and the second node $ND_2$) is fed to the light emitting section ELP via the driving transistor $TR_D$. Thereby the light emitting section ELP is driven to emit light.

[Differences According to Constitutions of Driving Circuits]

Differences between typical types, that is, the 5Tr/1C type, the 4Tr/1C type, the 3Tr/1C type, and the 2Tr/1C type are as follows. The 5Tr/1C type includes a first transistor $TR_1$ (light emission controlling transistor) connected between the main electrode terminal on a power supply side of the driving transistor $TR_D$ and a power supply circuit (power supply section), a second transistor $TR_2$ for applying the second node initializing voltage, and a third transistor $TR_3$ for applying the first node initializing voltage. The first transistor $TR_1$, the second transistor $TR_2$, and the third transistor $TR_3$ are each a switching transistor. The first transistor $TR_1$ is set in an on state in an emission period, set in an off state to start a non-emission period, once set in an on state in a subsequent threshold value correcting period, and further set in an on state in and after a mobility correcting period (also in a next emission period). The second transistor $TR_2$ is set in an on state only in a second node initializing period, and is otherwise set in an off state. The third transistor $TR_3$ is set in an on state only over a duration from a first node initializing period to the threshold value correcting period, and is otherwise set in an off state. The writing transistor $TR_W$ is set in an on state over a duration from a video signal writing process period to the mobility correcting process period, and is otherwise set in an off state.

In the 4Tr/1C type, the third transistor $TR_3$ for applying the first node initializing voltage is omitted from the 5Tr/1C type. The first node initializing voltage is supplied from the video signal line DTL on a time-division basis in relation to the video signal $V_{sig}$. In order to supply the first node initializing voltage from the video signal line DTL to the first node in the first node initializing period, the writing transistor $TR_W$ is also set in an on state in the first node initializing period. Typically, the writing transistor $TR_W$ is set in an on state over a duration from the first node initializing period to the mobility correcting process period, and is otherwise set in an off state.

In the 3Tr/1C type, the second transistor $TR_2$ and the third transistor $TR_3$ are omitted from the 5Tr/1C type. The first node initializing voltage and the second node initializing voltage are supplied from the video signal line DTL on a time-division basis in relation to the video signal $V_{sig}$. In order to set the second node to the second node initializing voltage in the second node initializing period and set the first node to the first node initializing voltage in the subsequent first node initializing period, a voltage $V_{ofs\_H}$ corresponding to the second node initializing voltage is supplied as the potential of the video signal line DTL, and the potential of the video signal line DTL is thereafter set to a first node initializing voltage $V_{ofs\_L}$ (=$V_{ofs}$). In correspondence with this, the writing transistor $TR_W$ is set in an on state also in the first node initializing period and the second node initializing period. Typically, the writing transistor $TR_W$ is set in an on state over a duration from the second node initializing period to the mobility correcting process period, and is otherwise set in an off state.

Incidentally, in the 3Tr/1C type, the potential of the second node $ND_2$ is changed by using the video signal line DTL. For this purpose, the capacitance $C_{CS}$ of the storage capacitor $C_{CS}$ is set to a larger value than in the other driving circuits in design (for example the capacitance $C_{CS}$ is about ¼ to ⅓ of the capacitance $C_{el}$). Thus, consideration is given to a greater degree of change in potential of the second node $ND_2$ which change is caused by a change in potential of the first node $ND_1$ than in the other driving circuits.

In the 2Tr/1C type, the first transistor $TR_1$, the second transistor $TR_2$, and the third transistor $TR_3$ are omitted from the 5Tr/1C type. The first node initializing voltage is supplied from the video signal line DTL on a time-division basis in relation to the video signal $V_{sig}$. The second node initializing voltage is given by pulse-driving the main electrode terminal on the power supply side of the driving transistor $TR_D$ with a first potential $V_{cc\_H}$ (=$V_{cc}$ in the 5Tr/1C type) and a second potential $V_{cc\_L}$ (=$V_{ini}$ in the 5Tr/1C type). The main electrode terminal on the power supply side of the driving transistor $TR_D$ is set to the first potential $V_{cc\_H}$ in an emission period, and set to the second potential $V_{cc\_L}$ to thereby start a non-emission period. The main electrode terminal on the power supply side of the driving transistor $TR_D$ is set to the first potential $V_{cc\_H}$ in and after the subsequent threshold value correcting period (also in a next emission period). In order to supply the first node initializing voltage from the video signal line DTL to the first node in the first node initializing period, the writing transistor $TR_W$ is set in an on state also in the first node initializing period. Typically, the writing transistor $TR_W$ is set in an on state over a duration from the first node initializing period to the mobility correcting process period, and is otherwise set in an off state.

Incidentally, while the above description has been made of a case where a correcting process is performed for both of the threshold voltage and the mobility as variations in characteristics of the driving transistor, the correcting process may be performed for only one of the threshold voltage and the mobility.

While the above description has been made on the basis of desirable examples, the present technology is not limited to these examples. The constitutions and structures of various constituent elements forming the display device, the display elements, and the driving circuits described in each of the examples and the steps in the method of driving the light emitting section are illustrations, and can be changed as appropriate.

In addition, the writing process and the mobility correction may be performed separately from each other in the operations of the 5Tr/1C type, the 4Tr/1C type, and the 3Tr/1C type, or the mobility correcting process may be performed at the same time as the writing process as in the 2Tr/1C type. Specifically, it suffices to apply the video signal $V_{sig}$ from the data line DTL to the first node via the writing transistor $TR_W$ with the first transistor $TR_1$ (light emission controlling transistor) set in an on state.

<Concrete Examples of Application>

Concrete examples of application of the technology for controlling the threshold voltage $V_{th}$ of the driving transistor $TR_D$ will be described in the following. Incidentally, in a display device using an active matrix type organic EL panel, for example a vertical scanning section disposed on both sides or one side of the panel produces various gate signals (control pulses) to be supplied to the control input terminal of the transistor, and applies the signals to the pixel circuit 10. Further, a display device using such an organic EL panel may use 2Tr/1C type pixel circuits 10 to reduce the number of elements and achieve a higher definition. In consideration of this, description in the following will be made of representative examples of application to a 2Tr/1C type constitution.

First Embodiment

Pixel Circuit

Figure 4:
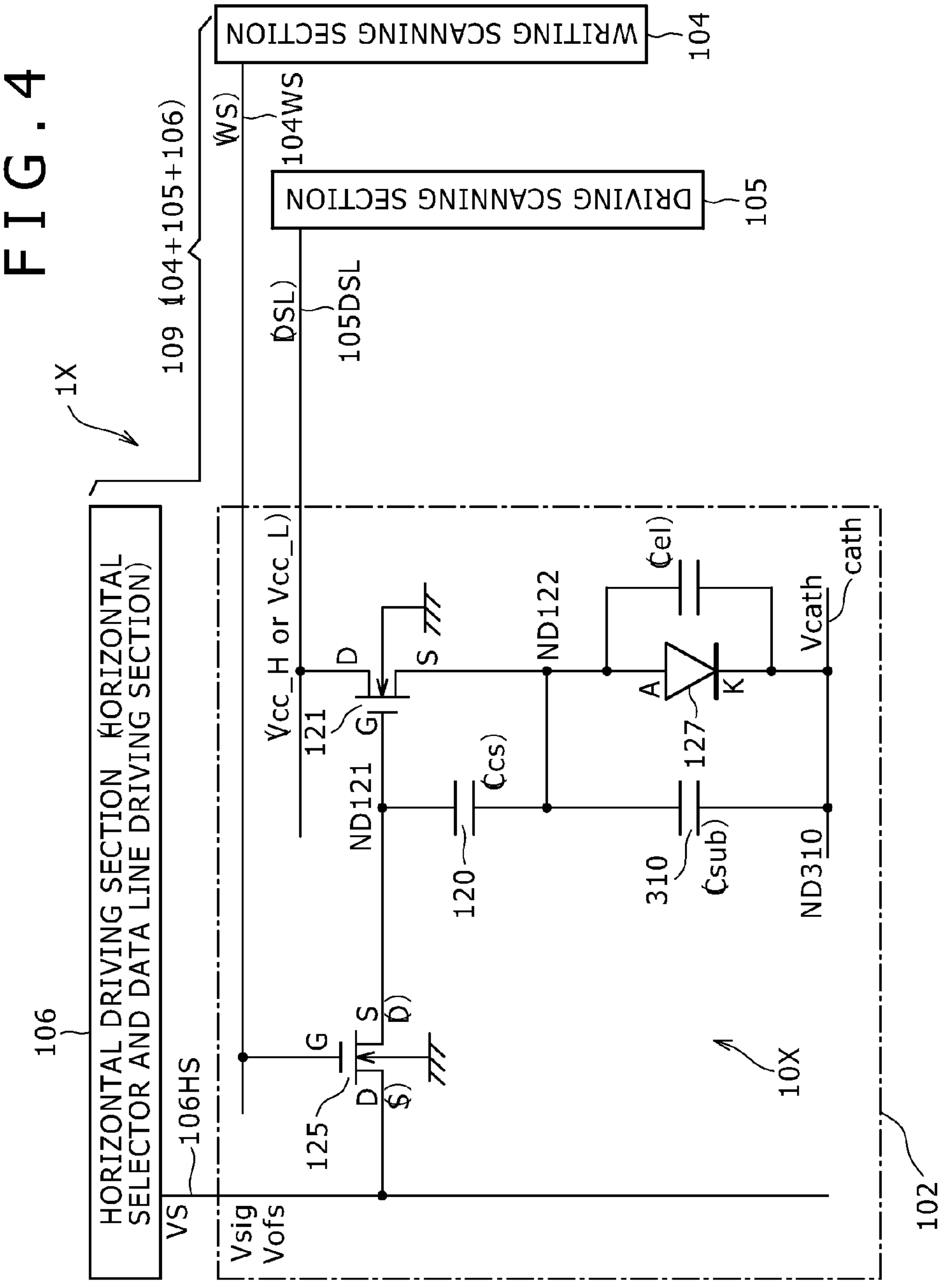
FIG. 4 is a diagram showing one form of a pixel circuit according to a first comparative example.
Figure 5:
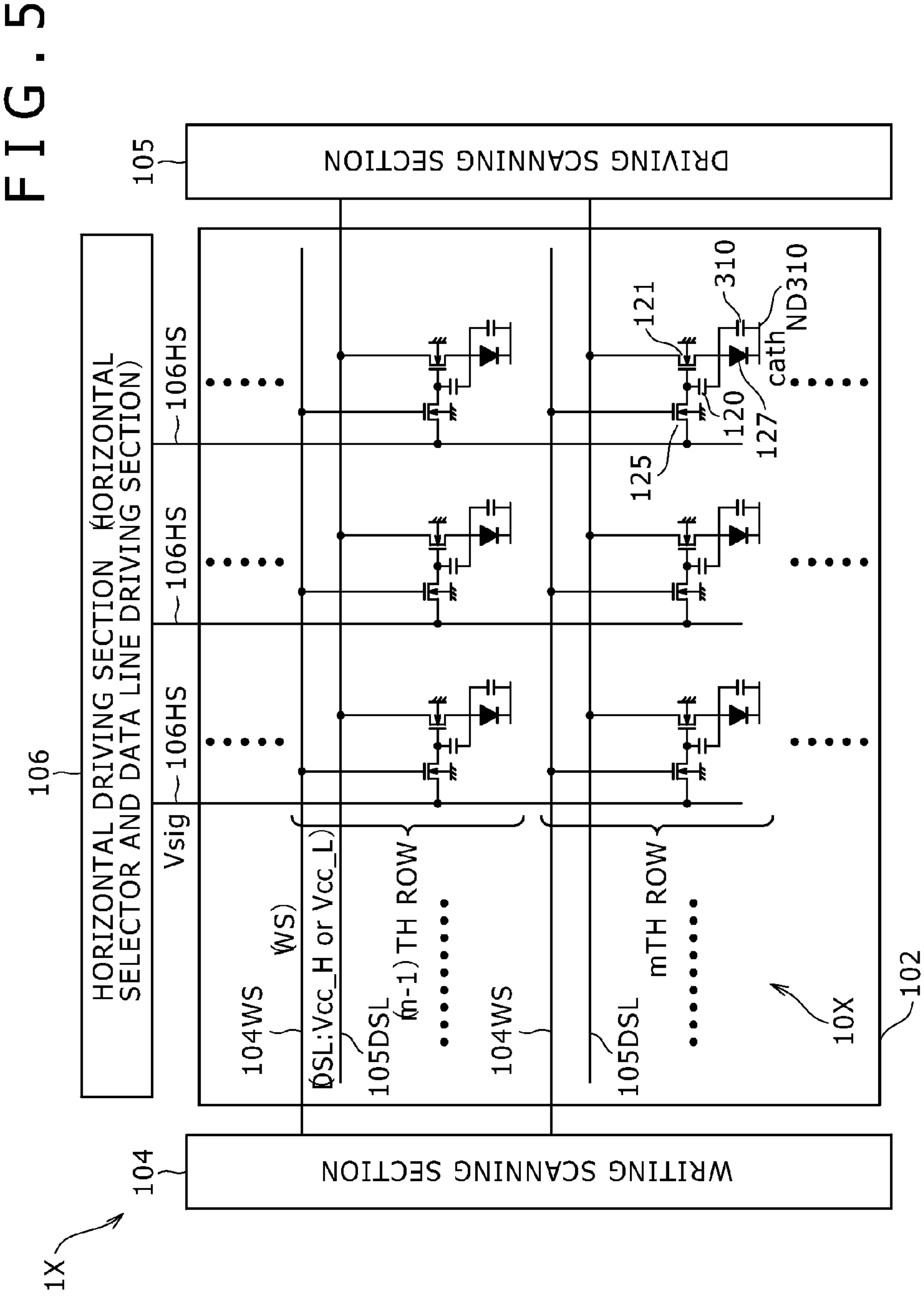
FIG. 5 is a diagram showing general outlines of a display device including the pixel circuit according to the first comparative example.
Figure 6:
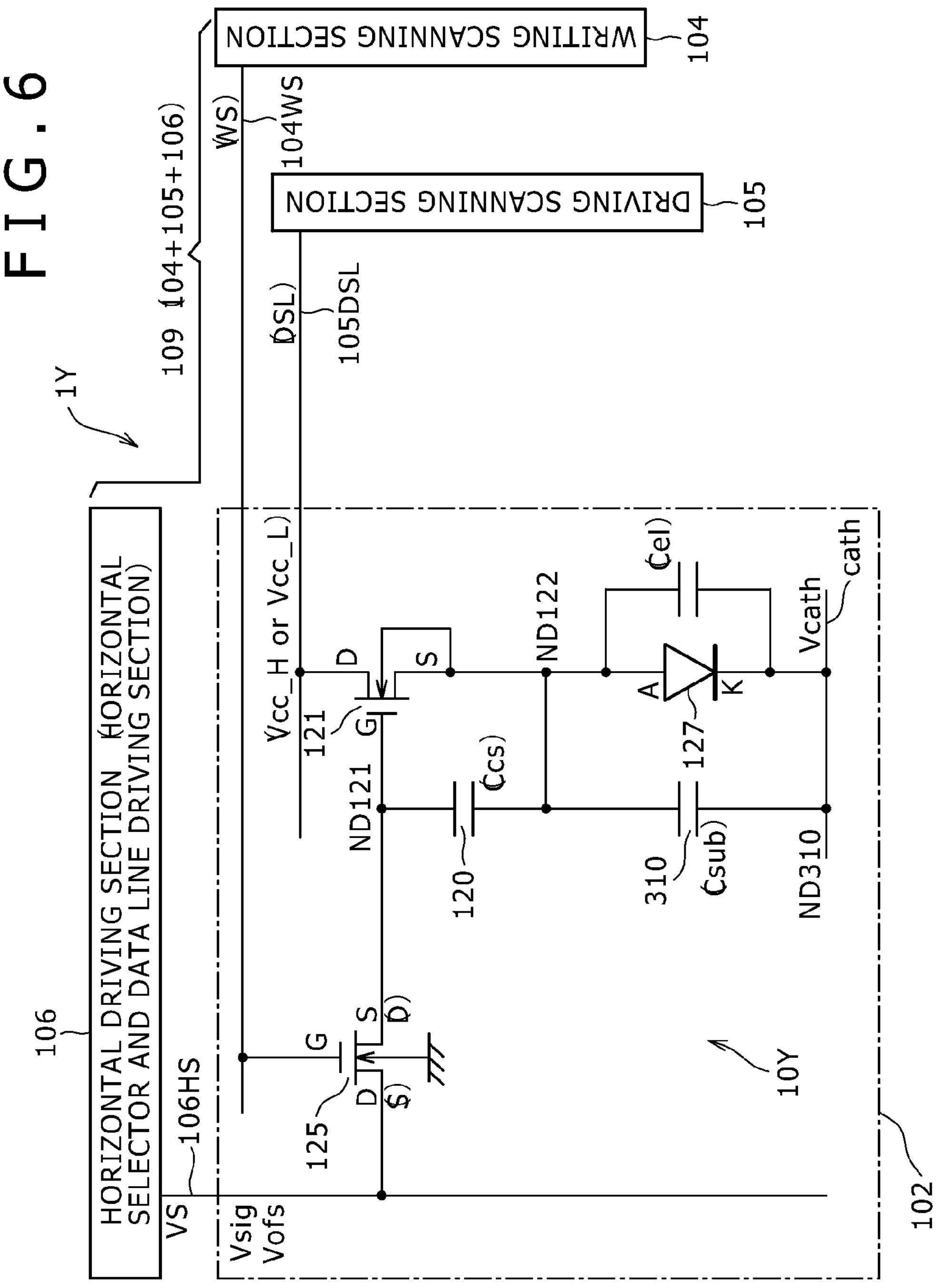
FIG. 6 is a diagram showing one form of a pixel circuit according to a second comparative example.
Figure 7:
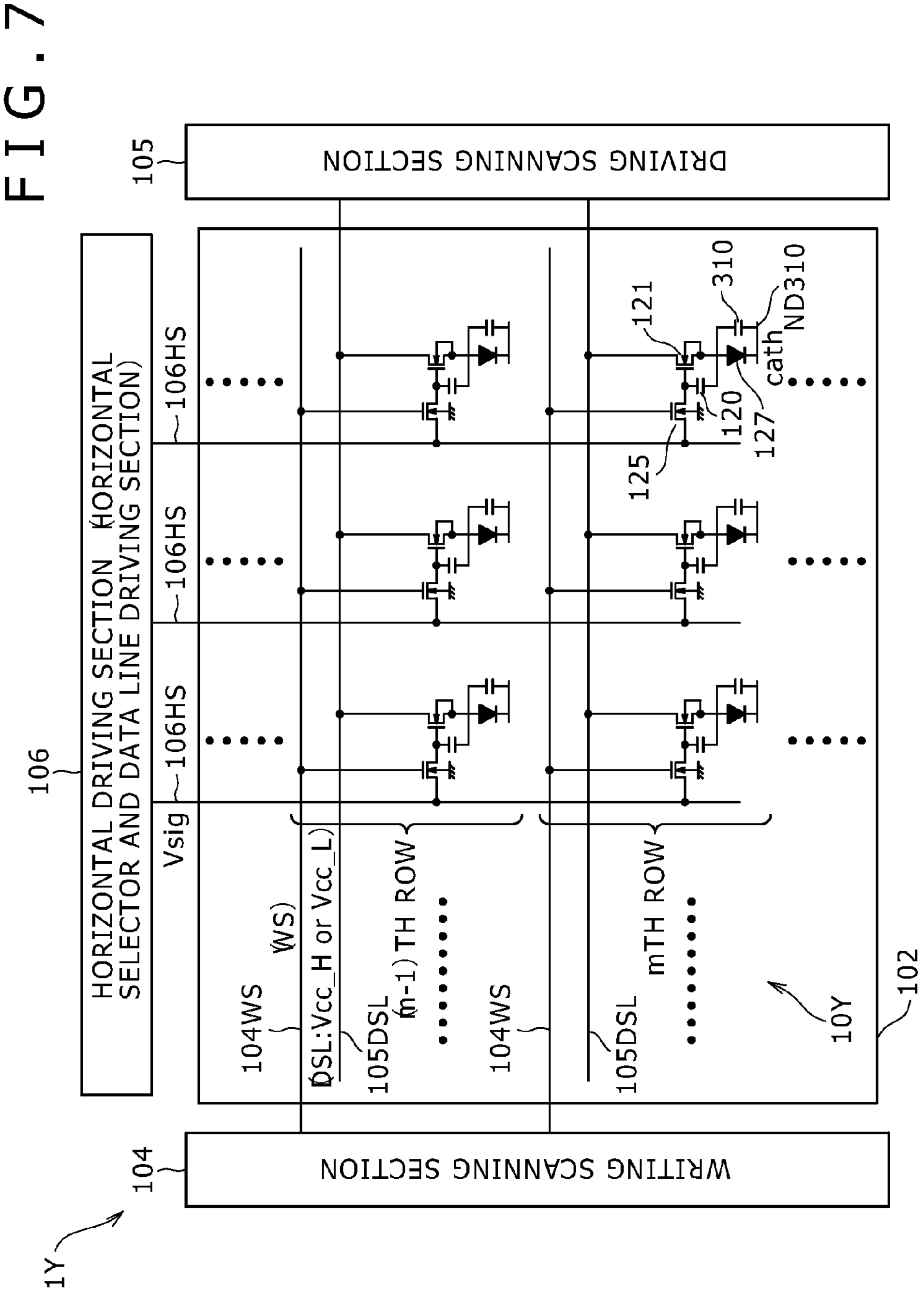
FIG. 7 is a diagram showing general outlines of a display device including the pixel circuit according to the second comparative example.
Figure 8:
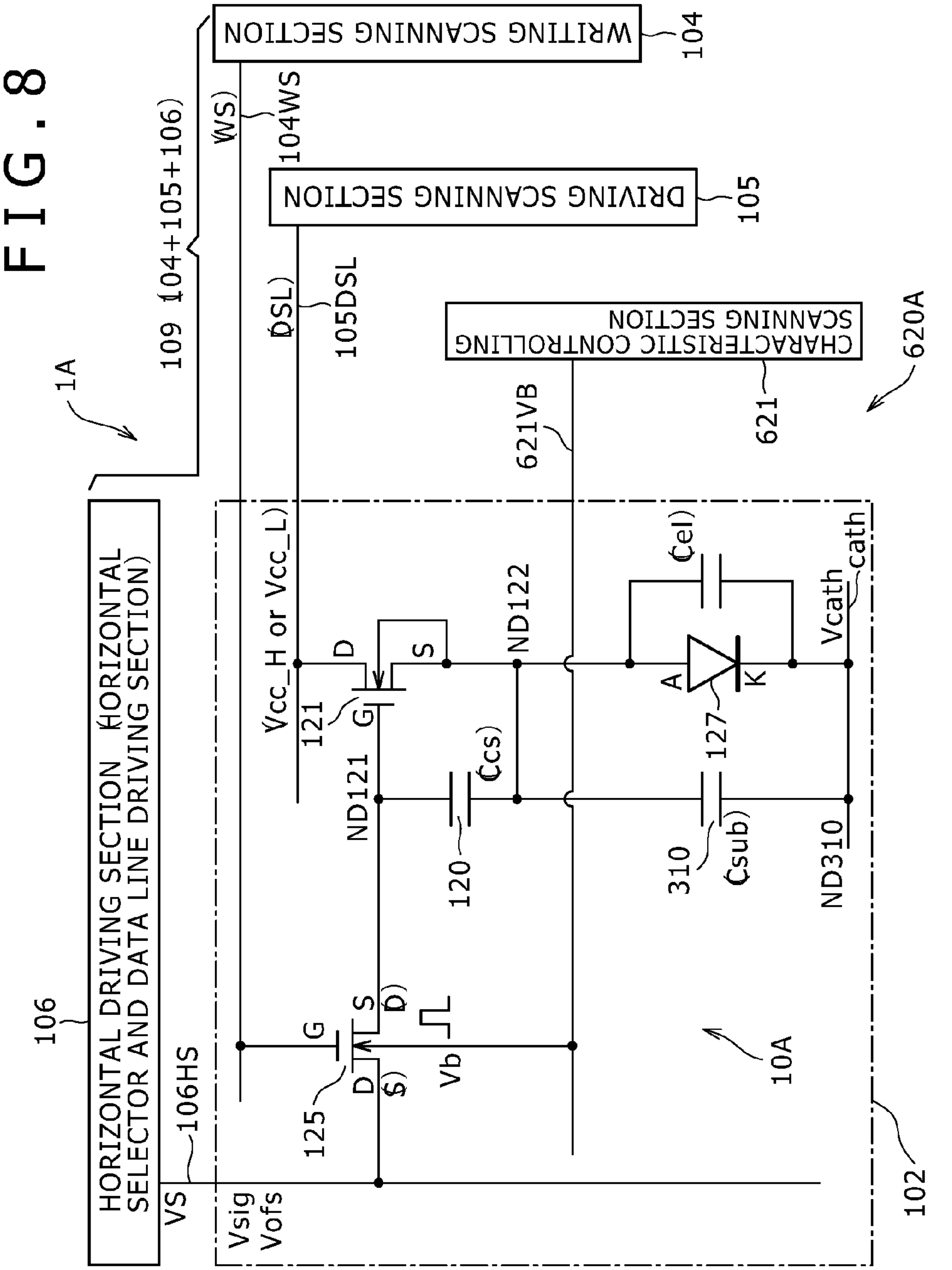
FIG. 8 is a diagram showing one form of a pixel circuit according to a first embodiment.
Figure 9:
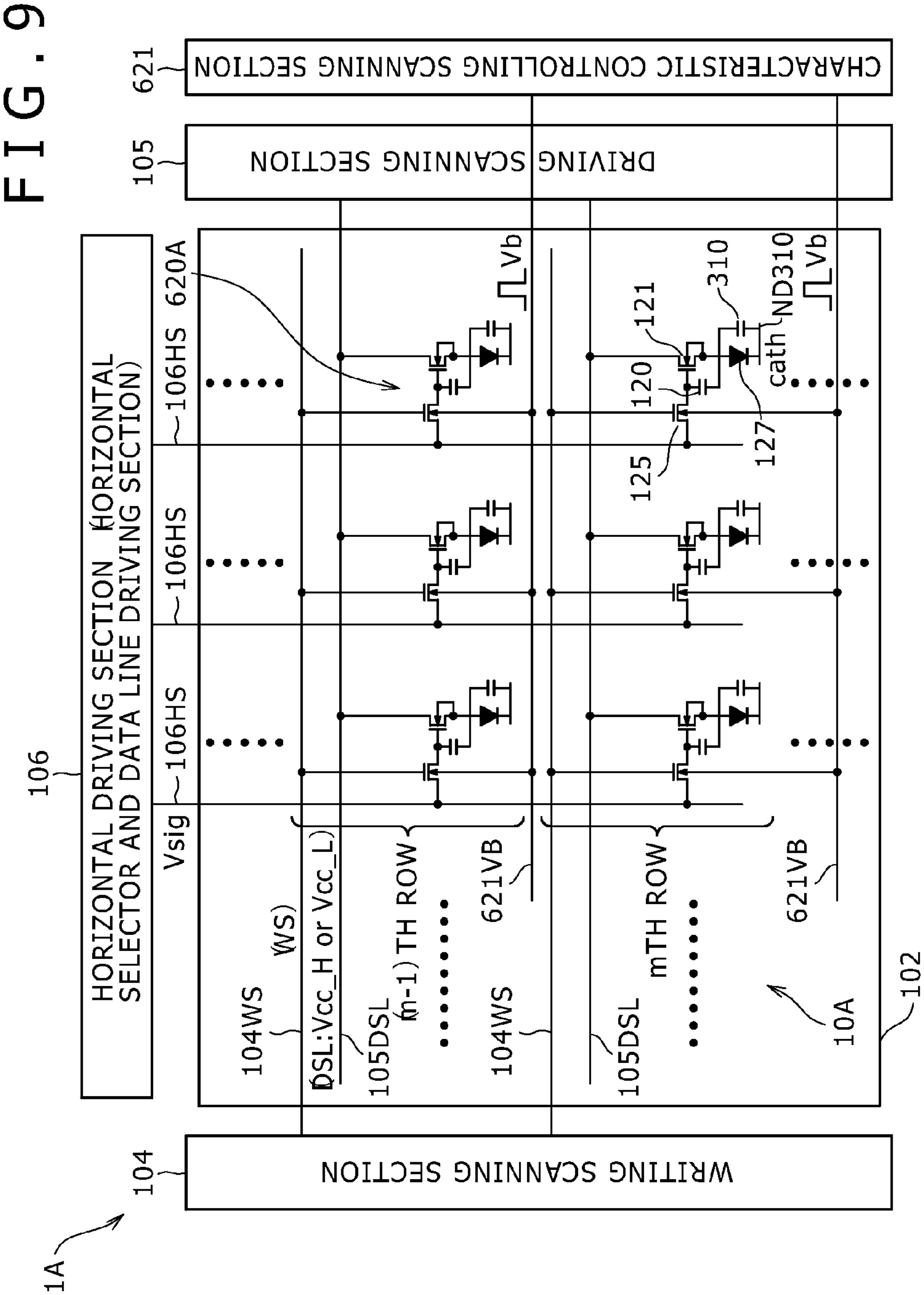
FIG. 9 is a diagram showing general outlines of a display device including the pixel circuit according to the first embodiment.

FIG. 4 and FIG. 5 are diagrams showing a pixel circuit 10X according to a first comparative example for each embodiment and a form of a display device including the pixel circuit 10X. The display device having the pixel circuit 10X according to the first comparative example in a pixel array section 102 will be referred to as a display device 1X according to the first comparative example. FIG. 4 shows a basic constitution (of one pixel). FIG. 5 shows a concrete constitution (whole of the display device). FIG. 6 and FIG. 7 are diagrams showing a pixel circuit 10Y according to a second comparative example for each embodiment and a form of a display device including the pixel circuit 10Y. The display device having the pixel circuit 10Y according to the second comparative example in a pixel array section 102 will be referred to as a display device 1Y according to the second comparative example. FIG. 6 shows a basic constitution (of one pixel). FIG. 7 shows a concrete constitution (whole of the display device). FIG. 8 and FIG. 9 are diagrams showing a pixel circuit 10A according to a first embodiment and a form of a display device including the pixel circuit 10A. The display device having the pixel circuit 10A according to the first embodiment in a pixel array section 102 will be referred to as a display device 1A according to the first embodiment. FIG. 8 shows a basic constitution (of one pixel). FIG. 9 shows a concrete constitution (whole of the display device). Incidentally, in each of the comparative examples and the first embodiment, a vertical driving section 103 and a horizontal driving section 106 provided in a peripheral part of the pixel circuit 10 are also shown on the substrate 101 of a display panel block 100. The same is true for other embodiments to be described later.

Parts common to the comparative examples and the first embodiment will first be described with the reference A, the reference X, and the reference Y omitted. The display device 1 makes an electrooptic element (an organic EL element 127 is used as the light emitting section ELP in the present example) within the pixel circuit 10 emit light on the basis of the video signal $V_{sig}$ (specifically a signal amplitude $V_{in}$). For this purpose, the display device 1 includes at least a driving transistor 121 (driving transistor $TR_D$)) for generating a driving current, a storage capacitor 120 (storage capacitor $C_{CS}$) connected between the control input terminal of the driving transistor 121 (a typical example of the control input terminal is a gate terminal) and the output terminal of the driving transistor 121 (a typical example of the output terminal is a source terminal), an organic EL element 127 (light emitting section ELP) as an example of an electrooptic element connected to the output terminal of the driving transistor 121, and a sampling transistor 125 (writing transistor $TR_W$) for writing information corresponding to the signal amplitude $V_{in}$ to the storage capacitor 120, within each of pixel circuits 10 arranged in the form of a matrix in the pixel array section 102. In the pixel circuit 10, a driving current $I_{ds}$ based on the information retained by the storage capacitor 120 is generated in the driving transistor 121, and the driving current $I_{ds}$ is passed through the organic EL element 127 as an example of an electrooptic element, whereby the organic EL element 127 is made to emit light.

The sampling transistor 125 writes the information corresponding to the signal amplitude $V_{in}$ to the storage capacitor 120. Thus, the sampling transistor 125 takes in a signal potential ($V_{ofs}+V_{in}$) at the input terminal (one of the source terminal and the drain terminal) of the sampling transistor 125, and writes the information corresponding to the signal amplitude $V_{in}$ to the storage capacitor 120 connected to the output terminal (the other of the source terminal and the drain terminal) of the sampling transistor 125. Of course, the output terminal of the sampling transistor 125 is also connected to the control input terminal of the driving transistor 121.

Incidentally, the connection constitution of the pixel circuit 10 shown in the above represents a most basic constitution. It suffices for the pixel circuit 10 to include at least the constituent elements described above, and the pixel circuit 10 may include other than these constituent elements (that is, other constituent elements). In addition, "connection" is not limited to direct connection, but may be connection via another constituent element. For example, a change such as interposing a switching transistor, a functional part having a certain function, or the like may be further made to a connection interval as required. Typically, a switching transistor for dynamically controlling a display period (or an emission time) may be disposed between the output terminal of the driving transistor 121 and the electrooptic element (organic EL element 127) or between the power supply terminal of the driving transistor 121 (a typical example of the power supply terminal is a drain terminal) and a power line PWL (power supply line 105DSL in the present example) as wiring for power supply. As long as pixel circuits in such modified forms make it possible to realize a constitution and action to be described in the first embodiment (or other embodiments), these modified forms are also pixel circuits 10 for realizing one embodiment of the display device according to the present disclosure.

In addition, a peripheral section for driving the pixel circuit 10 is for example provided with a control portion 109 including: a writing scanning section 104 for performing line-sequential scanning of the pixel circuit 10 by sequentially controlling the sampling transistor 125 in horizontal periods to write the information corresponding to the signal amplitude $V_{in}$ of the video signal $V_{sig}$ to each of storage capacitors 120 of one row; and a driving scanning section 105 for outputting a scanning driving pulse (power driving pulse DSL) for controlling the supply of power applied to the power supply terminal of each of driving transistors 121 of one row in such a manner as to be coordinated with the line-sequential scanning of the writing scanning section 104. The control portion 109 also includes a horizontal driving section 106 for performing control such that the video signal $V_{sig}$ changing between the reference potential ($V_{ofs}$) and the signal potential ($V_{ofs}+V_{in}$) in each horizontal period is supplied to the sampling transistor 125 in such a manner as to be coordinated with the line-sequential scanning of the writing scanning section 104.

The control portion 109 preferably performs control to stop the supply of the video signal $V_{sig}$ to the control input terminal of the driving transistor 121 by setting the sampling transistor 125 in a non-conducting state at a point in time when the information corresponding to the signal amplitude $V_{in}$ is written to the storage capacitor 120, to perform a bootstrap operation in which the potential of the control input terminal of the driving transistor 121 is operatively associated with a variation in potential of the output terminal of the driving transistor 121. The control portion 109 preferably performs the bootstrap operation also in an initial stage of a start of light emission after an end of sampling operation. That is, the control portion 109 sets the sampling transistor 125 in a conducting state in a state of the signal potential ($V_{ofs}+V_{in}$) being supplied to the sampling transistor 125, and thereafter sets the sampling transistor 125 in a non-conducting state so that a potential difference between the control input terminal and the output terminal of the driving transistor 121 is held constant.

In addition, the control portion 109 preferably controls the bootstrap operation so as to realize an operation of correcting a secular variation in the electrooptic element (organic EL element 127) in an emission period. For this purpose, the control portion 109 preferably realizes the operation of correcting the secular variation in the electrooptic element in a state in which the voltage between the control input terminal and the output terminal can be held constant by continuously setting the sampling transistor 125 in a non-conducting state during a period that the driving current $I_{ds}$ based on the information retained by the storage capacitor 120 flows through the electrooptic element (organic EL element 127). The bootstrap operation of the storage capacitor 120 at the time of light emission holds the potential difference between the control input terminal and the output terminal of the driving transistor 121 constant by the bootstrapped storage capacitor 120 even when a secular variation occurs in a current-voltage characteristic of the organic EL element 127, whereby a constant light emission luminance is maintained at all times. In addition, the control portion 109 preferably performs control to perform a threshold value correcting operation for retaining a voltage corresponding to the threshold voltage $V_{th}$ of the driving transistor 121 in the storage capacitor 120 by making the sampling transistor 125 conduct in a time period in which the reference potential (=First Node Initializing Voltage $V_{ofs}$) is supplied to the input terminal of the sampling transistor 125 (a typical example of the input terminal is a source terminal).

This threshold value correcting operation is preferably performed repeatedly in a plurality of horizontal periods preceding the writing of the information corresponding to the signal amplitude $V_{in}$ to the storage capacitor 120 as required. "As required" in this case means that the voltage corresponding to the threshold voltage of the driving transistor 121 may not be able to be sufficiently retained in the storage capacitor 120 in a threshold value correcting period within one horizontal period. The voltage corresponding to the threshold voltage $V_{th}$ of the driving transistor 121 is surely retained in the storage capacitor 120 by performing the threshold value correcting operation a plurality of times.

In addition, more preferably, prior to the threshold value correcting operation, the control portion 109 performs control so as to perform preparatory operation (discharging operation and initializing operation) for threshold value correction by making the sampling transistor 125 conduct in a time period in which the reference potential ($V_{ofs}$) is supplied to the input terminal of the sampling transistor 125. The potentials of the control input terminal and the output terminal of the driving transistor 121 are initialized before the threshold value correcting operation. More specifically, a potential difference across the storage capacitor 120 is set to be equal to or more than the threshold voltage $V_{th}$, with the storage capacitor 120 connected between the control input terminal and the output terminal of the driving transistor 121.

Incidentally, in threshold value correction in the 2Tr/1C driving constitution, the control portion 109 preferably includes the driving scanning section 105 for selecting and outputting a first potential $V_{cc\_H}$ used to pass the driving current $I_{ds}$ through the electrooptic element (organic EL element 127) and a second potential $V_{cc\_L}$ different from the first potential $V_{cc\_H}$ to each of the pixel circuits 10 of one row in such a manner as to be coordinated with the line-sequential scanning of the writing scanning section 104. Then, control is preferably performed so as to perform threshold value correcting operation by making the sampling transistor 125 conduct in a time period in which a voltage corresponding to the first potential $V_{cc\_H}$ is supplied to the power supply terminal of the driving transistor 121 and the reference potential ($V_{ofs}$) is supplied to the sampling transistor 125. Further, in threshold value correction preparatory operation in the 2TR driving constitution, it is preferable to initialize the potential of the control input terminal of the driving transistor 121 (that is, the first node $ND_1$) to the reference potential ($V_{ofs}$) and initialize the potential of the output terminal of the driving transistor 121 (that is, the second node $ND_2$) to the second potential $V_{cc\_L}$ by making the sampling transistor 125 conduct in a time period in which a voltage corresponding to the second potential $V_{cc\_L}$ (=Second Node Initializing Voltage $V_{ini}$) is supplied to the power supply terminal of the driving transistor 121 and the reference potential ($V_{ofs}$) is supplied to the sampling transistor 125.

More preferably, after the threshold value correcting operation, the control portion 109 performs control so as to add an amount of correction for the mobility μ of the driving transistor 121 to the information written to the storage capacitor 120 when the information of the signal amplitude $V_{in}$ is written to the storage capacitor 120 by making the sampling transistor 125 conduct in a time period in which a voltage corresponding to the first potential $V_{cc\_H}$ is supplied to the driving transistor 121 and the signal potential ($V_{ofs}+V_{in}$) is supplied to the sampling transistor 125. At this time, the sampling transistor 125 is preferably made to conduct only in a period at a predetermined position within the time period during which the signal potential ($V_{ofs}+V_{in}$) is supplied to the sampling transistor 125, the period at the predetermined position being shorter than the time period during which the signal potential ($V_{ofs}+V_{in}$) is supplied to the sampling transistor 125. An example of a pixel circuit 10 in the 2Tr/1C driving constitution will be concretely described in the following.

The pixel circuit 10 has a driving transistor basically formed by an n-channel type thin film field effect transistor. In addition, the pixel circuit 10 includes a circuit for suppressing variation in the driving current $I_{ds}$ to the organic EL element due to secular degradation of the organic EL element, that is, a driving signal uniformizing circuit (1) for holding the driving current $I_{ds}$ constant by correcting changes in the current-voltage characteristic of the organic EL element as an example of an electrooptic element, and adopts a driving system for holding the driving current $I_{ds}$ constant by realizing a threshold value correcting function and a mobility correcting function for preventing variations in the driving current due to variations in characteristics of the driving transistor (variation in threshold voltage and variation in mobility).

As a method for suppressing the effects of variations in characteristics of the driving transistor 121 (for example variations and changes in threshold voltage, mobility, and the like) on the driving current $I_{ds}$, driving timing of each transistor (the driving transistor 121 and the sampling transistor 125) is devised, while the driving circuit of the 2TR constitution is adopted as the driving signal uniformizing circuit (1) as it is. The pixel circuit 10 has a 2TR driving constitution, and therefore has a small number of elements and a small number of pieces of wiring. Thus, the pixel circuit 10 makes it possible to achieve a higher definition, and can sample the video signal $V_{sig}$ without degradation thereof, so that excellent image quality can be obtained.

In addition, the pixel circuit 10 has a characteristic in a mode of connection of the storage capacitor 120, and forms a bootstrap circuit, which is an example of a driving signal uniformizing circuit (2), as a circuit for preventing variations in the driving current due to secular degradation of the organic EL element 127. The pixel circuit 10 is characterized in that the pixel circuit 10 has the driving signal uniformizing circuit (2) for realizing a bootstrap function that makes the driving current constant (prevents variations in the driving current) even when a secular change occurs in the current-voltage characteristic of the organic EL element.

Incidentally, the pixel circuit 10 includes an auxiliary capacitance 310 relating to a writing gain, a bootstrap gain, and a mobility correcting period. However, it is not essential that the pixel circuit 10 include the auxiliary capacitance 310. Basic control operation in driving the pixel circuit 10 is similar to that of a pixel circuit 10 without the auxiliary capacitance 310.

A FET (field effect transistor) is used as each of the transistors including the driving transistor. In this case, the gate terminal of the driving transistor is treated as a control input terminal, one of the source terminal and the drain terminal of the driving transistor (suppose in the following that one of the source terminal and the drain terminal of the driving transistor is the source terminal) is treated as an output terminal, and the other of the source terminal and the drain terminal of the driving transistor (suppose in the following that the other of the source terminal and the drain terminal of the driving transistor is the drain terminal) is treated as a power supply terminal.

Specifically, as shown in FIG. 4 and FIG. 5, the pixel circuit 10 includes a driving transistor 121 and a sampling transistor 125, which are each an n-channel type, and an organic EL element 127 as an example of an electrooptic element that emits light by being fed with a current. Generally, the organic EL element 127 has a current rectifying property, and is thus represented by the symbol of a diode. Incidentally, the organic EL element 127 has a parasitic capacitance $C_{el}$. In the figures, the parasitic capacitance $C_{el}$ is shown in parallel with the organic EL element 127 (in the form of a diode).

The drain terminal D of the driving transistor 121 is connected to a power supply line 105DSL for supplying a first potential $V_{cc\_H}$ or a second potential $V_{cc\_L}$. The source terminal S of the driving transistor 121 is connected to the anode terminal A of the organic EL element 127 (a point of connection between the source terminal S of the driving transistor 121 and the anode terminal A of the organic EL element 127 is the second node $ND_2$, and is set as a node ND122). The cathode terminal K of the organic EL element 127 is connected to cathode wiring cath (whose potential is a cathode potential $V_{cath}$, or GND, for example) for supplying a reference potential, the cathode wiring cath being common to all the pixel circuits 10. Incidentally, the cathode wiring cath may be only wiring in a single layer for the cathode wiring cath (upper layer wiring), or auxiliary wiring for the cathode wiring may be provided in an anode layer in which wiring for the anode is formed, for example, so that the resistance value of the cathode wiring is reduced. The auxiliary wiring is arranged in the form of a grid, columns, or rows within the pixel array section 102 (display area), and is set at a same fixed potential as the upper layer wiring.

The gate terminal G of the sampling transistor 125 is connected to a writing scanning line 104WS from the writing scanning section 104. The drain terminal D of the sampling transistor 125 is connected to a video signal line 106HS (video signal line DTL). The source terminal S of the sampling transistor 125 is connected to the gate terminal G of the driving transistor 121 (a point of connection between the source terminal S of the sampling transistor 125 and the gate terminal G of the driving transistor 121 is the first node $ND_1$, and is set as a node ND121). The gate terminal G of the sampling transistor 125 is supplied with an active-H writing driving pulse WS from the writing scanning section 104. The sampling transistor 125 can also be in a mode of connection in which the source terminal S and the drain terminal D are interchanged with each other.

The drain terminal D of the driving transistor 121 is connected to a power supply line 105DSL from the driving scanning section 105 functioning as a power scanner. The power supply line 105DSL has a characteristic in that the power supply line 105DSL itself has a capability to supply power to the driving transistor 121. The driving scanning section 105 selects and supplies, to the drain terminal D of the driving transistor 121, the first potential $V_{cc\_H}$ on a high voltage side, the first potential $V_{cc\_H}$ corresponding to a power supply voltage, and the second potential $V_{cc\_L}$ on a low voltage side used for preparatory operation prior to threshold value correction (which second potential $V_{cc\_L}$ is referred to also as an initializing voltage or an initial voltage).

The pixel circuit 10 can perform preparatory operation prior to threshold value correction by driving the drain terminal D side (power supply circuit side) of the driving transistor 121 by a power driving pulse DSL assuming the two values of the first potential $V_{cc\_H}$ and the second potential $V_{cc\_L}$. Suppose that the second potential $V_{cc\_L}$, is sufficiently lower than the reference potential ($V_{ofs}$) of the video signal $V_{sig}$ in the video signal line 106HS. Specifically, the second potential $V_{cc\_L}$, on the low potential side of the power supply line 105DSL is set such that the gate-to-source voltage $V_{gs}$ (difference between the gate potential $V_g$ and the source potential $V_s$) of the driving transistor 121 is higher than the threshold voltage $V_{th}$ of the driving transistor 121. Incidentally, the reference potential ($V_{ofs}$) is used for initializing operation prior to threshold value correcting operation and also used to precharge the video signal line 106HS in advance.

In such a pixel circuit 10, when the organic EL element 127 is driven, the drain terminal D of the driving transistor 121 is supplied with the first potential $V_{cc\_H}$, and the source terminal S of the driving transistor 121 is connected to the anode terminal A side of the organic EL element 127, whereby a source follower circuit is formed as a whole.

When such a pixel circuit 10 is employed, the effects of secular degradation of the organic EL element 127 and variations in characteristics (for example variations and changes in threshold voltage, mobility, and the like) of the driving transistor 121 on the driving current $I_{ds}$ are prevented by adopting the 2TR driving constitution using the driving transistor 121 and one other switching transistor (sampling transistor 125) for scanning and by setting on/off timing of the power driving pulse DSL and the writing driving pulse WS for controlling the respective switching transistors.

In addition, in the display device 1A according to the first embodiment, an auxiliary capacitance 310 as a capacitance element of a capacitance $C_{sub}$ is added to the node ND122 (point of connection between the source terminal S of the driving transistor 121, one terminal of the storage capacitor 120, and the anode terminal A of the organic EL element 127) in each pixel circuit 10A. Irrespective of a point to which another terminal of the auxiliary capacitance 310 (which terminal will be referred to as a node ND310) is connected, the auxiliary capacitance 310 in the circuit configuration is connected in parallel with the organic EL element 127 (the parasitic capacitance $C_{el}$ of the organic EL element 127) in terms of the electric circuit. Suppose that the point of connection of the node ND310 is, as an example, the cathode wiring cath (which may be the upper layer wiring or the auxiliary wiring) common to all the pixel circuits 10, to which cathode wiring the cathode terminals K of all organic EL elements 127 are connected. In addition to this, the point of connection of the node ND310 may be for example the power supply line 105DSL in the own stage (row), a power supply line 105DSL in other than the own stage (row), or a fixed potential point having an arbitrary value (including a ground potential). Each of the parts as the point of connection of the node ND310 has advantages and disadvantages, description of which will be omitted in the following.

The capacitance $C_{CS}$ of the storage capacitor 120 and the capacitance $C_{el}$ of the parasitic capacitance $C_{el}$ of the organic EL element 127 are determined so as to make a trade-off between a writing gain $G_{in}$ and a bootstrap gain $G_{bst}$ and make each gain a proper gain. The writing gain $G_{in}$ and the bootstrap gain $G_{bst}$ can be adjusted by adjusting the capacitance $C_{sub}$ of the auxiliary capacitance 310. When this is utilized, it is also possible to achieve a white balance by relatively adjusting capacitances $C_{sub}$ between three RGB pixel circuits 10. Specifically, because luminous efficiencies of organic EL elements 127 for the respective colors of R, G, and B are different from each other, a white balance may not be achieved in a case of identical driving currents $I_{ds}$ (that is, identical signal amplitudes $V_{in}$) without the auxiliary capacitance 310. Thus, a white balance is achieved by providing different signal amplitudes $V_{in}$ for the different colors. On the other hand, a white balance can be achieved even in the case of identical driving currents $I_{ds}$ (that is, identical signal amplitudes $V_{in}$) by relatively adjusting the capacitances $C_{sub}$ of auxiliary capacitances 310 between three RGB pixel circuits 10. In addition, a time necessary to correct for mobility μ (mobility correcting time) can be adjusted by adding the auxiliary capacitance 310 without affecting threshold value correcting operation. Even when the driving of the pixel circuit 10 is increased in speed, sufficient mobility correction can be made by enabling the mobility correcting time to be adjusted using the auxiliary capacitance 310.

[Constitution Unique to First Embodiment]

A transistor having a control terminal capable of controlling a transistor characteristic (increasing or decreasing the threshold voltage $V_{th}$ in this case) (which control terminal will hereinafter be referred to also as a transistor characteristic control terminal) in addition to a control input terminal (gate terminal) unlike an ordinary thin film transistor without a back gate terminal is used as each transistor in the pixel circuit 10X according to the first comparative example and the pixel circuit 10Y according to the second comparative example. A typical example of a transistor having a "transistor characteristic control terminal" is a back gate type thin film transistor or a MOS transistor as shown in FIG. 3B. Incidentally, in the pixel circuit 10X according to the first comparative example, the transistor characteristic control terminal of each of the sampling transistor 125 and the driving transistor 121 is connected to a ground potential point (lowest voltage used within the pixel circuit 10). In the pixel circuit 10Y according to the second comparative example, the transistor characteristic control terminal of the sampling transistor 125 is connected to a ground potential point (lowest voltage used within the pixel circuit 10), whereas the transistor characteristic control terminal of the driving transistor 121 is connected to the source terminal of the driving transistor 121. In the case of the second comparative example, there is a fear of reliability being adversely affected because a reverse-bias state occurs in which the drain terminal of the driving transistor 121 becomes lower than a base potential (back gate voltage) when the driving transistor 121 is turned off (at a time of quenching by supplying the second potential $V_{cc\_L}$, to the drain terminal). Though not described in detail, this is due to a fact that when the driving transistor 121 is turned off, the drain voltage of the driving transistor falls to the second potential $V_{cc\_L}$, in a short time, whereas the source potential and the base potential take a certain amount of time to effect a voltage fall while discharging the parasitic capacitance $C_{el}$ of the organic EL element 127 and the auxiliary capacitance 310 ($C_{sub}$).

On the other hand, the first embodiment includes a transistor characteristic controlling section 620A having a characteristic controlling scanning section 621, and is configured to supply a "predetermined control potential" from the transistor characteristic controlling section 620A (characteristic controlling scanning section 621) to the transistor characteristic control terminal of the sampling transistor 125. Incidentally, in the first embodiment, as in the pixel circuit 10Y according to the second comparative example, the transistor characteristic control terminal of the driving transistor 121 is connected to the source terminal of the driving transistor 121. However, as in the pixel circuit 10X according to the first comparative example, the transistor characteristic control terminal of the driving transistor 121 may be connected to a ground potential point.

As will be described later in detail, the "predetermined control potential" is a control voltage in the form of a pulse for suppressing a luminance shortage phenomenon. Because the luminance shortage phenomenon is related to signal writing, a constitution using a signal related to signal writing is basically employed as a constitution of the characteristic controlling scanning section 621 of the transistor characteristic controlling section 620A. For example, the characteristic controlling scanning section 621 generates a scanning pulse corresponding to a high/low of a transistor characteristic control signal Vb, subjects the scanning pulse to level conversion, and then outputs a transistor characteristic control signal Vb having appropriate levels $Vb_{\_H}$ and $Vb_{\_L}$ via a characteristic control scanning line 621VB.

The "signal related to signal writing" is typified by signals shown in other embodiments to be described later, but is not limited to these signals. In other words, it can be said that the constitution of the first embodiment is a general-purpose constitution applicable to every "signal related to signal writing," whereas the other embodiments to be described later are forms in concrete examples of the "signal related to signal writing."

[Operation of Pixel Circuit]

Figure 10:
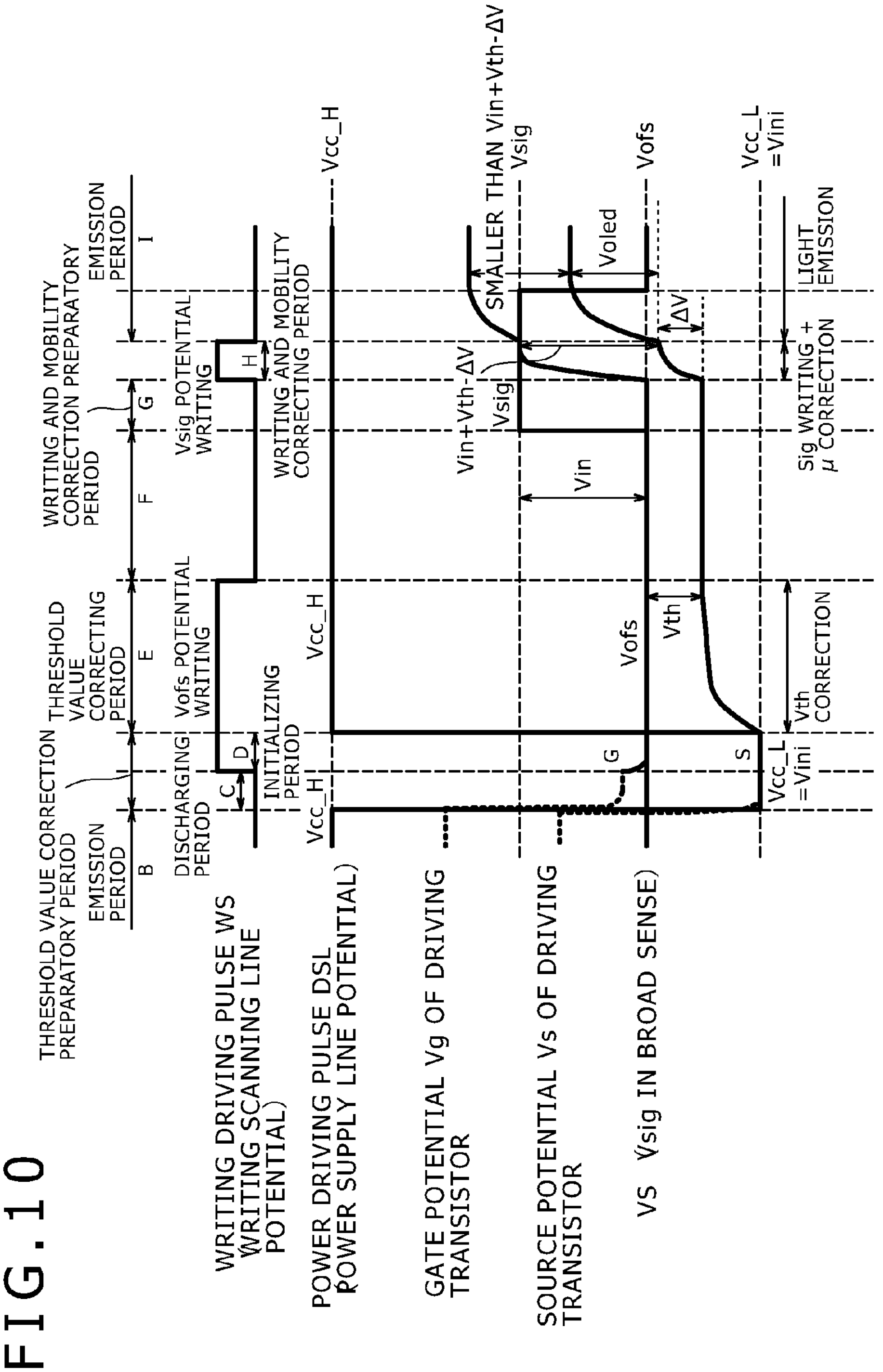
FIG. 10 is a timing chart of assistance in explaining a method of driving a pixel circuit according to a comparative example.

FIG. 10 is a timing chart (ideal state) of assistance in explaining an operation when the information of the signal amplitude $V_{in}$ is written to the storage capacitor 120 by a line-sequential system, as an example of driving timing in relation to the pixel circuit 10 (each of the comparative examples and the first embodiment). FIG. 10 shows changes in potential of the writing scanning line 104WS, changes in potential of the power supply line 105DSL, and changes in potential of the video signal line 106HS on a common time axis. FIG. 10 also shows changes in the gate potential $V_g$ and the source potential $V_s$ of the driving transistor 121 in parallel with these potential changes. Basically, similar driving is performed for each of rows of writing scanning lines 104WS and power supply lines 105DSL with a delay of one horizontal scanning period.

The value of a current flowing through the organic EL element 127 is controlled by the timing of pulses such as signals in FIG. 10. In the timing example of FIG. 10, after quenching and the initialization of the node ND122 are performed by setting a power driving pulse DSL to the second potential $V_{cc\_L}$, the node ND121 is initialized by setting the sampling transistor 125 in an on state while the first node initializing voltage $V_{ofs}$ is applied to the video signal line 106HS, and the power driving pulse DSL is set to the first potential $V_{cc\_H}$ in that state, whereby threshold value correction is made. Thereafter, the sampling transistor 125 is set in an off state, and a video signal $V_{sig}$ is applied to the video signal line 106HS. In this state, the sampling transistor 125 is set in an on state to thereby write the signal and make mobility correction at the same time. After the signal is written, light emission is started when the sampling transistor 125 is set in an off state. The driving is thus controlled for the mobility correction, the threshold value correction, and the like by the phase differences of the pulses. When the pixel circuit 10A in the display device 1A according to the first embodiment is driven, the back gate terminal of the sampling transistor 125 is pulse-driven by the transistor characteristic control signal Vb on the basis of the "signal related to signal writing" (in such a manner as to be operatively associated with signal writing).

The operation will be described in detail below with attention directed to the threshold value correction and the mobility correction. In the pixel circuit 10, as for driving timing, first, the sampling transistor 125 conducts in response to the writing driving pulse WS supplied from the writing scanning line 104WS, to sample the video signal $V_{sig}$ supplied from the video signal line 106HS and retain the video signal $V_{sig}$ in the storage capacitor 120. In the following, in order to facilitate description and understanding, unless otherwise specified, concise description will be made by representing the information of the signal amplitude $V_{in}$ as being written to, retained in, or sampled in the storage capacitor 120, for example, assuming that the writing gain is one (ideal value). When the writing gain is less than one, information corresponding to the magnitude of the signal amplitude $V_{in}$ and multiplied by the gain, rather than the magnitude itself of the signal amplitude $V_{in}$, is retained in the storage capacitor 120.

As for the driving timing for the pixel circuit 10, when the information of the signal amplitude $V_{in}$ of the video signal $V_{sig}$ is written to the storage capacitor 120, line-sequential driving is performed which transmits video signals for one row to the video signal lines 106HS of the respective columns simultaneously, from a viewpoint of sequential scanning. In particular, in a basic concept in making the threshold value correction and the mobility correction with the driving timing in the pixel circuit 10 of the 2TR constitution, first, the video signal $V_{sig}$ has the reference potential ($V_{ofs}$) and the signal potential ($V_{ofs}+V_{in}$) on a time-division basis within a 1 H period. Specifically, suppose that a period in which the video signal $V_{sig}$ is at the reference potential ($V_{ofs}$) as a non-effective period is a first half part of one horizontal period, and that a period in which the video signal $V_{sig}$ is at the signal potential ($V_{sig}=V_{ofs}+V_{in}$) as an effective period is a second half part of one horizontal period. When one horizontal period is divided into the first half part and the second half part, one horizontal period is typically divided into substantially equal half periods. However, this is not essential. The second half part may be longer than the first half part, or conversely the second half part may be shorter than the first half part.

Suppose that the writing driving pulse WS used for signal writing is also used for the threshold value correction and the mobility correction, and the sampling transistor 125 is turned on by activating the writing driving pulse WS twice within a 1 H period. The threshold value correction is made in the first on timing, and the signal writing and the mobility correction are performed simultaneously in the second on timing. Thereafter, the driving transistor 121 receives a current supplied from the power supply line 105DSL at the first potential (high potential side), and feeds the driving current $I_{ds}$ through the organic EL element 127 according to the signal potential (potential corresponding to the potential of the video signal $V_{sig}$ in the effective period) retained in the storage capacitor 120. Incidentally, instead of the writing driving pulse WS being activated twice within a 1 H period, the potential of the video signal line 106HS may be set to a signal potential ($=V_{ofs}+V_{in}$) for controlling luminance in the organic EL element 127 while the on state of the sampling transistor 125 is maintained.

For example, the vertical driving section 103 outputs the writing driving pulse WS as a control signal for making the sampling transistor 125 conduct in a time period in which the power supply line 105DSL is at the first potential and the video signal line 106HS is at the reference potential ($V_{ofs}$) in the non-effective period of the video signal $V_{sig}$, so that a voltage corresponding to the threshold voltage $V_{th}$ of the driving transistor 121 is retained in the storage capacitor 120. This operation realizes a threshold value correcting function. This threshold value correcting function can cancel the effect of the threshold voltage $V_{th}$ of the driving transistor 121 which threshold voltage varies from one pixel circuit 10 to another.

The vertical driving section 103 preferably makes the voltage corresponding to the threshold voltage $V_{th}$ of the driving transistor 121 surely retained in the storage capacitor 120 by repeatedly performing threshold value correcting operation in a plurality of horizontal periods preceding the sampling of the signal amplitude $V_{in}$. A sufficiently long writing time is secured by performing threshold value correcting operation a plurality of times. This makes it possible to surely retain the voltage corresponding to the threshold voltage $V_{th}$ of the driving transistor 121 in the storage capacitor 120 in advance.

The retained voltage corresponding to the threshold voltage $V_{th}$ is used to cancel the threshold voltage $V_{th}$ of the driving transistor 121. Thus, even when the threshold voltage $V_{th}$ of the driving transistor 121 varies from one pixel circuit 10 to another, the variation in each pixel circuit 10 is cancelled completely, so that image uniformity, that is, the uniformity of light emission luminance over the entire screen of the display device is enhanced. A luminance variation that tends to appear when the signal potential is for a low gradation, in particular, can be prevented.

Preferably, the vertical driving section 103 makes the sampling transistor 125 conduct by activating the writing driving pulse WS (H-level in the present example) in a time period in which the power supply line 105DSL is at the second potential and the video signal line 106HS is at the reference potential ($V_{ofs}$) in the non-effective period of the video signal $V_{sig}$ prior to threshold value correcting operation, and thereafter sets the power supply line 105DSL to the first potential while the writing driving pulse WS is maintained at the active H.

Thus, the threshold value correcting operation is started (threshold value correcting period E) after the source terminal S is reset to the second potential $V_{cc\_L}$, which is sufficiently lower than the reference potential ($V_{ofs}$) (Discharging Period C=Second Node Initializing Period), and the gate terminal G of the driving transistor 121 is reset to the reference potential ($V_{ofs}$) (Initializing Period D=First Node Initializing Period). Such an operation of resetting the gate potential and the source potential (initializing operation) enables the subsequent threshold value correcting operation to be performed reliably. The discharging period C and the initializing period D will be referred to collectively as a threshold value correction preparatory period (=Pre-Process Period) for initializing the gate potential $V_g$ and the source potential $V_s$ of the driving transistor 121.

In the threshold value correcting period E, the potential of the power supply line 105DSL makes a transition from the second potential $V_{cc\_L}$, on the low potential side to the first potential $V_{cc\_H}$ on the high potential side, whereby the source potential $V_s$ of the driving transistor 121 starts to rise. Specifically, the gate terminal G of the driving transistor 121 is maintained at the reference potential ($V_{ofs}$) of the video signal $V_{sig}$, and a drain current will flow until the driving transistor 121 is cut off after the potential $V_s$ of the source terminal S of the driving transistor 121 rises. When the driving transistor 121 is cut off, the source potential $V_s$ of the driving transistor 121 becomes "$V_{ofs}-V_{th}$." In the threshold value correcting period E, to allow the drain current to flow only the side of the storage capacitor 120 (when $C_{CS}<<C_{el}$) and prevent the drain current from flowing to the side of the organic EL element 127, the potential $V_{cath}$ of the grounding wiring cath common to all pixels is set so as to cut off the organic EL element 127.

Because an equivalent circuit of the organic EL element 127 is represented by a parallel circuit of a diode and the parasitic capacitance $C_{el}$, as long as "$V_{el}\leq V_{cath}+V_{thEL}$," that is, as long as a leakage current of the organic EL element 127 is considerably smaller than the current flowing through the driving transistor 121, the drain current $I_{ds}$ of the driving transistor 121 is used to charge the storage capacitor 120 and the parasitic capacitance $C_{el}$. As a result, the voltage $V_{el}$ of the anode terminal A of the organic EL element 127, that is, the potential of the node ND122 rises with time. Then, when the potential difference between the potential of the node ND122 (source potential $V_s$) and the voltage of the node ND121 (gate potential $V_g$) becomes exactly the threshold voltage $V_{th}$, the driving transistor 121 is changed from an on state to an off state, the drain current $I_{ds}$ stops flowing, and the threshold value correcting period is ended. That is, after the passage of a certain time, the gate-to-source voltage $V_{gs}$ of the driving transistor 121 assumes the value of the threshold voltage $V_{th}$.

In this case, it is possible to perform the threshold value correcting operation only once. However, this is not essential. The threshold value correcting operation may be repeated a plurality of times with one horizontal period as a process cycle. For example, ideally, the voltage corresponding to the threshold voltage $V_{th}$ is written to the storage capacitor 120 connected between the gate terminal G and the source terminal S of the driving transistor 121 by one time of threshold value correction. However, the threshold value correcting period E lasts from the timing of setting the writing driving pulse WS to an active H to the timing of returning the writing driving pulse WS to an inactive L. When this period is not sufficiently secured, the period ends before the voltage corresponding to the threshold voltage $V_{th}$ is reached. The threshold value correcting operation is preferably repeated a plurality of times to solve this problem. The timing of such threshold value correcting operation is not shown in the figures.

When the threshold value correcting operation is performed a plurality of times, one horizontal period is a process cycle of the threshold value correcting operation because the initializing operation, which supplies the reference potential ($V_{ofs}$) via the video signal line 106HS and sets the source potential to the second potential $V_{cc\_L}$, in the first half part of one horizontal period, is performed prior to the threshold value correcting operation. The threshold value correcting period is inevitably shorter than one horizontal period. Thus, due to the capacitance $C_{CS}$ of the storage capacitor 120, the relation in magnitude of the second potential $V_{cc\_L}$, and other factors, there may be a case in which an accurate voltage corresponding to the threshold voltage $V_{th}$ may not be fully retained in the storage capacitor 120 in one short period of the threshold value correcting operation. The threshold value correcting operation is preferably performed a plurality of times to deal with this case. That is, the voltage corresponding to the threshold voltage $V_{th}$ of the driving transistor 121 is preferably retained in the storage capacitor 120 surely by repeating the threshold value correcting operation in a plurality of horizontal periods preceding the sampling of the signal amplitude $V_{in}$ in the storage capacitor 120 (signal writing).

The pixel circuit 10 has a mobility correcting function in addition to the threshold value correcting function. Specifically, to set the sampling transistor 125 in a conducting state in a time period in which the video signal line 106HS is at the signal potential ($V_{ofs}$+$V_{in}$) in the effective period of the video signal $V_{sig}$, the vertical driving section 103 holds the writing driving pulse WS supplied to the writing scanning line 104WS active (H-level in the present example) only for a shorter period than the above time period. In this shorter period, the parasitic capacitance $C_{el}$ of the organic EL element 127 and the storage capacitor 120 are charged via the driving transistor 121 in a state of the signal potential ($V_{ofs}$+$V_{in}$) being supplied to the control input terminal of the driving transistor 121. By setting the active period of the writing driving pulse WS (which period is also a sampling period and a mobility correcting period) appropriately, correction for the mobility μ of the driving transistor 121 can be made at the same time when the information corresponding to the signal amplitude $V_{in}$ is retained in the storage capacitor 120. A period in which the signal potential ($V_{ofs}$+$V_{in}$) is actually supplied to the video signal line 106HS by the horizontal driving section 106 and the writing driving pulse WS is set at an active H is set as a period of writing the signal amplitude $V_{in}$ to the storage capacitor 120 (which period will be referred to also as a sampling period).

In particular, in the driving timing in the pixel circuit 10, the writing driving pulse WS is activated within the time period in which the power supply line 105DSL is at the first potential $V_{cc\_H}$ on the high potential side and the video signal $V_{sig}$ is in the effective period (in the period of the signal amplitude $V_{in}$). That is, as a result, the mobility correcting period (as well as the sampling period) is defined by a range where the time width during which the potential of the video signal line 106HS is the signal potential ($V_{ofs}$+$V_{in}$) in the effective period of the video signal $V_{sig}$ and the active period of the writing driving pulse WS overlap each other. In particular, because the active period width of the writing driving pulse WS is set narrower so as to be included in the time width during which the video signal line 106HS is at the signal potential, the mobility correcting time is consequently determined by the writing driving pulse WS. To be exact, the mobility correcting time (as well as the sampling period) is a time from the rising of the writing driving pulse WS and the turning on of the sampling transistor 125 to the falling of the same writing driving pulse WS and the turning off of the sampling transistor 125.

Specifically, in the sampling period, the sampling transistor 125 is set in a conducting (on) state with the gate potential $V_g$ of the driving transistor 121 at the signal potential ($V_{ofs}$+$V_{in}$). Thus, in the writing and mobility correcting period H, a driving current $I_{ds}$ flows through the driving transistor 121 in a state of the gate terminal G of the driving transistor 121 being fixed at the signal potential ($V_{ofs}$+$V_{in}$). The information of the signal amplitude $V_{in}$ is retained in such a manner as to be added to the threshold voltage $V_{th}$ of the driving transistor 121. As a result, variation in the threshold voltage $V_{th}$ of the driving transistor 121 is cancelled at all times, which means that threshold value correction is made. As a result of this threshold value correction, the gate-to-source voltage $V_{gs}$ retained by the storage capacitor 120 is "$V_{sig}$+$V_{th}$"="$V_{in}$+$V_{th}$." In addition, mobility correction is simultaneously made in the sampling period. Thus the sampling period is also the mobility correcting period (writing and mobility correcting period H).

When letting $V_{thEl}$ be the threshold voltage of the organic EL element 127, settings are made such that "$V_{ofs}$−$V_{th}$<$V_{thELr}$," the organic EL element 127 is set in a reverse-biased state and is in a cutoff state (high-impedance state). Therefore, the organic EL element 127 does not emit light, and exhibits a simple capacitance characteristic rather than a diode characteristic. Hence, the drain current (driving current $I_{ds}$) flowing through the driving transistor 121 is written to a capacitance "C=$C_{CS}$+$C_{el}$" obtained by combining the capacitance $C_{CS}$ of the storage capacitor 120 with the capacitance $C_{el}$ of the parasitic capacitance (equivalent capacitance) $C_{el}$ of the organic EL element 127. Thereby, the drain current of the driving transistor 121 flows into the parasitic capacitance $C_{el}$ of the organic EL element 127 and thus starts charging. As a result, the source potential $V_s$ of the driving transistor 121 rises.

In the timing chart of FIG. 10, this rise is denoted by ΔV. The rise, that is, a potential correction value ΔV as a mobility correction parameter is subtracted from the gate-to-source voltage "$V_{gs}$=$V_{in}$+$V_{th}$" retained in the storage capacitor 120 as a result of the threshold value correction, and "$V_{gs}$=$V_{in}$+$V_{th}$−ΔV," which means that negative feedback is applied. The source potential $V_s$ of the driving transistor 121 at this time is a value "−$V_{th}$+ΔV" obtained by subtracting the voltage "$V_{gs}$=$V_{in}$+$_{Vth}$−ΔV" retained in the storage capacitor from the gate potential $V_g$ (=$V_{in}$).

Thus, in the driving timing in the pixel circuit 10, the sampling of the signal amplitude $V_{in}$ and the adjustment of ΔV (amount of negative feedback or the mobility correction parameter) for correcting for the mobility μ are performed in the writing and mobility correcting period H. The writing scanning section 104 can adjust the time width of the writing and mobility correcting period H. The amount of negative feedback of the driving current $I_{ds}$ to the storage capacitor 120 can be thereby optimized.

The potential correction value ΔV is $I_{ds}\cdot t/C_{el}$. Even when the driving current $I_{ds}$ varies due to a variation in mobility μ in each pixel circuit 10, the potential correction value ΔV corresponding to the driving current $I_{ds}$ in each pixel circuit 10 is obtained. Therefore the variation in mobility μ in each pixel circuit 10 can be corrected. Specifically, when the signal amplitude $V_{in}$ is fixed, the higher the mobility μ of the driving transistor 121, the larger the absolute value of the potential correction value ΔV. In other words, the higher the mobility μ, the larger the potential correction value ΔV, so that the variation in mobility μ in each pixel circuit 10 can be removed.

The pixel circuit 10 also has a bootstrap function. Specifically, in a stage where the information of the signal amplitude $V_{in}$ is retained in the storage capacitor 120, the writing scanning section 104 cancels the application of the writing driving pulse WS to the writing scanning line 104WS (that is, sets the writing driving pulse WS to an inactive L (low)), thereby sets the sampling transistor 125 in a non-conducting state, and thus electrically disconnects the gate terminal G of the driving transistor 121 from the video signal line 106HS (emission period I). Proceeding to the emission period I, the horizontal driving section 106 returns the potential of the video signal line 106HS to the reference potential ($V_{ofs}$) at an appropriate subsequent point in time.

The light emitting state of the organic EL element 127 is continued until an (m+m'−1)th horizontal scanning period. This concludes the light emitting operation of the organic EL element 127 forming the (n, m)th sub-pixel. Thereafter, proceeding to a next frame (or field), the threshold value correction preparatory operation, the threshold value correcting operation, the mobility correcting operation, and the light emitting operation are repeated again.

In the emission period I, the gate terminal G of the driving transistor 121 is disconnected from the video signal line 106HS. Because the application of the signal potential ($V_{ofs}$+$V_{in}$) to the gate terminal G of the driving transistor 121 is cancelled, the gate potential $V_g$ of the driving transistor 121 becomes able to rise. The storage capacitor 120 is connected between the gate terminal G and the source terminal S of the driving transistor 121. A bootstrap operation is performed by the effect of the storage capacitor 120. Assuming that the bootstrap gain is one (ideal value), the gate potential $V_g$ of the driving transistor 121 is operatively associated with variation in the source potential $V_s$ of the driving transistor 121, so that the gate-to-source voltage $V_{gs}$ can be held constant. At this time, the driving current $I_{ds}$ flowing through the driving transistor 121 flows to the organic EL element 127, and the anode potential of the organic EL element 127 rises according to the driving current $I_{ds}$. Suppose that an amount of this rise is $V_{el}$. The reverse-biased state of the organic EL element 127 is eventually cancelled as the source potential $V_s$ rises. Thus, the organic EL element 127 actually starts emitting light with the driving current $I_{ds}$ flowing into the organic EL element 127.

The relation of the driving current $I_{ds}$ to the gate-to-source voltage $V_{gs}$ can be expressed as in Equation (5A) or Equation (5B) (both equations will be referred to collectively as Equation (5)) by substituting "$V_{sig}+V_{th}-\Delta V$" or "$V_{in}+V_{th}-\Delta V$" into the foregoing Equation (1) representing the transistor characteristics.

$$I_{ds}=k\cdot\mu\cdot(V_{sig}-V_{ofs}-\Delta V)^2 \quad (5A)$$

$$I_{ds}=k\cdot\mu\cdot(V_{in}-V_{ofs}-\Delta V)^2 \quad (5B)$$

It is shown from Equation (5) that the term of the threshold voltage Vth is cancelled, and that the driving current $I_{ds}$ supplied to the organic EL element 127 is not dependent on the threshold voltage $V_{th}$ of the driving transistor 121. That is, when $V_{ofs}$ is set at 0 volts, for example, the current $I_{ds}$ flowing through the organic EL element 127 is proportional to the square of a value obtained by subtracting the potential correction value ΔV at the second node $ND_2$ (source terminal of the driving transistor 121), the potential correction value ΔV resulting from the mobility μ of the driving transistor 121, from the value of the video signal $V_{sig}$ for controlling luminance in the organic EL element 127. In other words, the current $I_{ds}$ flowing through the organic EL element 127 is not dependent on the threshold voltage $V_{thEL}$ of the organic EL element 127 or the threshold voltage $V_{th}$ of the driving transistor 121. That is, an amount of light (luminance) emitted by the organic EL element 127 is not affected by the threshold voltage $V_{thEL}$ of the organic EL element 127 or the threshold voltage $V_{th}$ of the driving transistor 121. The luminance of the (n, m)th organic EL element 127 is a value corresponding to the current $I_{ds}$.

In addition, a driving transistor 121 of higher mobility μ has a larger potential correction value ΔV and thus has a smaller value of gate-to-source voltage $V_{gs}$. Hence, even when mobility μ is a large value in Equation (5), the value of $(V_{sig}-V_{ofs}-\Delta V)^2$ is small, so that the drain current $I_{ds}$ can be corrected. That is, even in a case of driving transistors 121 different from each other in mobility μ, when the values of video signals $V_{sig}$ are the same, the drain currents $I_{ds}$ are substantially the same. As a result, the currents $I_{ds}$ flowing through the organic EL elements 127 and controlling the luminance of the organic EL elements 127 are uniformized. That is, variations in luminance of the organic EL elements 127 which variations are caused by variations in mobility a (and variations in k) can be corrected.

In addition, the storage capacitor 120 is connected between the gate terminal G and the source terminal S of the driving transistor 121, and bootstrap operation is performed at a start of the emission period due to the effect of the storage capacitor 120. Thus, the gate potential $V_g$ and the source potential $V_s$ of the driving transistor 121 rise while the gate-to-source voltage "$V_{gs}=V_{in}+V_{th}-\Delta V$" of the driving transistor 121 is held constant. When the source potential $V_s$ of the driving transistor 121 becomes "$-V_{th}+\Delta V+V_{el}$," the gate potential $V_g$ becomes "$V_{in}+V_{el}$." At this time, because the gate-to-source voltage $V_{gs}$ of the driving transistor 121 is constant, the driving transistor 121 feeds a constant current (driving current $I_{ds}$) through the organic EL element 127. As a result, the potential of the anode terminal A of the organic EL element 127 (=Potential of Node ND122) rises to a voltage such that a current as the driving current $I_{ds}$ in a state of saturation can flow through the organic EL element 127.

A long light emission time of the organic EL element 127 changes the I-V characteristic of the organic EL element 127. Thus, the potential of the node ND122 changes with the passage of time. However, even when the anode potential of such an organic EL element 127 varies due to secular degradation of the organic EL element 127, the gate-to-source voltage $V_{gs}$ retained by the storage capacitor 120 is constantly held constant at "$V_{in}+V_{th}-\Delta V$." The driving transistor 121 operates as a constant-current source. Thus, even when the I-V characteristic of the organic EL element 127 changes with the passage of time, and the source potential $V_s$ of the driving transistor 121 correspondingly changes, because the gate-to-source voltage $V_{gs}$ of the driving transistor 121 is held constant ($\approx V_{in}+V_{th}-\Delta V$) by the storage capacitor 120, the current flowing through the organic EL element 127 is unchanged, and therefore the light emission luminance of the organic EL element 127 is also held constant. In actuality, the bootstrap gain is smaller than "1." Thus, the gate-to-source voltage $V_{gs}$ is decreased from "$V_{in}+V_{th}-\Delta V$," but still the gate-to-source voltage $V_{gs}$ corresponding to the bootstrap gain is maintained.

As described above, when the driving timing is devised, the pixel circuit 10 automatically forms a threshold value correcting circuit and a mobility correcting circuit. Specifically, in order to prevent the effects of variations in characteristics of the driving transistor 121 (variations in the threshold voltage $V_{th}$ and the carrier mobility μ in the present example) on the driving current $I_{ds}$, the pixel circuit 10 functions as a driving signal uniformizing circuit for holding the driving current constant by correcting the effects of the threshold voltage $V_{th}$ and the carrier mobility μ. Not only bootstrap operation but also threshold value correcting operation and mobility correcting operation are performed. Therefore the gate-to-source voltage $V_{gs}$ maintained by the bootstrap operation is adjusted by the voltage corresponding to the threshold voltage $V_{th}$ and the potential correction value ΔV for mobility correction. Thus, the light emission luminance of the organic EL element 127 is not affected by the variations in the threshold voltage $V_{th}$ or mobility μ of the driving transistor 121 nor affected by the secular degradation of the organic EL element 127. As a result, the display device 1 can make display with a stable gradation corresponding to the input video signal $V_{sig}$ (signal amplitude $V_{in}$), and thus provide an image of high image quality.

In addition, the pixel circuit 10 can be formed with the source follower circuit using the n-channel type driving transistor 121. Thus, even when the organic EL element 127 with the anode and cathode electrodes in the present situation is used as it is, the pixel circuit 10 can drive the organic EL element 127. In addition, the pixel circuit 10 can be formed with transistors of the re-channel type alone including the driving transistor 121, the sampling transistor 125 in the peripheral part of the driving transistor 121, and the like. Thus, a cost reduction can also be achieved in transistor fabrication.

[Causes for Occurrence of Luminance Shortage Phenomenon]

It is important how to write the information corresponding to the signal potential $V_{in}$ to the storage capacitor 120 with a larger magnitude and with higher fidelity (with linearity) at a time of signal writing operation in the sampling period and the mobility correcting period. The "larger magnitude" is defined by a so-called writing gain $G_{in}$. In order to secure luminance efficiently with respect to the signal potential $V_{in}$ of the video signal $V_{sig}$, the ratio (writing gain $G_{in}$) of a voltage retained by the storage capacitor 120 of the capacitance $C_{CS}$ to the video signal $V_{sig}$ (signal potential $V_{in}$) is preferably set as high as possible under conditions where the driving current $I_{ds}$ flows with a rise in the gate potential $V_g$ of the driving transistor 121 and the source potential $V_s$ does not rise at a time of writing, that is, under conditions of low source potential $V_s$ of the driving transistor 121 at a time of writing. Using the capacitance $C_{CS}$ of the storage capacitor 120, the capacitance $C_{gs}$ of a parasitic capacitance $C121_{gs}$ formed at the gate terminal G of the driving transistor 121, and the parasitic capacitance $C_{el}$ of the organic EL element 127, the writing gain $G_{in}$ under such conditions can be expressed as $$G_{in}=C2/(C1+C2)=(C_{CS}+C_{gs})/\{(C_{CS}+C_{gs})+C_{el}\}$$

When the auxiliary capacitance 310 is taken into consideration, it suffices to change $C_{el}$ to "$C_{el}+C_{sub}$."

The capacitance $C_{gs}$ of the parasitic capacitance $C\mathbf{121}_{gs}$ may be considered to be smaller than the capacitance $C_{CS}$ of the storage capacitor 120 and the parasitic capacitance $C_{el}$ of the organic EL element 127. Thus, the writing gain $G_{in}$ is infinitely close to "1" when the parasitic capacitance $C_{el}$ of the organic EL element 127 is sufficiently larger than the capacitance $C_{CS}$ of the storage capacitor 120, or in other words when the value of the capacitance (capacitance $C_{CS}$ of the storage capacitor 120 in this case) added between the gate terminal G and the source terminal S of the driving transistor 121 is decreased or when the value of the capacitance (parasitic capacitance $C_{el}$ of the organic EL element 127 in this case) added between the source terminal S of the driving transistor 121 (that is, the anode terminal A of the organic EL element 127) and the cathode wiring cath (that is, the cathode terminal K of the organic EL element 127) is increased. Thus, voltage information closer to the magnitude of the signal potential $V_{in}$ can be written to the storage capacitor 120.

On the other hand, it has been found that a back gate effect (referred to also as a substrate bias effect) needs to be considered for "higher fidelity (with linearity)." Specifically, when a field effect transistor having a back gate effect is used as the writing transistor $TR_W$, a phenomenon occurs in which even when a high video signal level is input to obtain high luminance, a luminance corresponding to the input video signal level may not be obtained. Suppose for example that a MOS transistor is used. Normally, the base potential (back gate potential) of the MOS transistor is basically set at a lowest voltage used in an emission state within the pixel circuit 10. For example, as in the first comparative example of FIG. 4 and FIG. 5, the lowest voltage (ground potential) is applied as a fixed potential to the base potential. In this case, the higher the necessary light emission luminance, the higher the gate potential and the source potential need to be, and the more the base-to-source voltage $V_{bs}$ (potential difference between the source terminal and the base terminal (back gate terminal)) is increased. However, in this case, as the base-to-source voltage $V_{bs}$ is increased, the threshold voltage $V_{th}$ of the sampling transistor 125 is increased due to the substrate bias effect, and therefore makes writing difficult, and acts in a direction of suppressing luminance. Therefore a luminance shortage phenomenon occurs. The luminance shortage phenomenon differs according to a gradation, which means that there is a γ characteristic (linearity is lost) for each gradation. In a case of color display, there is a fear of a hue shift. In order to eliminate the luminance shortage phenomenon, the gate-to-source voltage $V_{gs}$ of the sampling transistor 125 needs to be further increased. As a result, the voltage of the video signal $V_{sig}$ needs to be set higher.

[Method as Measure Against Luminance Shortage Phenomenon]

The present embodiment eliminates the luminance shortage phenomenon caused by the back gate effect by supplying a transistor characteristic control signal Vb based on a "signal related to signal writing" to the transistor characteristic control terminal of the sampling transistor 125 and thereby improving a transistor characteristic at a time of signal writing. "Improving the transistor characteristic" means improving a writing capability, and decreases the threshold voltage $V_{th}$ as an example.

Figure 11:
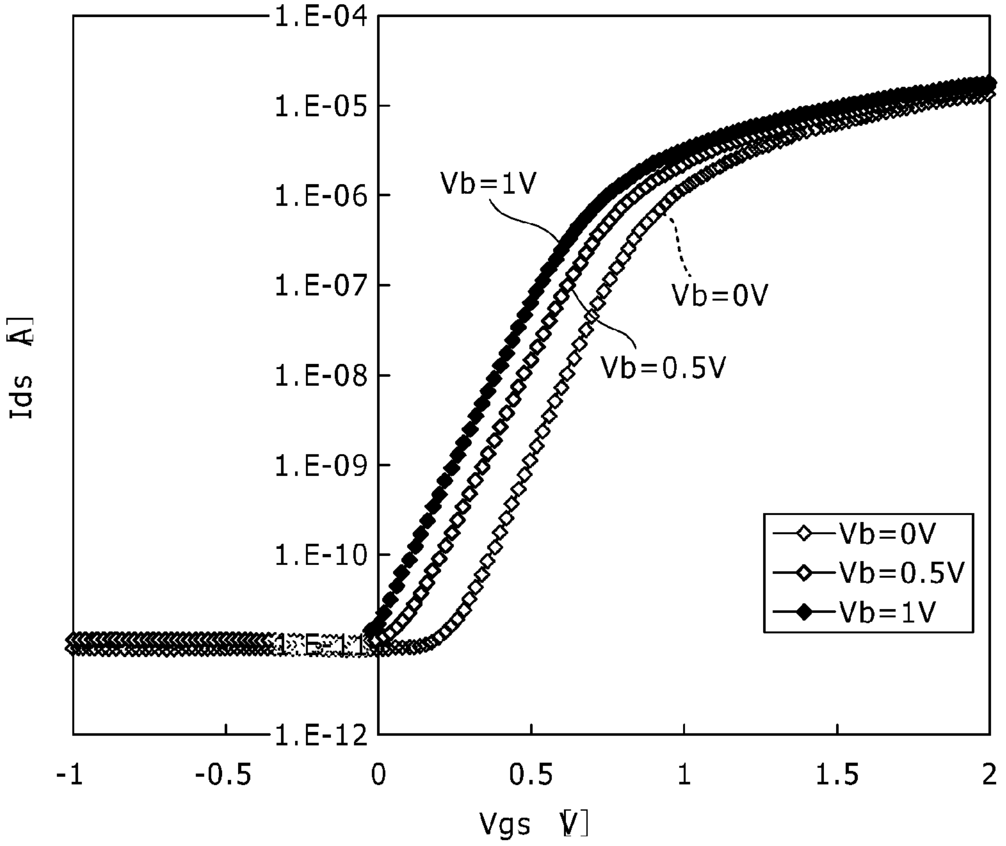
FIG. 11 is a diagram of assistance in explaining principles of a measure against a luminance shortage phenomenon caused by a back gate effect, and is a diagram of assistance in explaining the dependence of a transistor characteristic on substrate potential.
Figure 12:
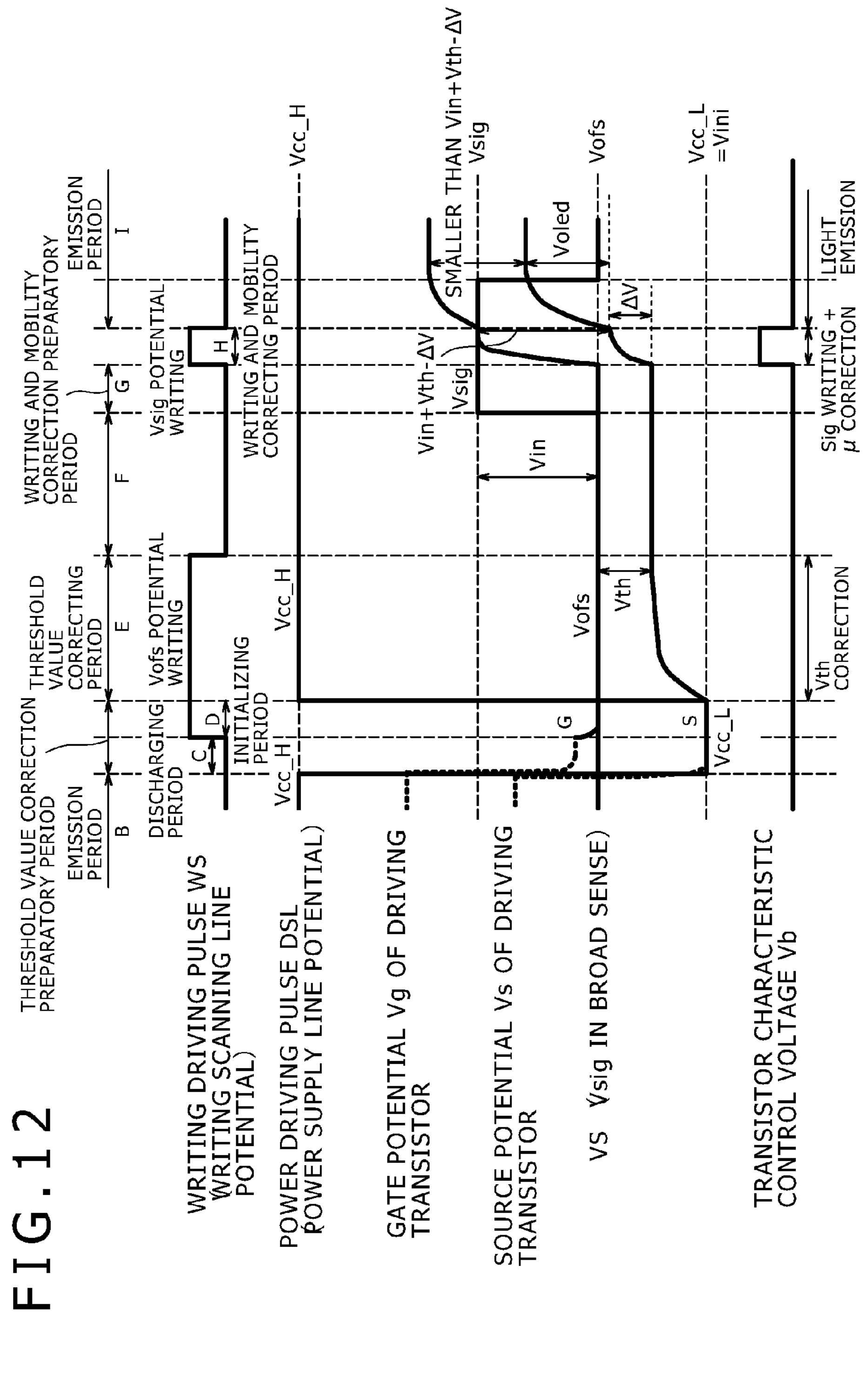
FIG. 12 is a timing chart of assistance in explaining a method of driving the pixel circuit according to the first embodiment with attention directed to a transistor characteristic control voltage.

FIGS. 11 and 12 are diagrams of assistance in explaining principles of the measure against the luminance shortage phenomenon caused by the back gate effect. FIG. 11 is a diagram of assistance in explaining the dependence of the transistor characteristic ($V_{gs}-I_{ds}$ characteristic) on substrate potential. FIG. 12 is a timing chart of assistance in explaining a method of driving the pixel circuit according to the first embodiment with attention directed to the transistor characteristic control signal Vb.

As is well known, the transistor characteristic of a back gate type thin film transistor or a MOS transistor varies due to the back gate effect. For example, in general, the MOS transistor is often treated as a three-terminal device as with a bipolar transistor. However, the MOS transistor should be treated as a four-terminal device, to be more accurate, because a substrate or a well in which a source region and a drain region are formed should be regarded as a control terminal (transistor characteristic control terminal). The transistor characteristic can be controlled when the transistor characteristic control signal Vb (referred to also as a back gate voltage, a substrate potential, or a base potential) is applied between the source and the transistor characteristic control terminal (for example the substrate (referred to also as a body)). The back gate voltage is generally applied as a negative voltage so that the diode is in a cutoff state. For example, when the back gate voltage is applied, a depletion layer directly under a source and a drain channel is changed as in the diode, and the potential of a semiconductor surface is changed. Thus, a charge in the depletion layer is changed according to whether the back gate voltage is applied or not. The transistor characteristic ($V_{gs}$–$I_{ds}$ characteristic) is changed as shown in FIG. 11. Thus, the threshold voltage $V_{th}$ is changed. It is known that when the back gate effect is taken into consideration, the threshold voltage $V_{th}$ increases at a rate of about the ½th power of the back gate voltage. Incidentally, while the threshold voltage $V_{th}$ increases at a rate of about the ½th power of the back gate voltage in a simple theory, it is often that no problem is presented in practice even when the increase is regarded as a linear increase.

As shown in FIG. 11, as the substrate potential (that is, the transistor characteristic control signal Vb) rises, the threshold value is decreased, so that the writing of the signal voltage by the sampling transistor 125 can be facilitated. That is, as in FIG. 12, it suffices for the transistor characteristic control signal Vb based on the "signal related to signal writing" to be able to decrease the threshold voltage $V_{th}$ of the sampling transistor 125 at least at a time of signal writing (particularly for a certain period immediately after a start of writing). The "certain period immediately after a start of writing" does not need to be the entire period of the video signal writing process step (the sampling period and the mobility correcting period in the first embodiment), but means that it suffices to change the threshold voltage $V_{th}$ of the sampling transistor 125 so as to lower the threshold voltage $V_{th}$ of the sampling transistor 125 during the certain period from the start. It suffices for the "certain period" to be a period before the voltage corresponding to the amplitude of the video signal is substantially written to the storage capacitor 120.

The transistor characteristic controlling section 620A is configured to set the transistor characteristic control signal Vb for the sampling transistor 125 in each pixel circuit 10A. When the transistor characteristic control signal Vb for the sampling transistor 125 is raised during the certain period from the start of signal writing, the threshold voltage $V_{th}$ can be made lower, so that the writing of the signal voltage by the sampling transistor 125 can be facilitated. A high video signal level is input to obtain high luminance, and the threshold voltage $V_{th}$ is shifted by similarly raising the transistor characteristic control signal Vb for the sampling transistor 125 in such a manner as to be operatively associated with the input of the high video signal level. The luminance shortage phenomenon can be thereby suppressed or eliminated. The constitution as described above can eliminate a problem of difficulty in producing a high luminance (difficulty in writing) or a need to set a higher signal voltage.

Second Embodiment

Figure 13:
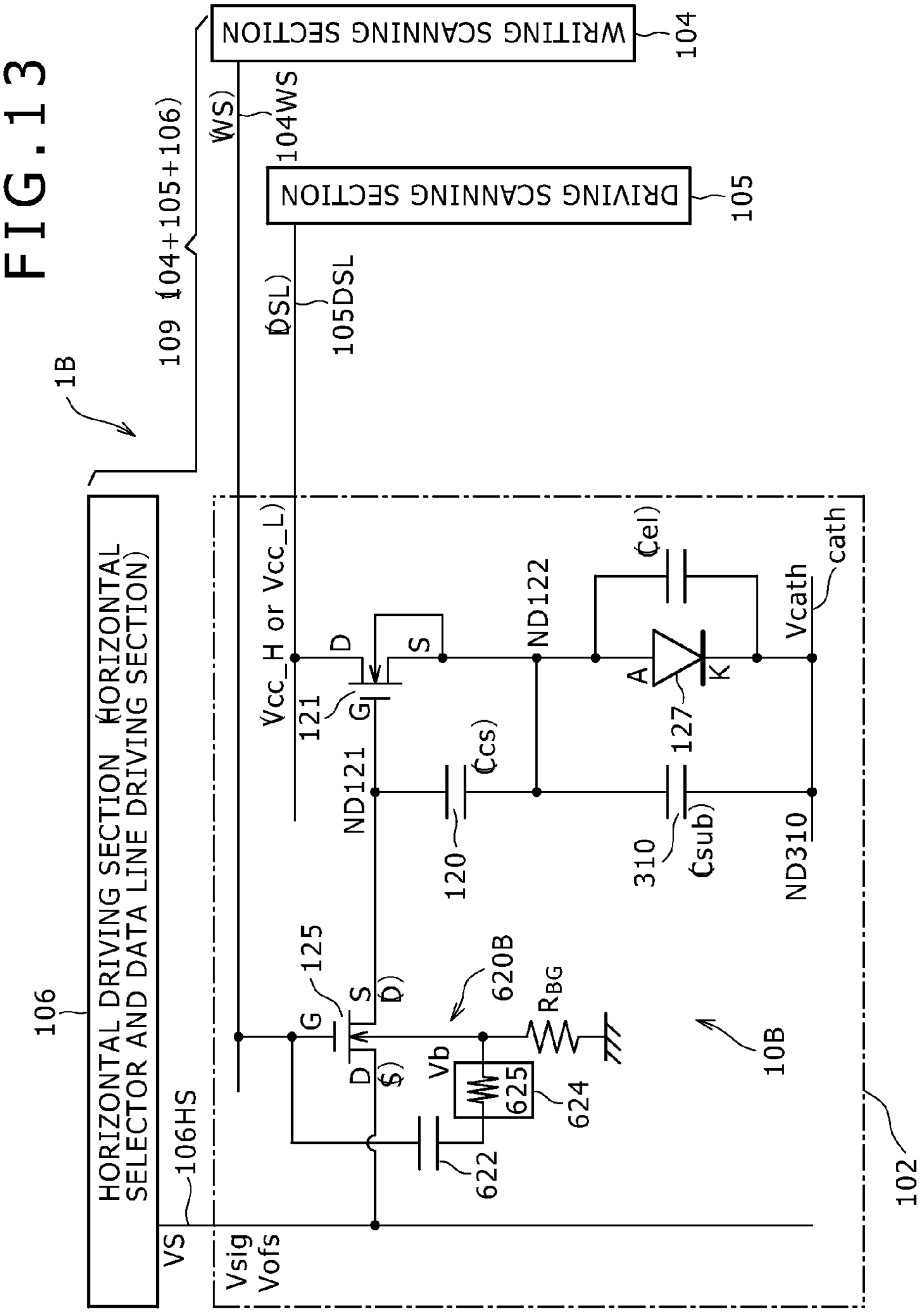
FIG. 13 is a diagram showing one form of a pixel circuit according to a second embodiment.
Figure 14:
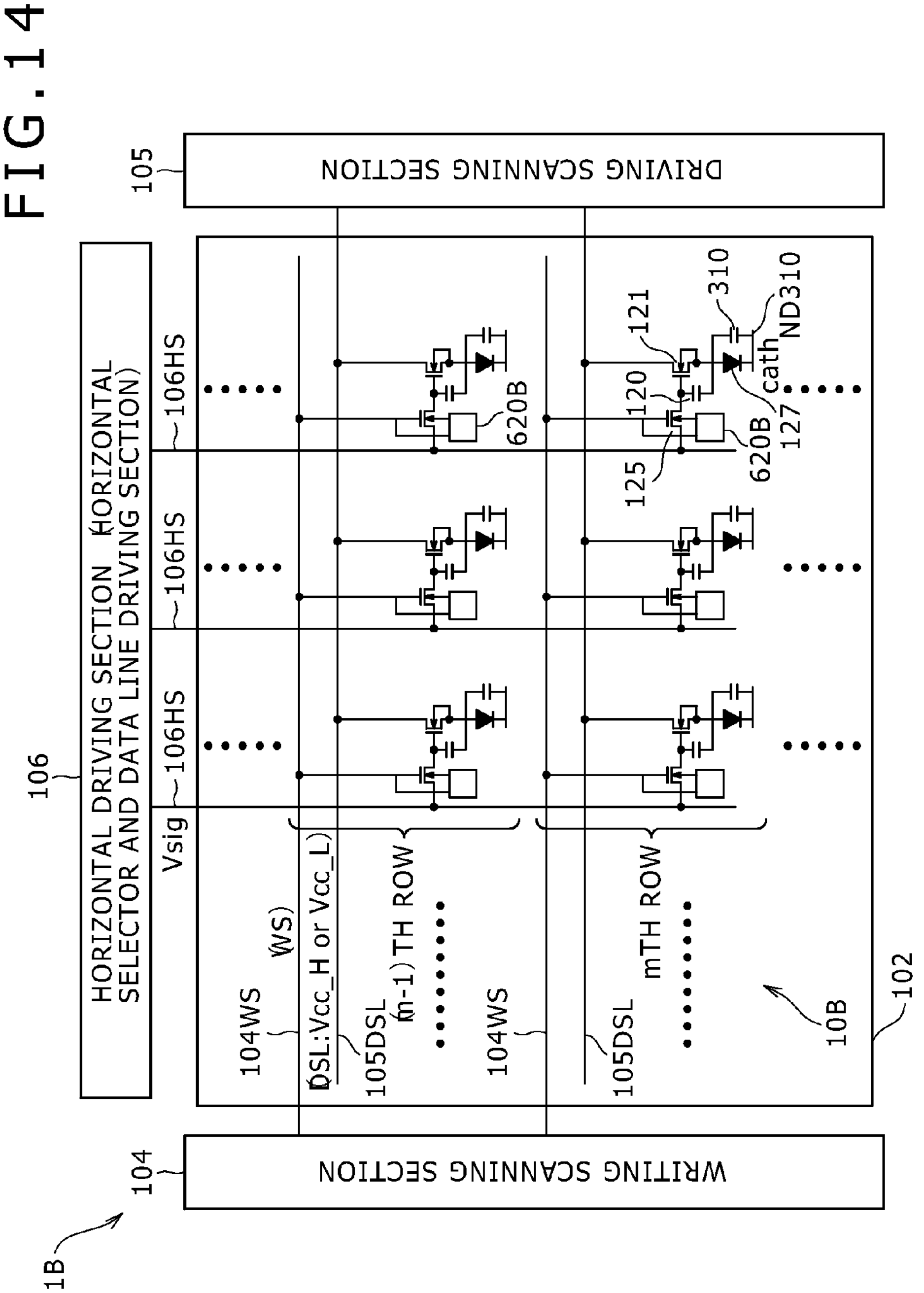
FIG. 14 is a diagram showing general outlines of a display device including the pixel circuit according to the second embodiment.
Figure 15:
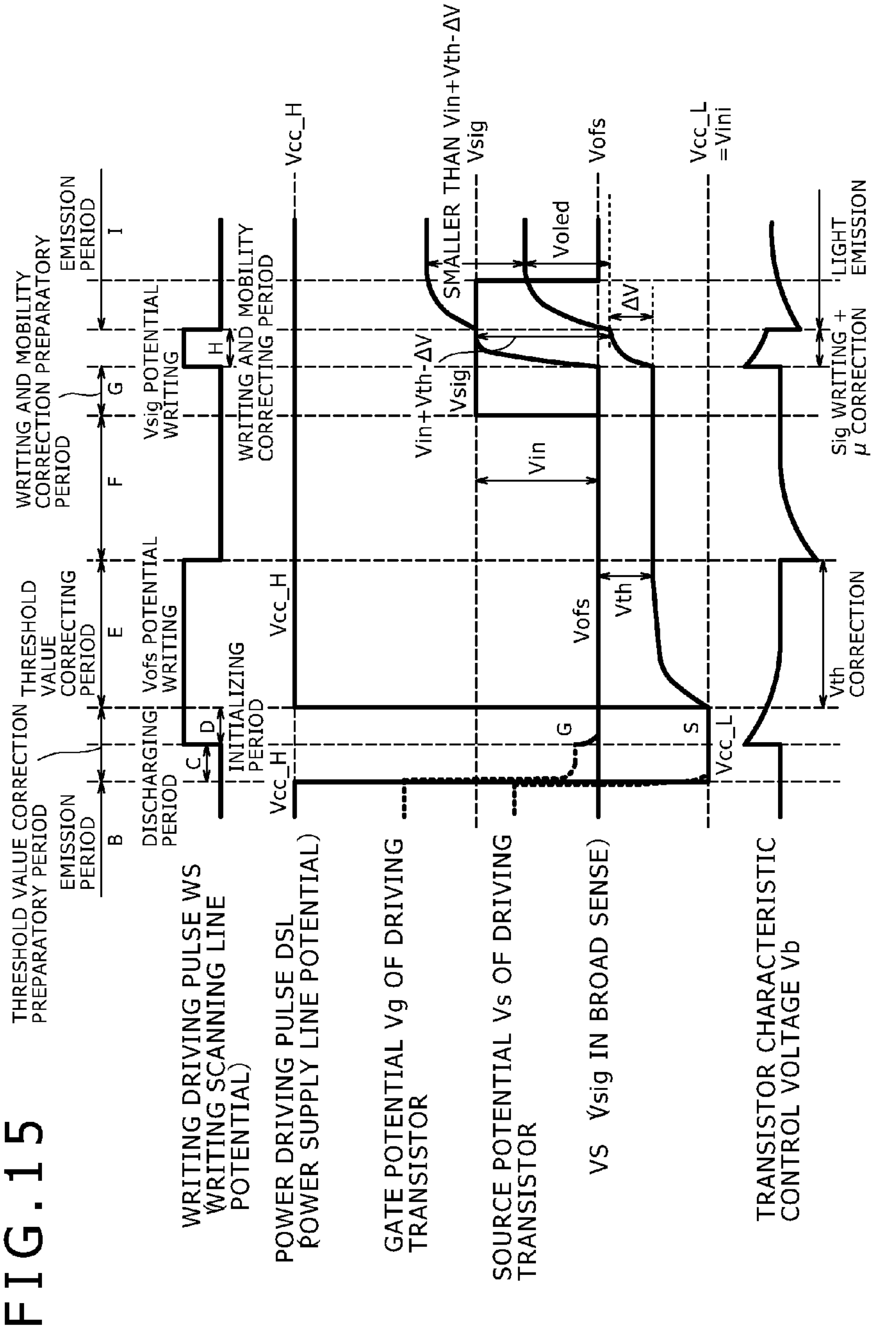
FIG. 15 is a timing chart of assistance in explaining a method of driving the pixel circuit according to the second embodiment with attention directed to a transistor characteristic control voltage.

FIGS. 13 and 14 are diagrams showing a pixel circuit 10B according to a second embodiment and a form of a display device including the pixel circuit 10B. The display device having the pixel circuit 10B according to the second embodiment in a pixel array section 102 will be referred to as a display device 1B according to the second embodiment. FIG. 13 shows a basic constitution (of one pixel). FIG. 14 shows a concrete constitution (whole of the display device). FIG. 15 is a timing chart of assistance in explaining the operation of the second embodiment with attention directed to a transistor characteristic control signal Vb.

As shown in FIG. 13 and FIG. 14, the second embodiment has a transistor characteristic controlling section 620B in each pixel circuit 10B. The transistor characteristic controlling section 620B has a capacitance element 622 connected between the transistor characteristic control terminal (back gate terminal) and the control input terminal (gate terminal) of a sampling transistor 125. The characteristic controlling scanning section 621 is not necessary. Incidentally, the wiring resistance of the back gate of the sampling transistor 125 is represented by a resistance element $R_{BG}$ in FIG. 13. The transistor characteristic controlling section 620B may further include a time constant adjusting section 624 for adjusting the time constant of the signal supplied to the transistor characteristic control terminal via the capacitance element 622, though the time constant adjusting section 624 is not essential. As an example, the time constant adjusting section 624 has a resistance element 625 connected between the transistor characteristic control terminal of the sampling transistor 125 and wiring for supplying the transistor characteristic control signal Vb. In FIG. 13, the resistance element 625 is disposed between the capacitance element 622 and the back gate terminal of the sampling transistor 125. However, the resistance element 625 may be disposed between the capacitance element 622 and the gate terminal of the sampling transistor 125.

The transistor characteristic controlling section 620A according to the first embodiment "uses a signal related to signal writing" in regard to how to generate the transistor characteristic control signal Vb for suppressing the luminance shortage phenomenon caused by the back gate effect, and may use any signal as long as a signal related to signal wiring is used. On the other hand, the second embodiment uses a writing pulse WS for performing on/off control of the sampling transistor 125 as a concrete example of a "signal related to signal writing." In the second embodiment, the capacitance element 622 is added between the back gate of the sampling transistor 125 and a gate line (writing scanning line 104WS), thereby inputting a coupling voltage of a rising edge of the writing pulse WS at a time of signal writing to the base potential, and thereby facilitating the writing of the signal voltage by the sampling transistor 125.

When the writing pulse WS is coupled to the back gate terminal via the capacitance element 622, as shown in FIG. 15, the transistor characteristic control signal Vb can be increased for a certain period from a start of a sampling period and a mobility correcting period. Thereby, the threshold voltage $V_{th}$ of the sampling transistor 125 is changed so as to become lower, so that the writing of the signal voltage by the sampling transistor 125 can be facilitated. Incidentally, the transistor characteristic control signal Vb for the sampling transistor 125 is decreased for a certain period from a start of a falling edge due to coupling of a falling edge of the writing pulse WS at the time of signal writing. However, this causes no problem. Further, unlike a third embodiment to be described later, the transistor characteristic control signal Vb for the sampling transistor 125 is increased for a certain period from a start of a period of initializing a node ND121 (first node). However, this causes no problem.

Incidentally, the base potential of the sampling transistor 125 is a fixed potential, and ideally the coupling voltage is not input to the base potential. However, because the wiring resistance (resistance element $R_{BG}$) of the back gate is present in actuality, the coupling voltage can be input to the back gate terminal when the capacitance element 622 is connected between the back gate terminal as the transistor characteristic control terminal and the control input terminal as in the second embodiment.

However, the wiring resistance (resistance element $R_{BG}$) of the back gate has a small resistance value, and there may be a case where the coupling via the capacitance element 622 has a small effect. That is, the time constant defined by the capacitance element 622 and the wiring resistance (=resistance element $R_{BG}$) of the back gate is small, and a coupling voltage supply time is short. When a period of increasing the transistor characteristic control signal Vb at the start of the sampling period and the mobility correcting period is desired to be lengthened to a certain extent, the time constant adjusting section 624 is preferably formed by providing the resistance element 625 between the transistor characteristic control terminal of the sampling transistor 125 and the wiring for supplying the transistor characteristic control signal Vb. Because of the interposition of the resistance element 625, the voltage of the writing pulse WS is divided between the resistance element 625 and the resistance element $R_{BG}$. However, the time constant defined by the capacitance element 622 and the resistance element 625 (and the wiring resistance of the back gate=resistance element $R_{BG}$) can be increased. Thus, the period of increasing the transistor characteristic control signal Vb at the start of the sampling period and the mobility correcting period can be lengthened.

Third Embodiment

Figure 16:
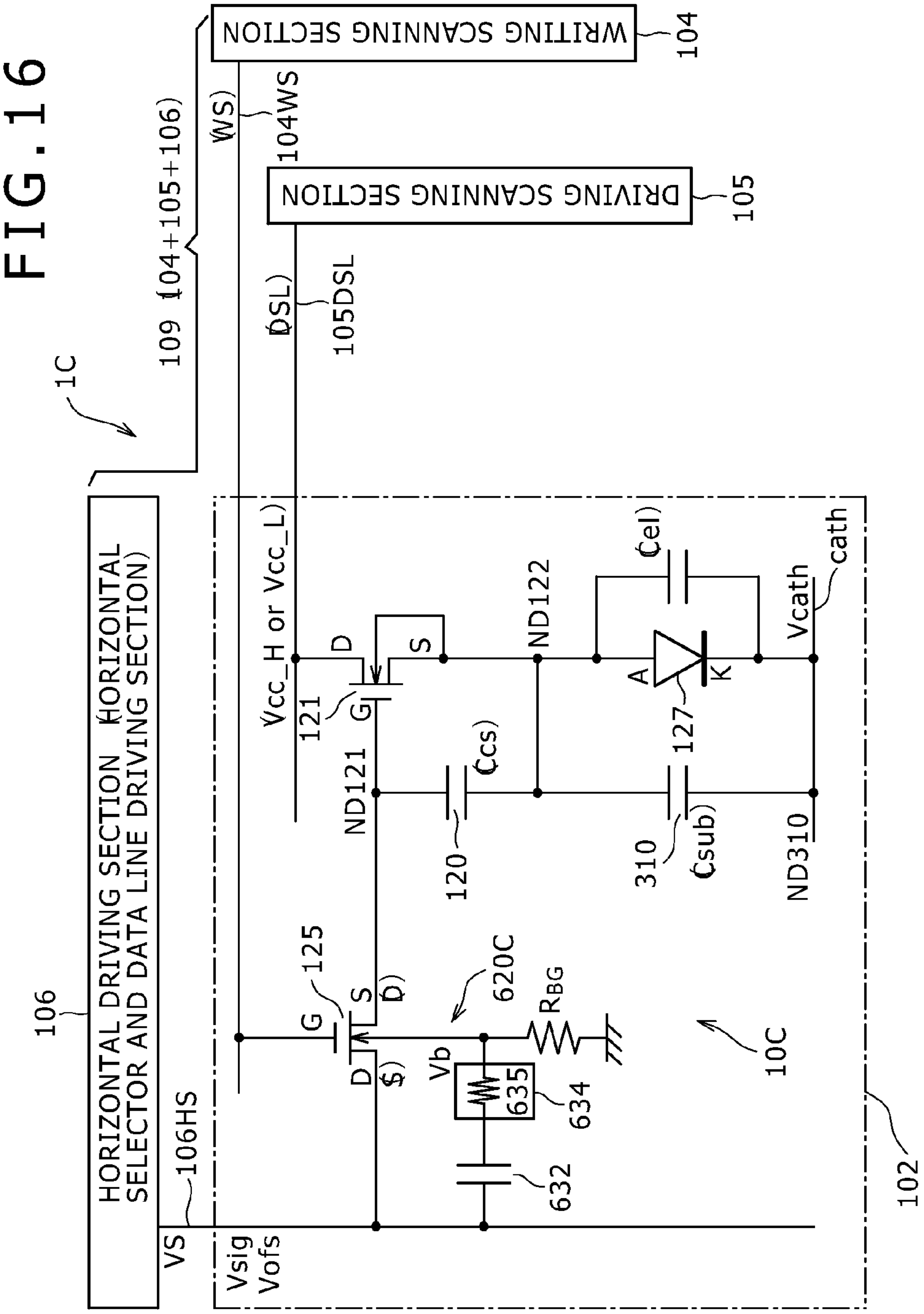
FIG. 16 is a diagram showing one form of a pixel circuit according to a third embodiment.
Figure 17:
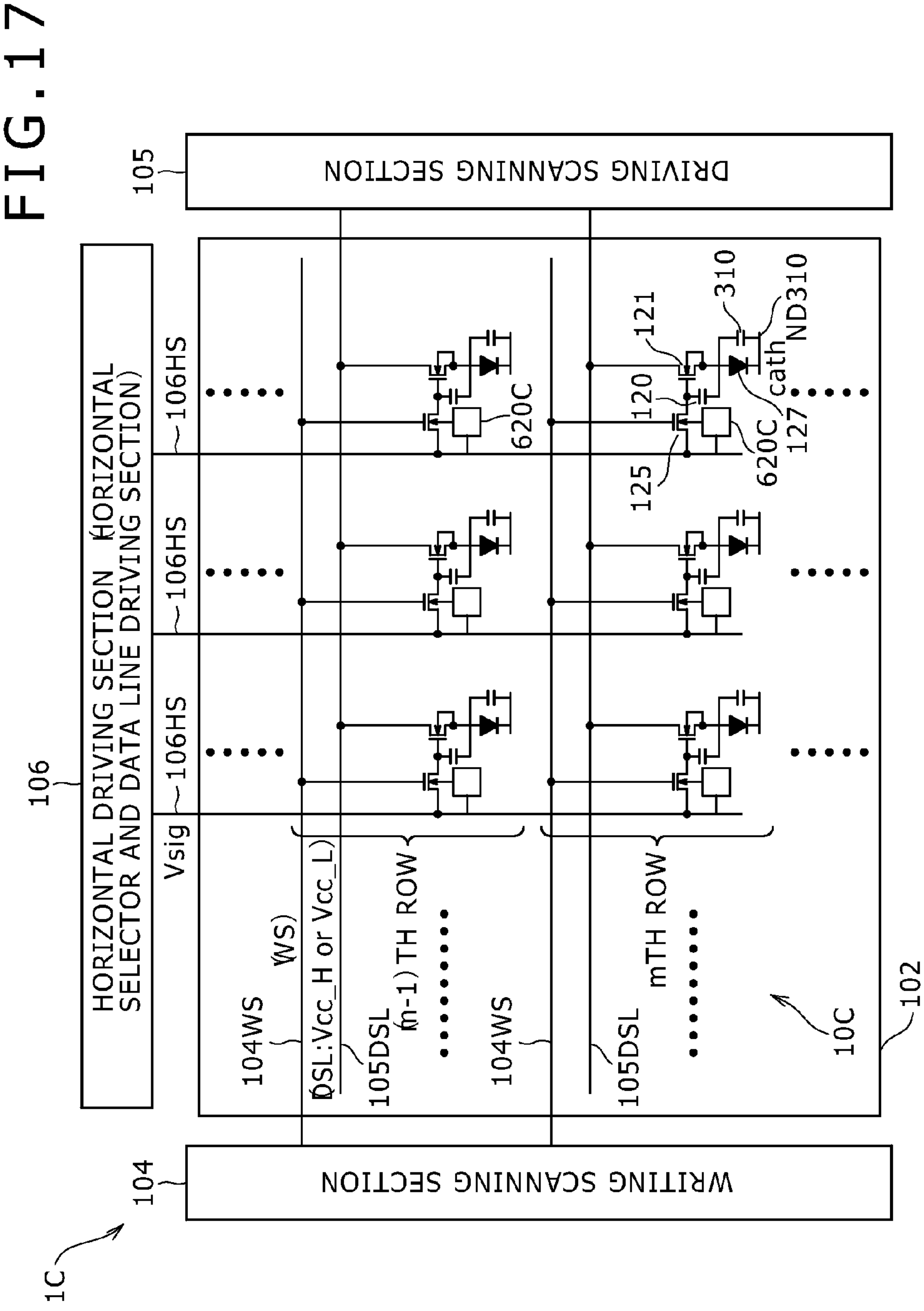
FIG. 17 is a diagram showing general outlines of a display device including the pixel circuit according to the third embodiment.
Figure 18:
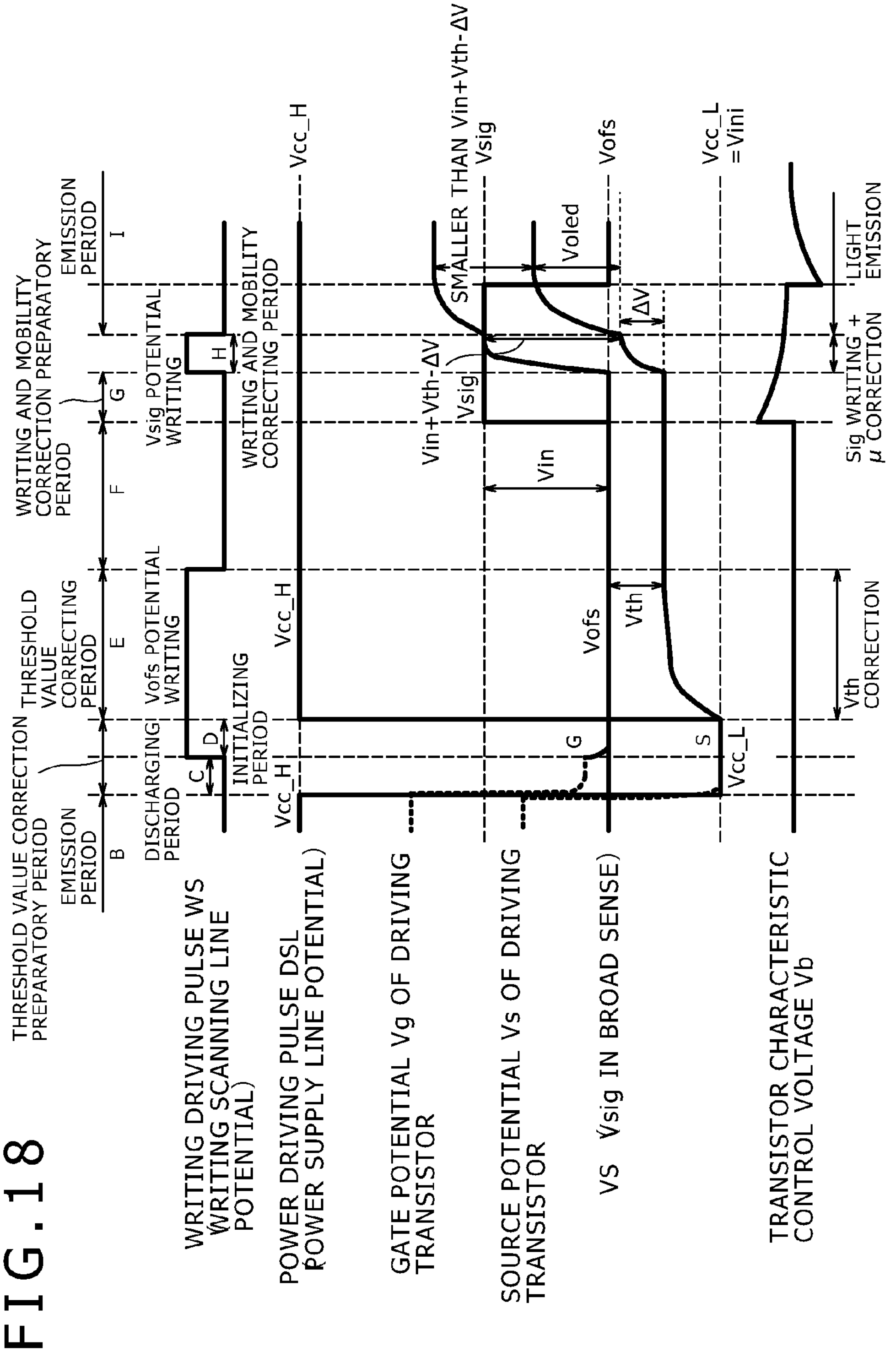
FIG. 18 is a timing chart of assistance in explaining a method of driving the pixel circuit according to the third embodiment with attention directed to a transistor characteristic control voltage.

FIGS. 16 and 17 are diagrams showing a pixel circuit 10C according to a third embodiment and a form of a display device including the pixel circuit 10C. The display device having the pixel circuit 10C according to the third embodiment in a pixel array section 102 will be referred to as a display device 1C according to the third embodiment. FIG. 16 shows a basic constitution (of one pixel). FIG. 17 shows a concrete constitution (whole of the display device). FIG. 18 is a timing chart of assistance in explaining the operation of the third embodiment with attention directed to a transistor characteristic control signal Vb.

As shown in FIG. 16 and FIG. 17, the third embodiment has a transistor characteristic controlling section 620C in each pixel circuit 10C. The transistor characteristic controlling section 620C has a capacitance element 632 connected between the transistor characteristic control terminal (back gate terminal) of a sampling transistor 125 and a video signal line 106HS as a video signal line DTL. The characteristic controlling scanning section 621 is not necessary. Incidentally, the wiring resistance of the back gate of the sampling transistor 125 is represented by a resistance element $R_{BG}$ in FIG. 16. The transistor characteristic controlling section 620C may further include a time constant adjusting section 634 for adjusting the time constant of the signal supplied to the transistor characteristic control terminal via the capacitance element 632, though the time constant adjusting section 634 is not essential. As an example, the time constant adjusting section 634 has a resistance element 635 connected between the transistor characteristic control terminal of the sampling transistor 125 and wiring for supplying the transistor characteristic control signal Vb. In FIG. 16, the resistance element 635 is disposed between the capacitance element 632 and the back gate terminal of the sampling transistor 125. However, the resistance element 635 may be disposed between the capacitance element 632 and the video signal line 106HS.

The third embodiment has a similar constitution to that of the second embodiment, but is different in that the third embodiment inputs a coupling voltage of a rising edge of a video signal $V_{sig}$ at a time of signal writing to a base potential by adding the capacitance element 632 between the back gate of the sampling transistor 125 and the video signal line DTL (video signal line 106HS), so that the writing of the signal voltage by the sampling transistor 125 is facilitated.

When a rising edge of the potential of the video signal line is coupled to the back gate terminal via the capacitance element 632, as shown in FIG. 18, the transistor characteristic control signal Vb can be increased for a certain period from a start of a sampling period and a mobility correcting period. Thereby, the threshold voltage $V_{th}$ of the sampling transistor 125 is changed so as to become lower, so that the writing of the signal voltage by the sampling transistor 125 can be facilitated.

Incidentally, also in the third embodiment, as in the second embodiment, in consideration of a small resistance value of the wiring resistance of the back gate (resistance element $R_{BG}$), a time constant adjusting section 634 similar to the time constant adjusting section 624 may be provided to lengthen a period of increasing the transistor characteristic control signal Vb at the start of the sampling period and the mobility correcting period to a certain extent.

In the second embodiment, a constant transistor characteristic control signal Vb is supplied to the back gate terminal of the sampling transistor 125 irrespective of the amplitude of the video signal. In the third embodiment, the transistor characteristic control signal Vb having a magnitude corresponding to the amplitude of the video signal is supplied to the back gate terminal of the sampling transistor 125. That is, the luminance shortage phenomenon caused by the back gate effect differs according to the video signal $V_{sig}$, and the third embodiment can control the transistor characteristic control terminal in each pixel circuit 10B while reflecting the difference.

Fourth Embodiment

Figure 19:
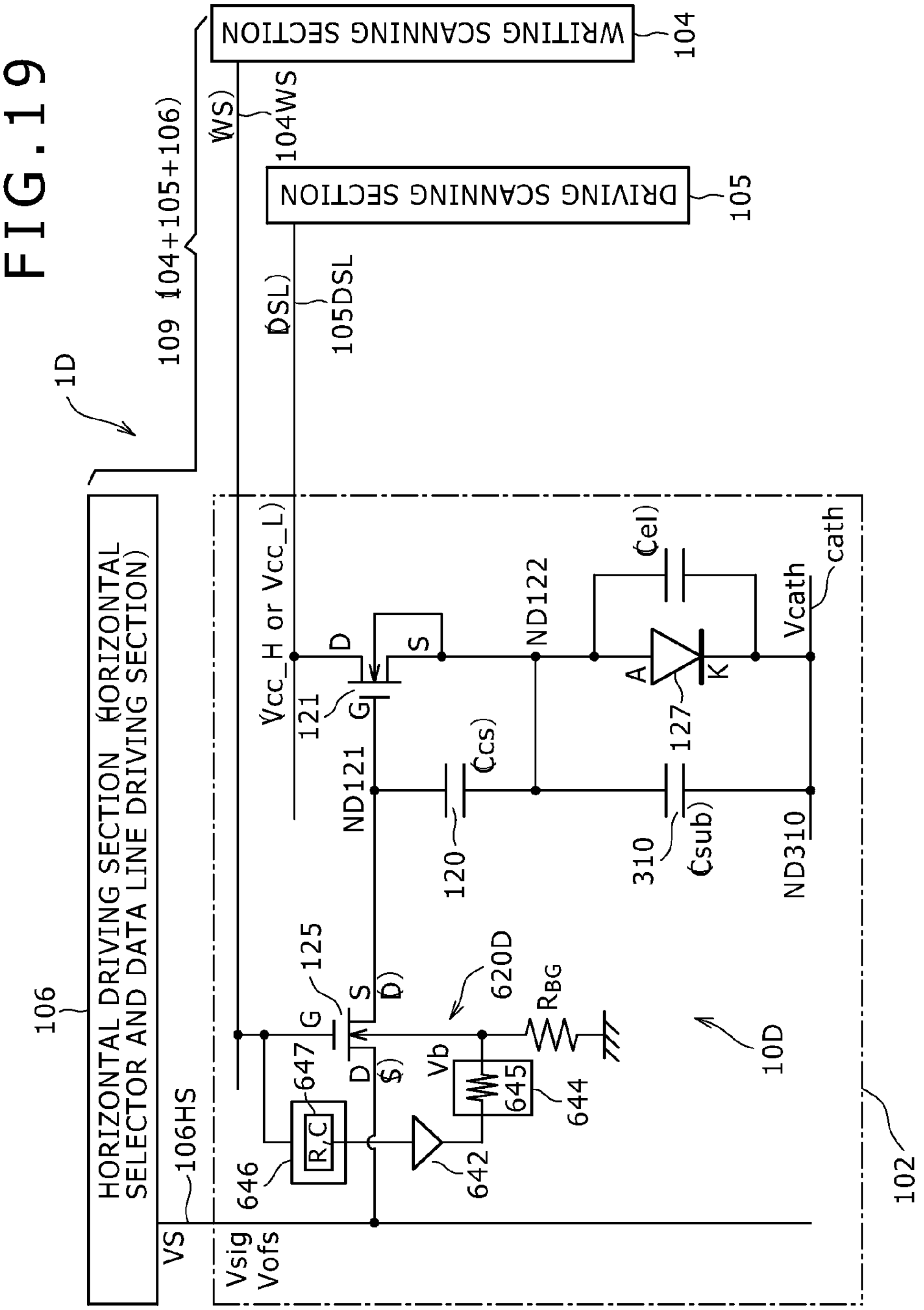
FIG. 19 is a diagram showing one form of a pixel circuit according to a fourth embodiment.
Figure 20:
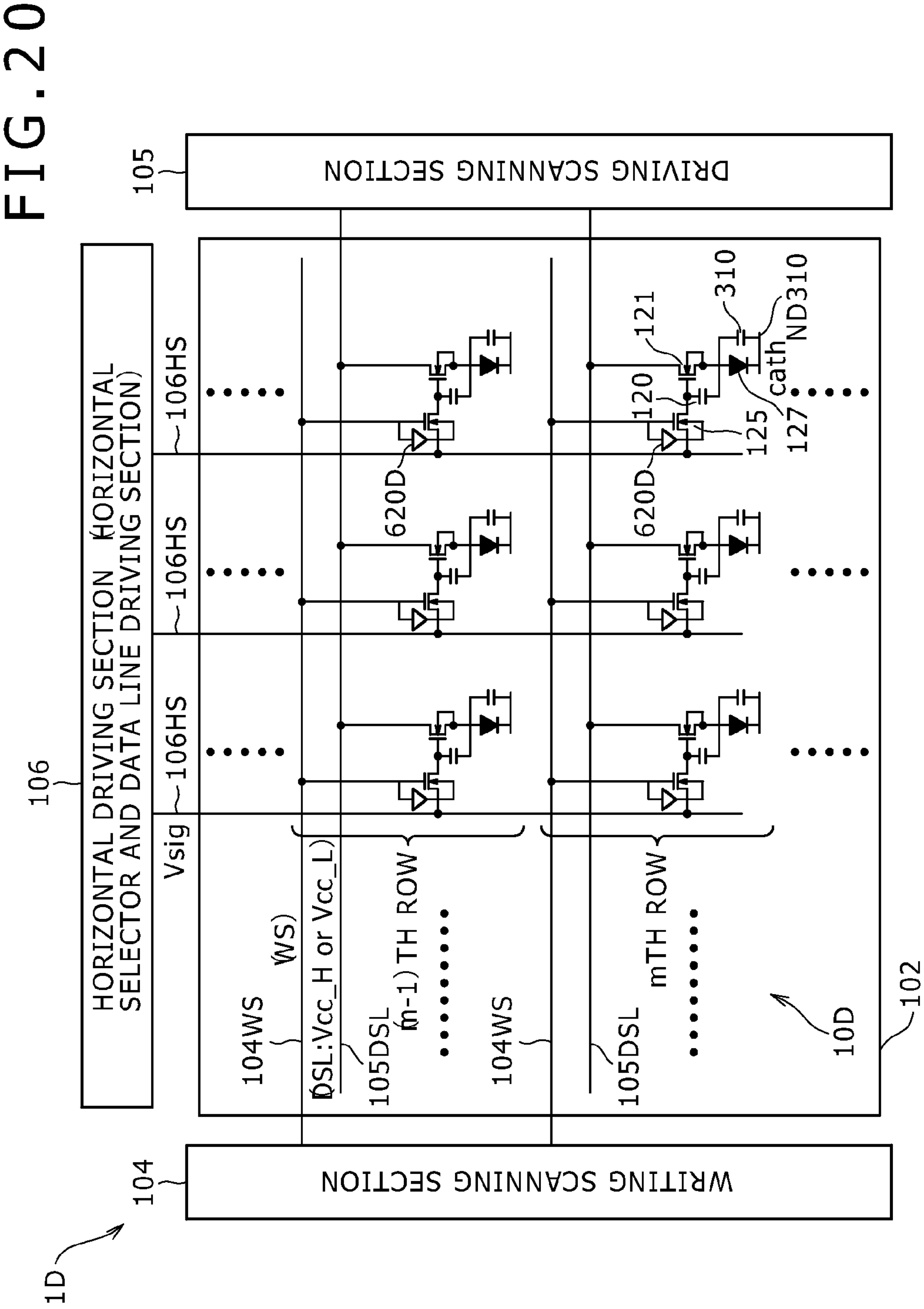
FIG. 20 is a diagram showing general outlines of a display device including the pixel circuit according to the fourth embodiment.
Figure 21:
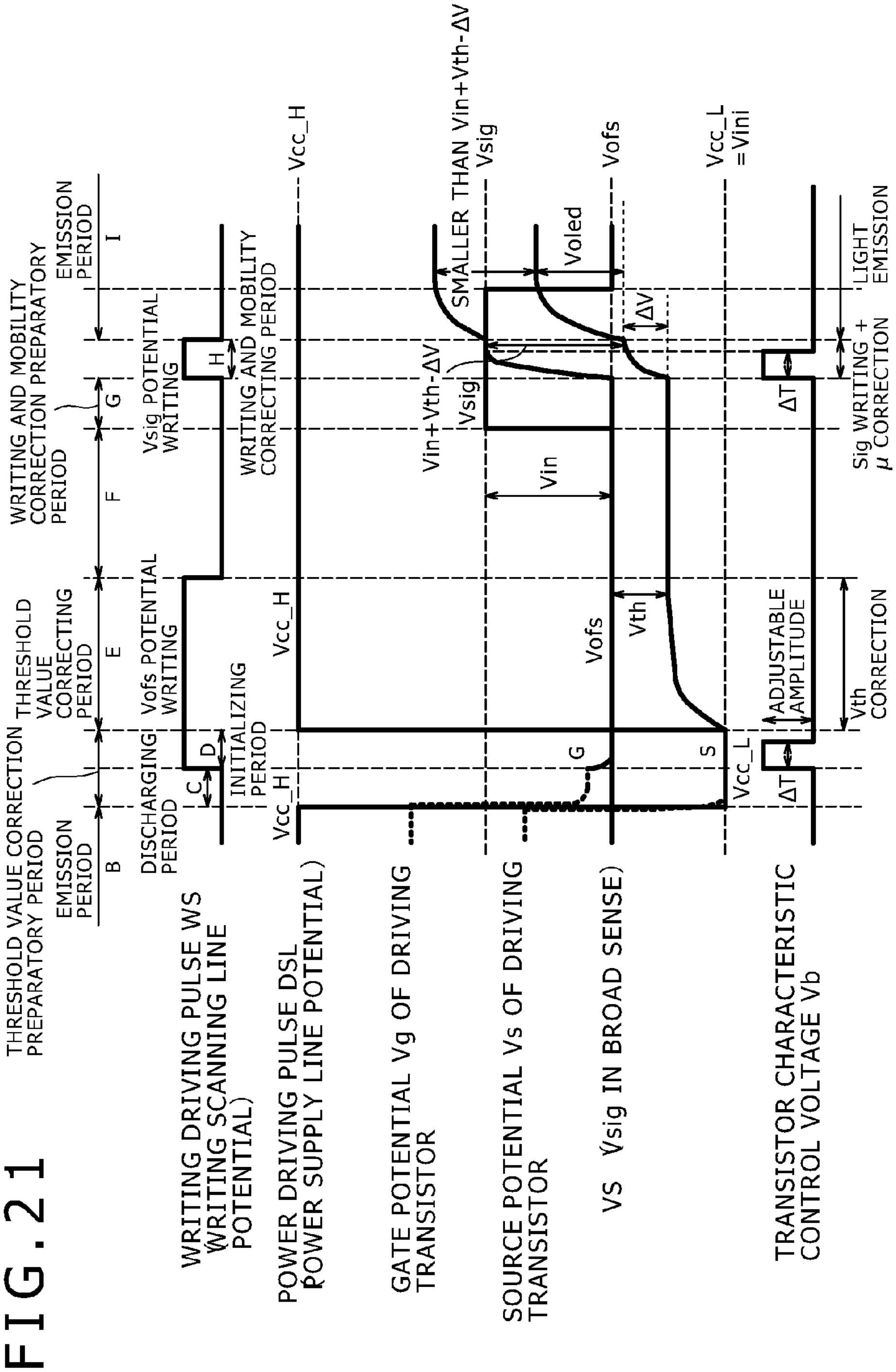
FIG. 21 is a timing chart of assistance in explaining a method of driving the pixel circuit according to the fourth embodiment with attention directed to a transistor characteristic control voltage.

FIGS. 19 and 20 are diagrams showing a pixel circuit 10D according to a fourth embodiment and a form of a display device including the pixel circuit 10D. The display device having the pixel circuit 10D according to the fourth embodiment in a pixel array section 102 will be referred to as a display device 1D according to the fourth embodiment. FIG. 19 shows a basic constitution (of one pixel). FIG. 20 shows a concrete constitution (whole of the display device). FIG. 21 is a timing chart of assistance in explaining the operation of the fourth embodiment with attention directed to a transistor characteristic control signal Vb.

As shown in FIG. 19 and FIG. 20, the fourth embodiment has a transistor characteristic controlling section 620D in each pixel circuit 10D. The transistor characteristic controlling section 620D has a buffer 642 connected between the transistor characteristic control terminal (back gate terminal) and the control input terminal (gate terminal) of a sampling transistor 125. The characteristic controlling scanning section 621 is not necessary. Incidentally, the wiring resistance of the back gate of the sampling transistor 125 is represented by a resistance element $R_{BG}$ in FIG. 19. The transistor characteristic controlling section 620D may further include an amplitude adjusting section 644 for adjusting the amplitude of the transistor characteristic control signal Vb supplied to the transistor characteristic control terminal, though the amplitude adjusting section 644 is not essential. As an example, the amplitude adjusting section 644 has a resistance element 645 connected between the transistor characteristic control terminal of the sampling transistor 125 and the buffer 642. The transistor characteristic controlling section 620D may further include a pulse width adjusting section 646 for adjusting the pulse width of the transistor characteristic control signal Vb supplied to the transistor characteristic control terminal, though the pulse width adjusting section 646 is not essential. As an example, the pulse width adjusting section 646 has a differentiating circuit 647 for differentiating a writing pulse WS on an input side of the buffer 642. It suffices for the differentiating circuit 647 to be formed by a resistance element and a capacitance element.

The fourth embodiment is similar to the second embodiment in that the writing pulse WS at a time of signal writing is used. However, the fourth embodiment is different from the second embodiment in that the fourth embodiment inputs the writing pulse WS to the base potential of the sampling transistor 125 substantially as it is via the buffer 642 rather than by voltage coupling via a capacitance element, so that the writing of the signal voltage by the sampling transistor 125 is facilitated. The interposition of the amplitude adjusting section 644 (resistance element 645) facilitates adjustment of the magnitude of the transistor characteristic control signal Vb supplied to the back gate terminal of the sampling transistor 125, as shown in FIG. 21. The interposition of the pulse width adjusting section 646 (differentiating circuit 647) facilitates adjustment of the pulse width ΔT of the transistor characteristic control signal Vb supplied to the back gate terminal of the sampling transistor 125, as shown in FIG. 21. The fourth embodiment has a more complex circuit configuration than the second embodiment or the third embodiment, but facilitates adjustment of the magnitude and the supply time of the transistor characteristic control signal Vb supplied to the back gate terminal of the sampling transistor 125.

Fifth Embodiment

FIGS. 22A to 22E are diagrams of assistance in explaining a fifth embodiment. The fifth embodiment is an example of electronic devices including display devices to which the technology for suppressing or eliminating the luminance shortage phenomenon caused by the back gate effect described above is applied. A process of suppressing display nonuniformity according to the present embodiment is applicable to display devices including current-driven type display elements used in various electronic devices such as a game machine, an electronic book, an electronic dictionary, a portable telephone, and the like.

Figure 22A:
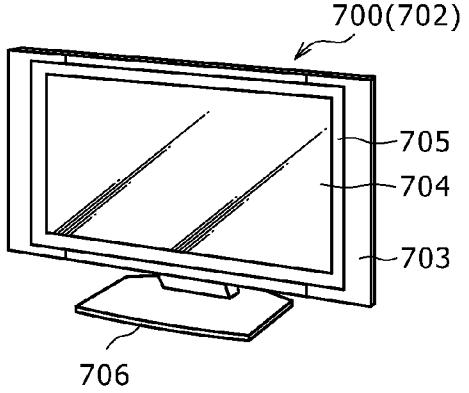
FIGS. 22A to 22E are diagrams of assistance in explaining a fifth embodiment (electronic devices).
Figure 22B:
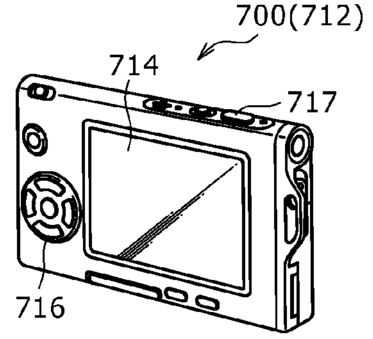
Figure 22C:
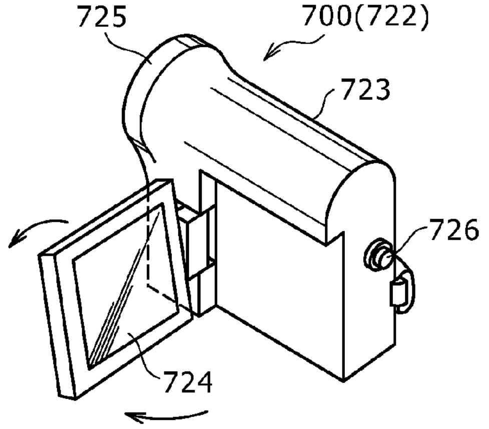
Figure 22D:
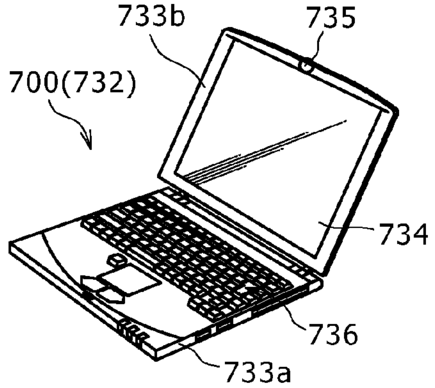
Figure 22E:
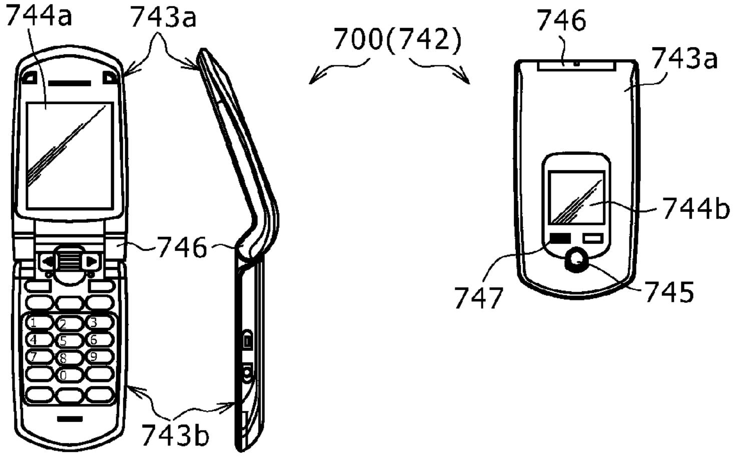

For example, FIG. 22A is a perspective view showing an example of an external appearance in a case where an electronic device 700 is a television receiver 702 using a display module 704 as an example of an image display device. The television receiver 702 has the display module 704 disposed in a front surface of a front panel 703 supported by a base 706, and has a filter glass 705 on a display surface. FIG. 22B is a diagram showing an example of an external appearance in a case where an electronic device 700 is a digital camera 712. The digital camera 712 includes a display module 714, a control switch 716, a shutter button 717, and the like. FIG. 22C is a diagram showing an example of an external appearance in a case where an electronic device 700 is a video camera 722. The video camera 722 has an imaging lens 725 for imaging a subject in a front of a main body 723, and further includes a display module 724, a start/stop switch 726 for picture taking, and the like. FIG. 22D is a diagram showing an example of an external appearance in a case where an electronic device 700 is a computer 732. The computer 732 includes a lower side casing 733*a*, an upper side casing 733*b*, a display module 734, a Web camera 735, a keyboard 736, and the like. FIG. 22E is a diagram showing an example of an external appearance in a case where an electronic device 700 is a portable telephone 742. The portable telephone 742 is a folding type. The portable telephone 742 includes an upper side casing 743*a*, a lower side casing 743*b*, a display module 744*a*, a sub-display 744*b*, a camera 745, a coupling part 746 (a hinge part in the present example), a picture light 747, and the like.

The display module 704, the display module 714, the display module 724, the display module 734, the display module 744*a*, and the sub-display 744*b* are fabricated by using a display device according to the present embodiment. Thus, each electronic device 700 may not only correct luminance variations caused by variations in threshold voltage and mobility of a driving transistor (and variations in k) but also suppress or eliminate the luminance shortage phenomenon caused by the back gate effect, and can therefore make display of high image quality.

The technology disclosed in the present specification has been described above using embodiments thereof. However, the technical scope of contents described in claims is not limited to scope described in the foregoing embodiments. Various changes or improvements can be made to the foregoing embodiments without departing from the spirit of the technology disclosed in the present specification, and forms obtained by adding such changes and improvements are also included in the technical scope of the technology disclosed in the present specification. The foregoing embodiments do not limit the technology relating to the claims, and not all combinations of features described in the embodiments are necessarily essential to solve the problems covered by the technology disclosed in the present specification. The foregoing embodiments include technologies in various stages, and various technologies can be extracted by appropriately combining a plurality of disclosed constitutional requirements. Even when a few constitutional requirements are omitted from all the constitutional requirements disclosed in the embodiments, constitutions resulting from the omission of the few constitutional requirements can be extracted as technologies disclosed in the present specification as long as an effect corresponding to a problem covered by the technology disclosed in the present specification is obtained.

For example, in regard to eliminating the luminance shortage phenomenon caused by the back gate effect, it suffices to be able to control the characteristic of the writing transistor in such a manner as to be operatively associated with the process of writing the driving voltage corresponding to the video signal to the storage capacitor, and various constitutions can be adopted as long as the characteristic of the writing transistor can be controlled in such a manner as to be operatively associated with the process of writing the driving voltage corresponding to the video signal to the storage capacitor. It is not essential that circuit elements for making provision for this be included within the pixel circuits, and the provision may be realized by devising the timing of control of the pixel circuits 10 by the control portion 109 (characteristic controlling scanning section 621 in a foregoing example) disposed outside the pixel circuits (reference is to be made to differences between the first embodiment and the second to fourth embodiments).

Alternatively, without the independent characteristic controlling scanning section 621 being provided outside the pixel circuits 10, there may be a constitution that generates a scanning pulse corresponding to a high/low of a transistor characteristic control signal Vb by a logic circuit using a driving pulse output by another scanning section, subjects the scanning pulse to level conversion, and then outputs a transistor characteristic control signal Vb having appropriate levels $Vb_{\_H}$ and $Vb_{\_L}$.

In addition, in the foregoing embodiments and examples, when the writing transistor has the transistor characteristic control terminal capable of controlling the threshold voltage such as the back gate terminal or the like, the transistor characteristic control terminal is used to control the characteristic of the writing transistor in such a manner as to be operatively associated with the process of writing the driving voltage corresponding to the video signal to the storage capacitor. However, this is a mere example, and the present technology is not limited to constitutions that perform the control using the transistor characteristic control terminal as long as the writing capability of the writing transistor is increased for a "certain period immediately after a start of writing." It is needless to say that complementary constitutions in which n-channel transistors are interchanged with p-channel transistors and the polarity of power and signals is reversed accordingly, for example, can be adopted.

Based on the description of the foregoing embodiments, the technology relating to the claims is an example, and the following technology is extracted, for example. The technology is listed below.

[Supplementary Note 1]

A pixel circuit including:

a display section;

a storage capacitor;

a writing transistor for writing a driving voltage corresponding to a video signal to the storage capacitor; and a driving transistor for driving the display section on a basis of the driving voltage written to the storage capacitor, wherein a characteristic of the writing transistor is controllable in such a manner as to be operatively associated with a process of writing the driving voltage corresponding to the video signal to the storage capacitor.

[Supplementary Note 2]

The pixel circuit according to supplementary note 1, further including a characteristic controlling section configured to control the characteristic of the writing transistor in such a manner as to be operatively associated with the process of writing the driving voltage corresponding to the video signal to the storage capacitor.

[Supplementary Note 3]

The pixel circuit according to supplementary note 1 or 2, wherein a writing capability of the writing transistor is increased in a period of the process of writing the driving voltage corresponding to the video signal to the storage capacitor.

[Supplementary Note 4]

The pixel circuit according to supplementary note 3, wherein the writing capability of the writing transistor is increased simultaneously with a start of the process of writing the driving voltage corresponding to the video signal to the storage capacitor.

[Supplementary Note 5]

The pixel circuit according to supplementary note 3, wherein a threshold voltage of the writing transistor is decreased simultaneously with a start of the process of writing the driving voltage corresponding to the video signal to the storage capacitor.

[Supplementary Note 6]

The pixel circuit according to any one of supplementary notes 1 to 5, wherein the writing transistor has a characteristic control terminal capable of controlling a threshold voltage, and the characteristic controlling section supplies a control signal for controlling the threshold voltage to the characteristic control terminal.

[Supplementary Note 7]

The pixel circuit according to supplementary note 6, wherein the writing transistor is a metal oxide film type field effect transistor.

[Supplementary Note 8]

The pixel circuit according to supplementary note 6, wherein the writing transistor is a back gate type thin film transistor.

[Supplementary Note 9]

The pixel circuit according to any one of supplementary notes 6 to 8, wherein a capacitance element is disposed between the characteristic control terminal and a control electrode terminal of the writing transistor, the control electrode terminal being supplied with a control signal for controlling conduction/non-conduction of the writing transistor.

[Supplementary Note 10]

The pixel circuit according to any one of supplementary notes 6 to 8, wherein a capacitance element is disposed between the characteristic control terminal and a video signal line for transmitting the video signal.

[Supplementary Note 11]

The pixel circuit according to supplementary note 9 or supplementary note 10, further including a time constant adjusting section configured to adjust a time constant of the signal supplied to the characteristic control terminal via the capacitance element.

[Supplementary Note 12]

The pixel circuit according to supplementary note 11, wherein the time constant adjusting section has a resistance element connected to the characteristic control terminal.

[Supplementary Note 13]

The pixel circuit according to any one of supplementary notes 6 to 8, wherein a pulse signal corresponding to a control signal for controlling conduction/non-conduction of the writing transistor is supplied to the characteristic control terminal.

[Supplementary Note 14]

The pixel circuit according to supplementary note 13, further including at least one of:

a pulse width adjusting section configured to adjust a pulse width of the control signal for controlling the conduction/non-conduction of the writing transistor, the pulse width setting the writing transistor in a conducting state, and supply the control signal to the characteristic control terminal; and an amplitude adjusting section configured to adjust an amplitude of the signal supplied to the characteristic control terminal.

[Supplementary Note 15]

The pixel circuit according to any one of supplementary notes 1 to 14, further including a pixel section in which display elements are arranged, wherein the characteristic controlling section controls a characteristic of the writing transistor in each display element.

[Supplementary Note 16]

The pixel circuit according to supplementary note 15, wherein the pixel section has the display elements arranged in a form of a two-dimensional matrix.

[Supplementary Note 17]

The pixel circuit according to any one of supplementary notes 1 to 16, wherein a display element is a self-luminous type.

[Supplementary Note 18]

A display device including:

a plurality of display elements including a display section, a storage capacitor, a writing transistor for writing a driving voltage corresponding to a video signal to the storage capacitor, and a driving transistor for driving the display section on a basis of the driving voltage written to the storage capacitor, the display elements being arranged; and a characteristic controlling section configured to control a characteristic of the writing transistor in such a manner as to be operatively associated with a process of writing the driving voltage corresponding to the video signal to the storage capacitor.

[Supplementary Note 19]

An electronic device including:

a plurality of display elements including a display section, a storage capacitor, a writing transistor for writing a driving voltage corresponding to a video signal to the storage capacitor, and a driving transistor for driving the display section on a basis of the driving voltage written to the storage capacitor, the display elements being arranged;

a signal generating section configured to generate the video signal to be supplied to the writing transistor; and a characteristic controlling section configured to control a characteristic of the writing transistor in such a manner as to be operatively associated with a process of writing the driving voltage corresponding to the video signal to the storage capacitor.

[Supplementary Note 20]

A pixel circuit driving method for driving a pixel circuit, the pixel circuit including a writing transistor for writing a driving voltage corresponding to a video signal to a storage capacitor and a driving transistor for driving a display section, the driving method including controlling a characteristic of the writing transistor in such a manner as to be operatively associated with a process of writing the driving voltage corresponding to the video signal to the storage capacitor.

The present disclosure contains subject matter related to that disclosed in Japanese Priority Patent Application JP 2011-128238 filed in the Japan Patent Office on Jun. 8, 2011, the entire content of which is hereby incorporated by reference.

What is claimed is:

1. A pixel circuit comprising:

a light emitting element;

a storage capacitor;

a writing transistor for writing a driving voltage corresponding to a video signal to the storage capacitor; and a driving transistor for driving the light emitting element on a basis of the driving voltage written to the storage capacitor, wherein a characteristic of the writing transistor is controllable in such a manner as to be operatively associated with a process of writing the driving voltage corresponding to the video signal to the storage capacitor, a writing capability of the writing transistor is increased in a period of the process of writing the driving voltage corresponding to the video signal to the storage capacitor, and a threshold voltage of the writing transistor is decreased simultaneously with a start of the process of writing the driving voltage corresponding to the video signal to the storage capacitor.

2. The pixel circuit according to claim 1, further comprising a characteristic controlling section configured to control the characteristic of the writing transistor in such a manner as to be operatively associated with the process of writing the driving voltage corresponding to the video signal to the storage capacitor.

3. The pixel circuit according to claim 1, wherein the writing capability of the writing transistor is increased simultaneously with a start of the process of writing the driving voltage corresponding to the video signal to the storage capacitor.

4. The pixel circuit according to claim 1, further comprising a pixel section in which light emitting elements are arranged, wherein a characteristic controlling section controls a characteristic of the writing transistor in each light emitting element.

5. The pixel circuit according to claim 4, wherein the pixel section has the light emitting elements arranged in a form of a two-dimensional matrix.

6. A pixel circuit comprising:

a light emitting element;

a storage capacitor;

a writing transistor for writing a driving voltage corresponding to a video signal to the storage capacitor; and a driving transistor for driving the light emitting element on a basis of the driving voltage written to the storage capacitor, wherein a characteristic of the writing transistor is controllable in such a manner as to be operatively associated with a process of writing the driving voltage corresponding to the video signal to the storage capacitor, the writing transistor has a characteristic control terminal capable of controlling a threshold voltage, and a characteristic controlling section supplies a control signal for controlling the threshold voltage to the characteristic control terminal.

7. The pixel circuit according to claim 6, wherein the writing transistor is a metal oxide film type field effect transistor.

8. The pixel circuit according to claim 6, wherein the writing transistor is a back gate type thin film transistor.

9. The pixel circuit according to claim 6, wherein a capacitance element is disposed between the characteristic control terminal and a control electrode terminal of the writing transistor, the control electrode terminal being supplied with a control signal for controlling conduction/non-conduction of the writing transistor.

10. The pixel circuit according to claim 9, further comprising a time constant adjusting section configured to adjust a time constant of the signal supplied to the characteristic control terminal via the capacitance element.

11. The pixel circuit according to claim 10, wherein the time constant adjusting section has a resistance element connected to the characteristic control terminal.

12. The pixel circuit according to claim 6, wherein a capacitance element is disposed between the characteristic control terminal and a video signal line for transmitting the video signal.

13. The pixel circuit according to claim 6, wherein a pulse signal corresponding to a control signal for controlling conduction/non-conduction of the writing transistor is supplied to the characteristic control terminal.

14. The pixel circuit according to claim 13, further comprising at least one of:

a pulse width adjusting section configured to adjust a pulse width of the control signal for controlling the conduction/non-conduction of the writing transistor, the pulse width setting the writing transistor in a conducting state, and supply the control signal to the characteristic control terminal; and an amplitude adjusting section configured to adjust an amplitude of the signal supplied to the characteristic control terminal.

15. A display device comprising:

a plurality of pixel circuits including a light emitting element, a storage capacitor, a writing transistor for writing a driving voltage corresponding to a video signal to the storage capacitor, and a driving transistor for driving the light emitting element on a basis of the driving voltage written to the storage capacitor, the pixel circuits being arranged; and a characteristic controlling section configured to control a characteristic of the writing transistor in such a manner as to be operatively associated with a process of writing the driving voltage corresponding to the video signal to the storage capacitor, wherein a writing capability of the writing transistor is increased in a period of the process of writing the driving voltage corresponding to the video signal to the storage capacitor, and a threshold voltage of the writing transistor is decreased simultaneously with a start of the process of writing the driving voltage corresponding to the video signal to the storage capacitor.

16. A display device comprising:

a plurality of pixel circuits;

a plurality of signal lines; and a plurality of scanning lines, wherein the pixel circuits include a light emitting element, a storage capacitor, a writing transistor, and a driving transistor, the writing transistor is set in a conducting state according to a control signal from a scanning line, and supplies a video signal from a signal line to the storage capacitor, the storage capacitor retains a driving voltage corresponding to the supplied video signal, the driving transistor is driven so as to feed a current through the light emitting element on a basis of the driving voltage, the writing transistor includes a back gate terminal and a gate terminal, and a capacitance element and a resistance element are connected between the back gate terminal and the gate terminal.

17. An electronic device comprising:

a plurality of pixel circuits including a light emitting element, a storage capacitor, a writing transistor for writing a driving voltage corresponding to a video signal to the storage capacitor, and a driving transistor for driving the light emitting element on a basis of the driving voltage written to the storage capacitor, the pixel circuits being arranged;

a signal generating section for generating the video signal to be supplied to the writing transistor; and a characteristic controlling section configured to control a characteristic of the writing transistor in such a manner as to be operatively associated with a process of writing the driving voltage corresponding to the video signal to the storage capacitor, wherein a writing capability of the writing transistor is increased in a period of the process of writing the driving voltage corresponding to the video signal to the storage capacitor, and a threshold voltage of the writing transistor is decreased simultaneously with a start of the process of writing the driving voltage corresponding to the video signal to the storage capacitor.

18. A pixel circuit driving method for driving a pixel circuit, the pixel circuit including a writing transistor for writing a driving voltage corresponding to a video signal to a storage capacitor and a driving transistor for driving a display section, the driving method comprising controlling a characteristic of the writing transistor in such a manner as to be operatively associated with a process of writing the driving voltage corresponding to the video signal to the storage capacitor, wherein a writing capability of the writing transistor is increased in a period of the process of writing the driving voltage corresponding to the video signal to the storage capacitor, and a threshold voltage of the writing transistor is decreased simultaneously with a start of the process of writing the driving voltage corresponding to the video signal to the storage capacitor.

* * * * *